United States Patent [19]
Allen et al.

[11] Patent Number: 5,766,704
[45] Date of Patent: Jun. 16, 1998

[54] CONFORMING SHOE CONSTRUCTION AND GEL COMPOSITIONS THEREFOR

[75] Inventors: Bernie Allen, Wayland, Mass.; Zoran Petrovic; Ivan Javni, both of Pittsburg, Kans.

[73] Assignee: Acushnet Company, Fairhaven, Mass.

[21] Appl. No.: 614,758

[22] Filed: Mar. 13, 1996

Related U.S. Application Data

[63] Continuation-in-part of Ser. No. 549,299, Oct. 27, 1995.

[51] Int. Cl.$^6$ .................................................. C08L 33/24
[52] U.S. Cl. .................... 428/34.1; 525/218; 523/105; 523/300; 524/521; 524/310
[58] Field of Search .................... 428/34.1; 525/218; 523/105, 300; 524/521, 310

[56] References Cited

U.S. PATENT DOCUMENTS

| Re. 32,834 | 1/1989 | Cordts et al. .................... 524/310 |
|---|---|---|
| Re. 35,068 | 10/1995 | Tanaka et al. .................... 523/300 |
| 3,237,319 | 3/1966 | Hanson . |
| 3,548,420 | 12/1970 | Spence . |
| 3,765,422 | 10/1973 | Smith .................... 128/594 |
| 4,038,762 | 8/1977 | Swan, Jr. . |
| 4,083,127 | 4/1978 | Hanson . |
| 4,153,571 | 5/1979 | Garvin et al. . |
| 4,188,373 | 2/1980 | Krezanoski . |
| 4,211,236 | 7/1980 | Krinsky . |
| 4,243,754 | 1/1981 | Swan, Jr. . |
| 4,252,910 | 2/1981 | Schaefer . |
| 4,255,202 | 3/1981 | Swan, Jr. . |
| 4,293,440 | 10/1981 | Elphingstone et al. .................... 252/317 |
| 4,471,538 | 9/1984 | Pomeranz et al. . |

(List continued on next page.)

FOREIGN PATENT DOCUMENTS

US94/05400  11/1995  WIPO .

OTHER PUBLICATIONS

"Revolutionary ATS Technology" [no date, no time].
I.R. Schmolka, "BWC Surfactants in Gel Cosmetics," *Cosmetics & Toiletries*, vol. 92, pp. 77–79 (Jul. 1977).
T. Tanaka, "*Gels,*" Scientific American, vol. 244, pp. 124–138 (1981).
Kirk–Othmer, "*Encyclopedia of Chemical Technology*—Third Edition," vol. 20, pp. 207–230 (1982).
I.R. Schmolka, "*A Comparison of Block Copolymer Surfactant Gels,*" Journal of American Oil Chemist's Soc'y, vol. 68, pp. 206–209 (Surfactants & Detergents, Mar. 1991).
M. Malsten & B. Lindman, "*Effects of Homopolymers on the Gel Formation in Aqueous Block Copolymer Solutions,*" Macromolecules, vol. 26, pp. 1282–1286 (1993).
BASF Wyandotte Corp., "*Technical Data on . . . Pluronic® Polyol Gels,*" pp. 1–5 (Publication 0–513).
SC: 1102–89 (Apr. 1989) "KRATON® Thermoplastic Rubbers in Oil Gels".
I.R. Schmolka & L.R. Bacon, "*Viscosity Characteristics of Aqueous Solutions of Block Copolymers of Propylene and Ethylene Oxides,*" Journal of American Oil Chemist's Soc'y, vol. 44, pp. 559–562.
Ariat International, Inc., "Ariat ATS Technology," 1995.
Ariat International, Inc., "The New Ariat Workhorse", 1996.

*Primary Examiner*—Charles Nold
*Attorney, Agent, or Firm*—Pennie & Edmonds LLP

[57] ABSTRACT

The invention provides a conforming medium containing gels for customized fitting components, such as those used in a shoe. The invention further includes environmentally-responsive gels that are temperature-responsive so that they will react to body heat to transition from a liquid to a gel state or a gel state to a liquid state. The invention optionally includes thermally-sensitive dyes and other colorants in the environmentally-responsive gels. Furthermore, the invention is directed to an article for conforming to the contours of an object having isolation means, such as a bladder of a flexible member, to contain the environmentally-responsive gel therein.

18 Claims, 31 Drawing Sheets

U.S. PATENT DOCUMENTS

| | | | |
|---|---|---|---|
| 4,495,169 | 1/1985 | Schmolka . | |
| 4,534,958 | 8/1985 | Adams et al. . | |
| 4,534,959 | 8/1985 | Schmolka . | |
| 4,541,186 | 9/1985 | Mulvihill . | |
| 4,555,344 | 11/1985 | Cussler | 210/670 |
| 4,585,647 | 4/1986 | Schmolka . | |
| 4,614,612 | 9/1986 | Reilly et al. . | |
| 4,616,430 | 10/1986 | McQuiggin . | |
| 4,662,087 | 5/1987 | Beuch . | |
| 4,728,551 | 3/1988 | Jay . | |
| 4,732,930 | 3/1988 | Tanaka et al. | 524/742 |
| 4,744,157 | 5/1988 | Dubner . | |
| 4,771,554 | 9/1988 | Hannemann . | |
| 4,783,910 | 11/1988 | Boys, II et al. . | |
| 4,808,469 | 2/1989 | Hiles . | |
| 4,817,304 | 4/1989 | Parker et al. . | |
| 4,828,701 | 5/1989 | Cussler | 210/634 |
| 4,863,613 | 9/1989 | Johnson et al. | 210/670 |
| 4,876,805 | 10/1989 | Peoples . | |
| 4,888,168 | 12/1989 | Potts et al. . | |
| 4,911,691 | 3/1990 | Aniuk et al. . | |
| 4,934,072 | 6/1990 | Fredericksen et al. . | |
| 4,942,035 | 7/1990 | Churchill et al. . | |
| 4,957,620 | 9/1990 | Cussler | 210/635 |
| 4,977,691 | 12/1990 | Orchard, 3rd . | |
| 5,000,955 | 3/1991 | Gould et al. | 424/409 |
| 5,005,575 | 4/1991 | Geri . | |
| 5,015,427 | 5/1991 | Sosnow . | |
| 5,058,585 | 10/1991 | Kendall et al. . | |
| 5,059,417 | 10/1991 | Williams et al. . | |
| 5,067,255 | 11/1991 | Hutcheson . | |
| 5,070,629 | 12/1991 | Graham et al. . | |
| 5,071,644 | 12/1991 | Viegas et al. . | |
| 5,077,033 | 12/1991 | Viegas et al. . | |
| 5,097,607 | 3/1992 | Fredericksen . | |
| 5,100,933 | 3/1992 | Tanaka et al. | 523/300 |
| 5,101,580 | 4/1992 | Lyden . | |
| 5,126,141 | 6/1992 | Henry . | |
| 5,131,174 | 7/1992 | Drew et al. . | |
| 5,143,731 | 9/1992 | Viegas et al. . | |
| 5,149,588 | 9/1992 | Fukushima et al. | 428/411.1 |
| 5,155,927 | 10/1992 | Bates et al. . | |
| 5,160,627 | 11/1992 | Cussler et al. | 210/639 |
| 5,183,879 | 2/1993 | Yuasa et al. . | |
| 5,203,793 | 4/1993 | Lyden . | |
| 5,242,491 | 9/1993 | Mamada et al. | 106/241 |
| 5,252,318 | 10/1993 | Joshi et al. . | |
| 5,262,468 | 11/1993 | Chen . | |
| 5,274,018 | 12/1993 | Tanaka et al. | 524/166 |
| 5,287,638 | 2/1994 | Preston . | |
| 5,292,516 | 3/1994 | Viegas et al. . | |
| 5,298,260 | 3/1994 | Viegas et al. . | |
| 5,300,295 | 4/1994 | Viegas et al. . | |
| 5,311,678 | 5/1994 | Spademan . | |
| 5,313,717 | 5/1994 | Allen et al. . | |
| 5,315,769 | 5/1994 | Barry et al. . | |
| 5,331,059 | 7/1994 | Engelhardt et al. . | |
| 5,336,708 | 8/1994 | Chen | 524/474 |
| 5,343,638 | 9/1994 | Legassie et al. . | |
| 5,354,835 | 10/1994 | Blair . | |
| 5,357,693 | 10/1994 | Owens . | |
| 5,363,570 | 11/1994 | Allen et al. . | |
| 5,366,735 | 11/1994 | Henry . | |
| 5,376,693 | 12/1994 | Viegas et al. . | |
| 5,383,290 | 1/1995 | Grim . | |
| 5,403,893 | 4/1995 | Tanaka et al. | 525/218 |
| 5,407,445 | 4/1995 | Tautvydas et al. . | |
| 5,441,732 | 8/1995 | Hoeg et al. . | |
| 5,475,882 | 12/1995 | Sereboff | 3/450 |
| 5,493,792 | 2/1996 | Bates et al. . | |

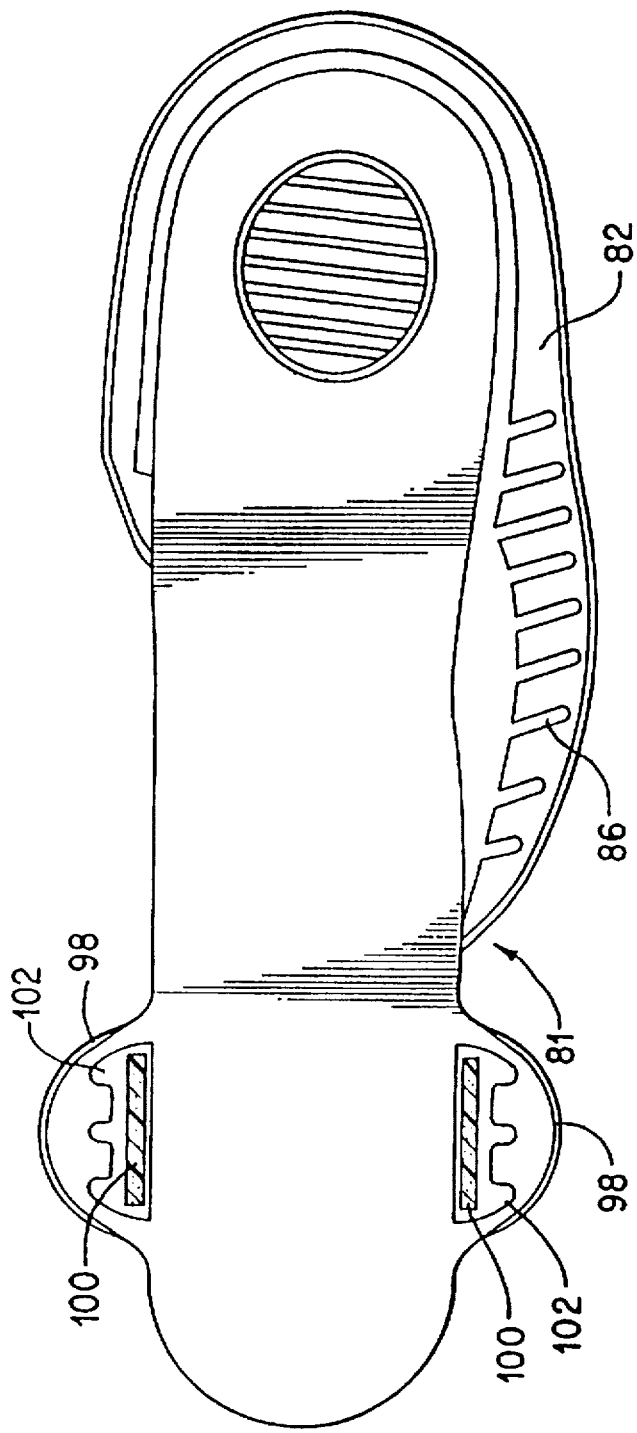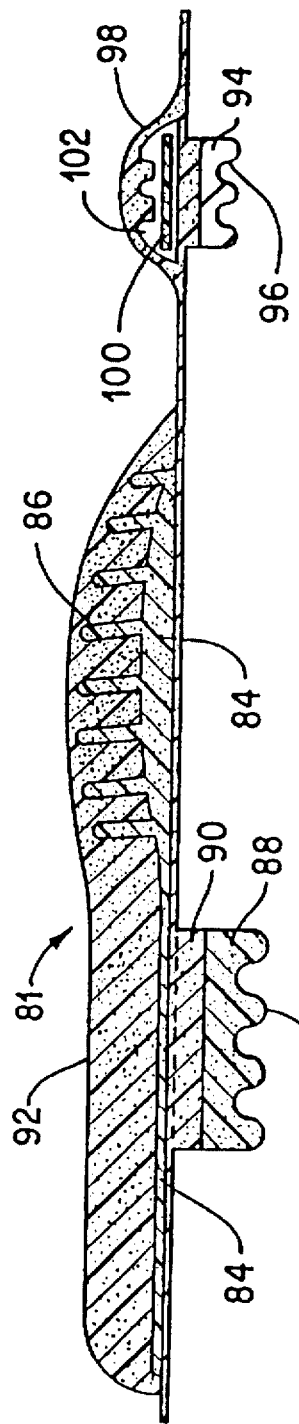
FIG. 9A
FIG. 9B

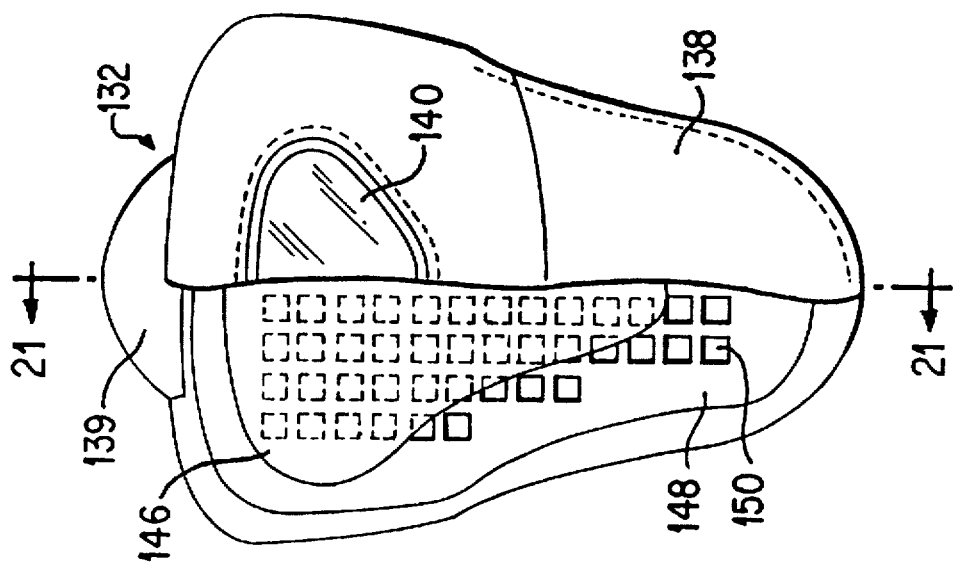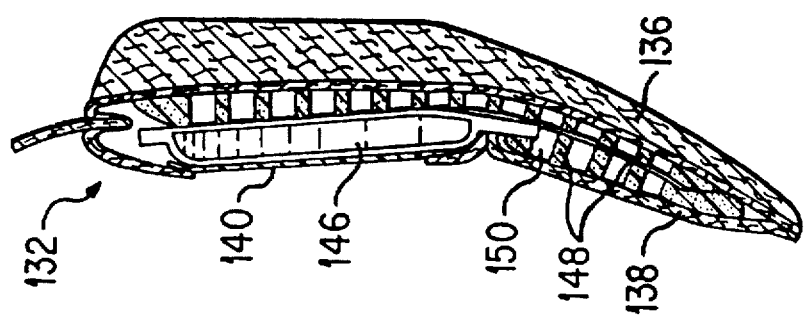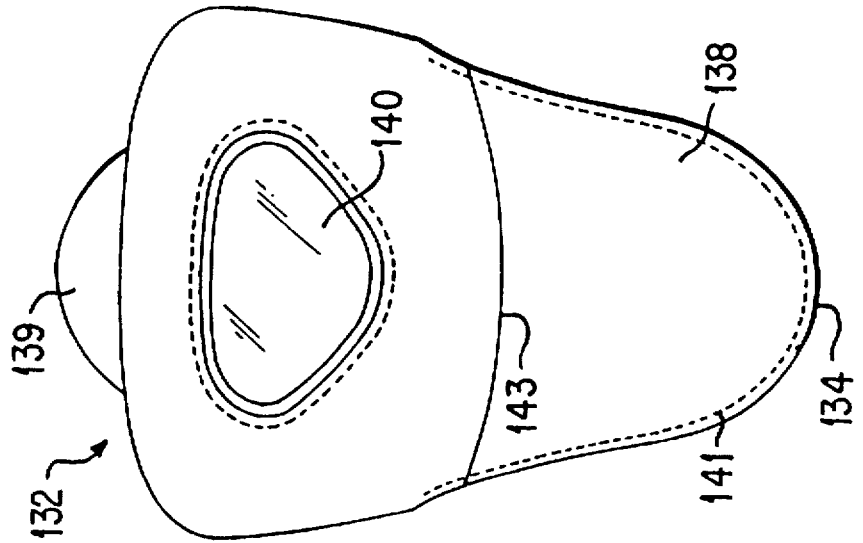

CONFORMING SHOE CONSTRUCTION AND GEL COMPOSITIONS THEREFOR

CROSS-REFERENCE TO RELATED APPLICATIONS

This application is a continuation-in-part of application Ser. No. 08/549,299 filed Oct. 27, 1995 pending.

TECHNICAL FIELD

The invention provides a conforming medium containing gels for customized fitting components, such as those used in a shoe. The invention further includes environmentally-responsive gels that are temperature-responsive so that they will react to body heat to transition from a liquid to a gel state or a gel state to a liquid state. The invention optionally includes thermally-sensitive dyes and other colorants in the environmentally-responsive gels. Furthermore, the invention is directed to an article for conforming to the contours of an object having isolation means, such as a bladder of a flexible member, to contain the environmentally-responsive gel therein.

BACKGROUND OF THE INVENTION

Various methods and devices have been employed in shoes to add cushioning to the shoe and to provide complementary custom fitting configurations to the contours of a foot inserted into the shoe. One example is U.S. Pat. No. 5,313,717 to Allen et al. ("Allen"), in which a reactive energy fluid filled cushioning and stabilizing apparatus in a shoe is comprised of one or more anatomically shaped fluid filled bladders that are positioned in the forefoot, arch and/or heel areas of the shoe. As discussed therein, typical prior art devices provide cushioning and custom fit to the foot inside the shoe by constructing the shoe sole from a softer, more resilient material or incorporating fluid filled pads or bladders in the shoe.

The use of gels to provide a conforming fit or cushion is generally known in the prior art. Prior art gels are generally pre-set to fit the contours of a foot or they are soft liquid gels that must be placed in a bladder. Some examples of prior art gels are U.S. Pat. Nos. 5,155,927 and 5,493,792 to Bates, which disclose athletic shoes constructed to minimize impact shock and maximize lateral stability by use of a cushioning element comprising a chamber having flexible walls filled with a liquid composition which is preferably a gel and the chamber has a plurality of partitions for directing the flow of liquid from one portion of the chamber to another.

In other shoes designed to provide cushioning or custom fitting, either an air filled foam or an air bladder has been used to conform to the foot which is inserted into the shoe. The foam is a material that reacts to foot pressure by allowing the air therein to become compressed and/or escape and therefore resiliently compresses upon pressure from the foot. The material does not have the capability to expand to the non-pressure areas of the foot. Shoes that incorporate an air bladder fill in air around the foot so that the shoe conforms to the foot therein, but in doing so, increases the pressure on the foot. This increased pressure and foot surrounding air pocket tends to greatly increase the foot temperature. Thus, these solutions provide fit or comfort either by merely displacing material at locations of higher pressure or by increasing the pressure completely around the foot. Thus, these shoes do not conform fully to the foot therein at normal pressures.

Gels having a liquid to gel transition range are also generally known in the art. For example, U.S. Pat. No. 5,143,731 to Viegas et al. ("Viegas") discloses the use of aqueous pharmaceutical vehicles containing a polyoxyalkylene non-ionic block copolymer, which are liquid at ambient temperatures and transition at mammalian body temperatures to a semi-solid gel by the inclusion of polysaccharide.

The viscosity change at the transition range of prior art gels has not been considered important, which is one reason why such gels have not been commonly utilized as foot conforming components. Most prior art gels are not thermally-responsive. Even in those gels that are temperature-responsive, the viscosity improvement at the transition range is not significant. Thus, there remains a need for improved shoe conforming components and gels for use in such components.

SUMMARY OF THE INVENTION

The present invention relates to a gel composition having comprising water and a non-ionic block copolymer in an amount of between about 15 to 40 weight percent to impart a gel transition temperature range at which the gel composition changes from a liquid state to a gel state of between about 0.1° to 5° C., whereby the viscosity of the gel composition in the gel state is greater than about 100 to 3000 times the viscosity of the gel composition in the liquid state. A preferred transition temperature range of the gel composition beginning at about 13° to 35° C. Any of the block copolymers described above can be used in these gel compositions.

As described above, a gel property modifying additive may be included in the composition, with the additive preferably being a surfactant, a polyol, an acid, an amine or a salt thereof. The additive is typically present in an amount of about 1 to 20 weight percent.

A most preferred block copolymer comprises 60 to 80 weight percent polyethylene oxide and 20 to 40 weight percent polypropylene oxide, and deionized water. The gel composition advantageously includes a thermo-sensitive dye in an amount sufficient to provide a first color that fades at substantially the same transition temperature as that temperature wherein the gel composition changes from a liquid state to a gel state. The thermo-sensitive dye is optionally present in an amount of about 0.02 to 0.5 weight percent.

In an optional embodiment, a convention second color dye in an amount sufficient to provide a color combination with the thermo-sensitive dye below the first transition temperature that provides only the second color above the first transition temperature may be added in an amount of about 0.07 to 0.5 weight percent.

The invention also relates to an article for conforming to the contours of an object using any of the gel compositions above, wherein the article is isolation means for containing the gel composition therein. The article above is advantageously a bladder of a flexible member capable of deformation to conform to the contours of the object. In a preferred embodiment, the bladder is only partially filled with the gel composition. It is also advantageous if the flexible member is made of a material that retains water selected from the group of thermoplastic or polymeric materials. The flexible member is preferably made from a material selected from the group consisting of polyethylene, polypropylene, metallocene polymer, polyethylene/ polyurethane, polyethylene/EVA, SURLYN®, and EVOH.

BRIEF DESCRIPTION OF THE DRAWINGS

FIG. 9A is a top view of a second embodiment of the foot bed according to the present invention.

FIG. 9B is a cross-sectional, side view of the second embodiment of the foot bed according to the present invention.

FIG. 20 is a top view of an optional embodiment of a shoe tongue according to the present invention.

FIG. 21 is a cross-sectional view of the shoe tongue along line 21—21 according to the present invention.

FIG. 22 is a top view of a preferred embodiment of a shoe tongue according to the present invention.

DETAILED DESCRIPTION OF THE PREFERRED EMBODIMENTS

The present invention is directed to a shoe which conforms to contours of a foot inserted into the shoe. The shoe employs a solid foam matrix that contains elements of a soft, highly flowable viscoelastic gel, a foam and/or an environmentally-responsive gel. The shoe uses a temperature-responsive gel that reacts to the heat of a foot inserted into the shoe to provide a conforming medium for fit and cushioning. The invention is also directed to soft elastomeric or foamed elastomeric gels to provide a flowable, viscoelastic medium that will conform to the foot as the foot is inserted into the shoe. Each of these gels can be located in proper position by surrounding the gels with a memory foam or other commercially available foams. The memory foam can be comprised of a polyol, antifoam agent, catalyst and isocyanate. Still further, the foam can be comprised of a polyurethane foam with hollow microspheres or a blowing agent.

Figure 1:
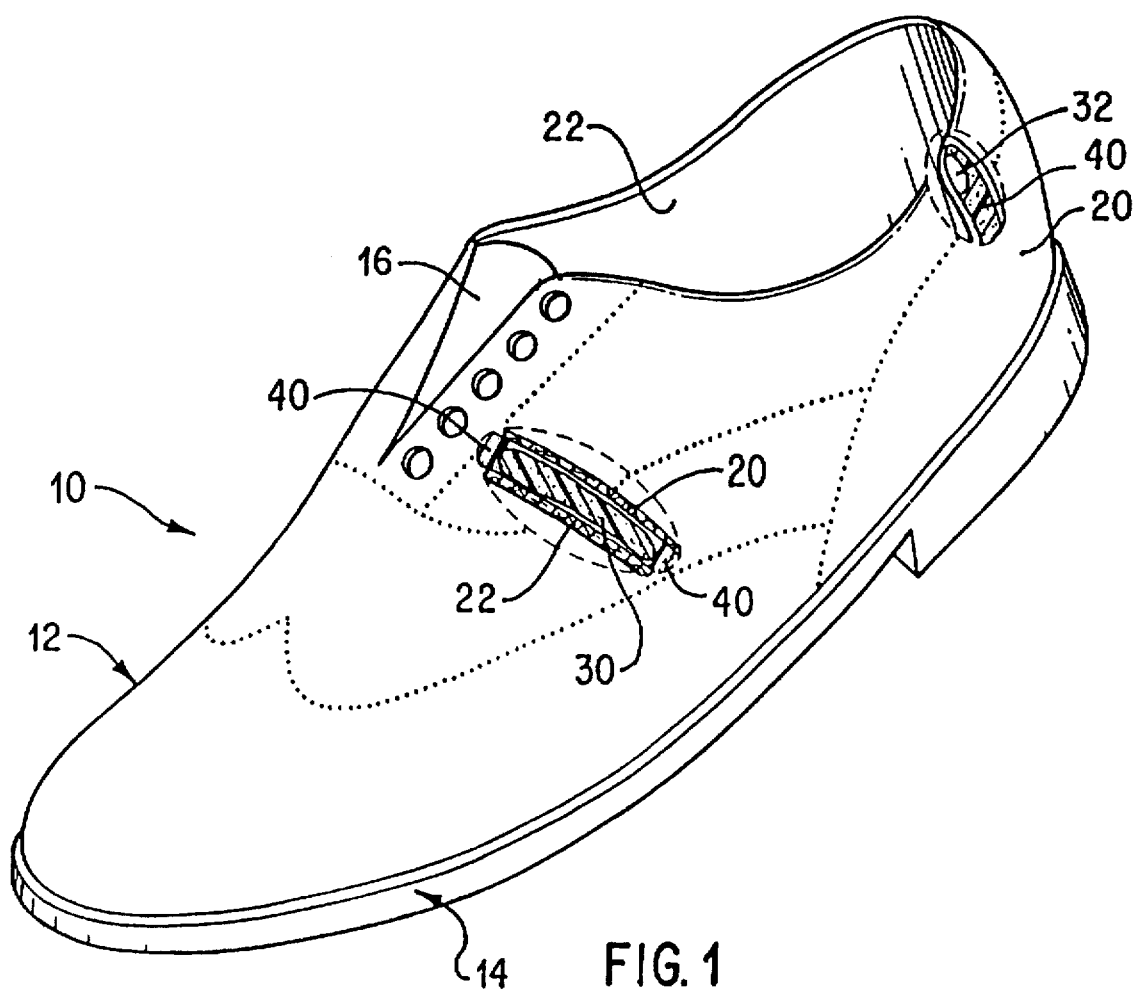
FIG. 1 is a perspective view of a shoe according to the present invention and incorporating a temperature-responsive gel and bladder for the same.

Referring to FIG. 1, the preferred embodiment of the present invention is a shoe 10 that incorporates a shoe upper 12 and a shoe sole 14. Inside the shoe 10 and not shown is a shoe mid-sole. The shoe upper 12 is comprised of an outer layer 20 and an inner layer 22. In between the inner and outer layer is a conforming layer 24 as disclosed in FIG. 2. In the preferred embodiment, the inner layer 22 is made of brush nylon or leather and the outer layer 20 is made of leather.

Figure 2:
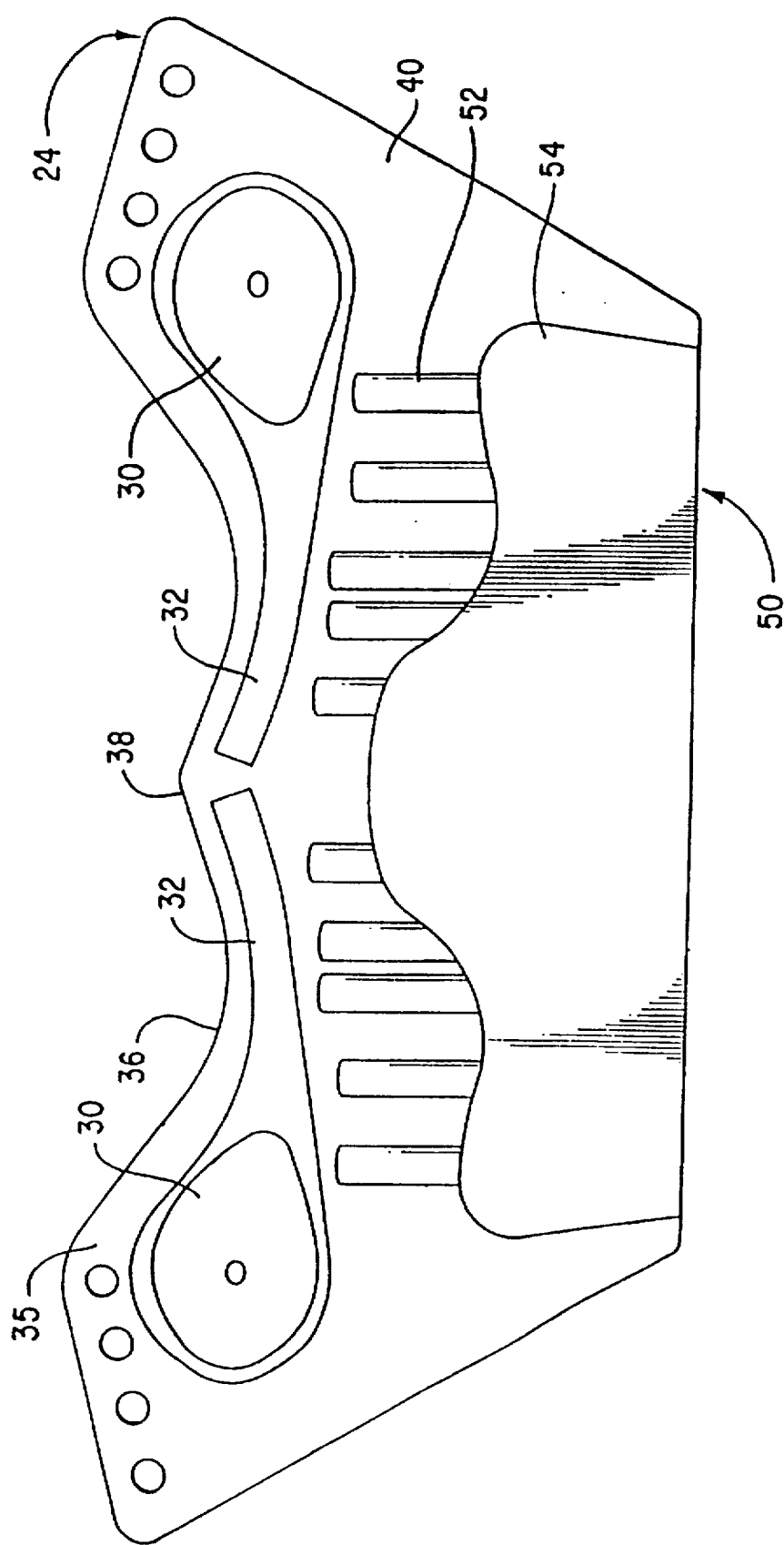
FIG. 2 is a perspective view of a conforming layer of the shoe according to the present invention.

The conforming layer 24 in FIG. 2 is comprised of a first flowable viscoelastic gel portion 50, a second temperature-responsive gel portion 30 and its bladder 32 and a third foam portion 40.

The viscoelastic gel portion 50 is preferably comprised of a flowable viscoelastic gel that is incompressible, i.e., it retains its volume upon compression. Therefore, this material, when compressed by pressure from the foot inserted into the shoe, will flow into another location where the pressure is not as great. In the preferred embodiment, the viscoelastic gel is molded into a body section 54 and a plurality of connected fingers 52. This enables the viscoelastic gel portion 50 to conform to the foot inserted into the shoe. As one skilled in the art would appreciate, the viscoelastic gel portion 50 can be molded in many shapes. However, in the preferred embodiment, the viscoelastic gel portion 50 should be molded into areas of the shoe which correspond to highly contoured areas of the foot. For instance, the heel of the foot generally tends to be very contoured and, therefore, the viscoelastic gel portion 50 is preferably located so that the shoe can substantially conform the foot heel. Thus, the viscoelastic gel portion 50 preferably extends to correspond to the heel bone and malleoli bones of the foot.

Figure 3:
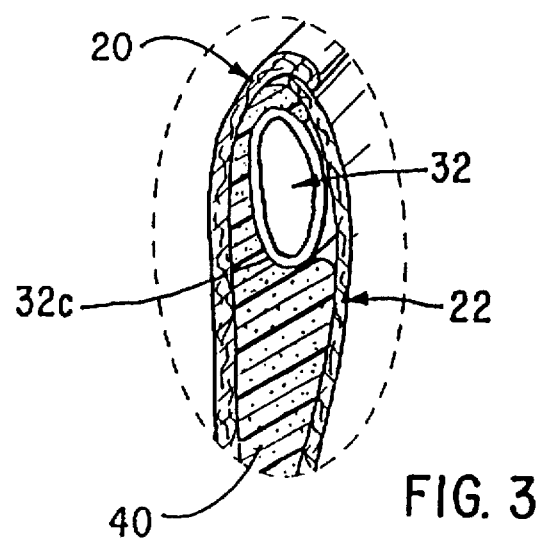
FIG. 3 is an enlarged, cross-sectional view of the temperature-responsive gel and bladder in the shoe upper.

Referring to FIG. 3, an enlarged section of the gel bladder 32 is shown in a cavity 32c formed between the outer layer of shoe material 20 and the inner layer of shoe material 22. In the preferred embodiment, the gel bladder 32 is extended from the temperature-responsive gel portion 30 in the quarter 35, around the collar 36 to the achilles tendon section 38 such that water solution 34 can be distributed from the midsection of the foot towards the heel location and allows the shoe to better conform thereto as the shoe is heated. The gel may be any of the gels disclosed above, but is preferably an environmentally-responsive gel, more preferably a temperature-responsive gel including non-ionic block copolymer.

Regarding the conforming structure in the shoe of FIGS. 1–3, the foam portion 40, which makes up the remainder of the conforming layer 24, can be made of many standard foams that are available. The foam portion 40, however, is preferably made of a memory foam, i.e., a foam that deforms upon compression and, once the pressure is released, will slowly return to its original position. The foam portion 40 is preferably made with a Shore C hardness of approximately 25. The form portion 40 is used to surround and secure the flowable, viscoelastic gel portion 50 and the temperature-responsive gel portion 30.

The foam portion 40 can be comprised of a polyol, antifoam agent, catalyst and isocyanate. Still further, the memory foam can be formed from approximately 58% Arcol LG-168, approximately 1% water, approximately 0.5% Dabco 131, approximately 0.5% Dabco 33LV and approximately 40% Isocyanate 2143L.

Figure 4:
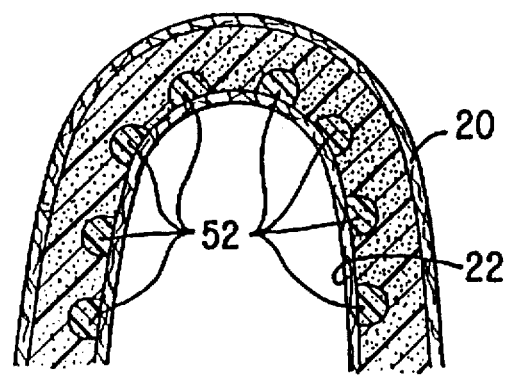
FIG. 4 is a cross-sectional view of the heel of a shoe according to the present invention incorporating viscoelastic gel and foam therein to conform to the foot.

FIG. 4 discloses a cross-section of the preferred embodiment of the shoe heel wherein the plurality of viscoelastic fingers 52 are disclosed extending in the vertical direction up the shoe heel so that the viscoelastic material can conform to the foot that is inserted therein. The viscoelastic fingers 52 are molded and then encapsulated by the foam material 40. The fingers extend into the concave contours of the foot heel to provide a more securing fit.

Figure 5:
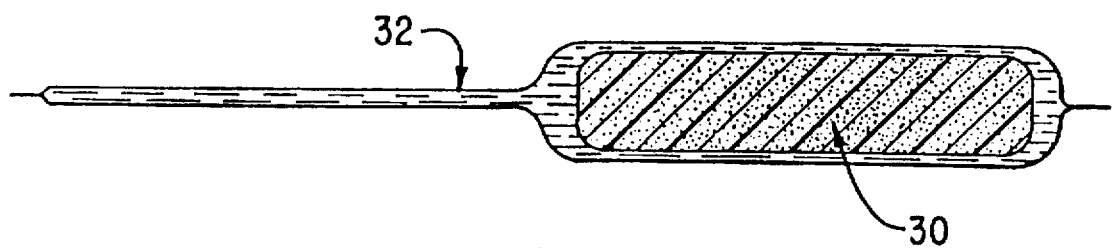
FIG. 5 is a cross-sectional view of the temperature-responsive gel and bladder in the expanded state.
Figure 6:
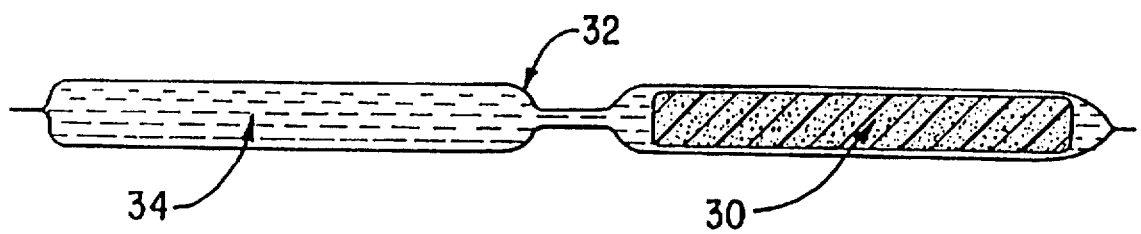
FIG. 6 is a cross-sectional view of the temperature-responsive gel and bladder in the contracted state.

Referring to FIGS. 5 and 6, a temperature-responsive gel and gel bladder 32 are shown in the expanded or cooled state and in the contracted or heated states, respectively. The temperature responsive gel 30 in this embodiment is the type that is expanded at temperatures below the lower critical solution temperature, which should be between approximately 60 to 90 degrees Fahrenheit. In the expanded state the gel contains a water-based solution therein. Thus, the bladder 32 is relatively empty when the gel 30 is expanded. As shown in FIG. 6, the temperature-responsive gel 30 and gel bladder 32 are shown in the contracted or heated state in FIG. 6. The temperature-responsive gel 30 is heated due to the heat emitted from the foot inside the shoe and the water solution 34 is expelled from the gel 30 into the bladder 32. As the temperature-responsive gel 30 is heated above lower critical solution temperature the gel 30 contracts and the water solution 34 therein is expressed from the gel 30 and into the bladder 32. Thus, the water solution 34 dynamically flows to areas under less pressure as the shoe is heated. This enables the shoe to dynamically conform to the foot that is inserted therein.

As the temperature-responsive gel 30 of this embodiment cools when the foot is removed from the shoe, the gel expands and retracts the water solution 34 from the bladder 32. In other words, the temperature-responsive gel 32 returns to its expanded state as shown in FIG. 5. In the preferred embodiment, the environmentally-responsive gel 30 simply returns to its liquid state, without the need for water to retract.

Figure 7:
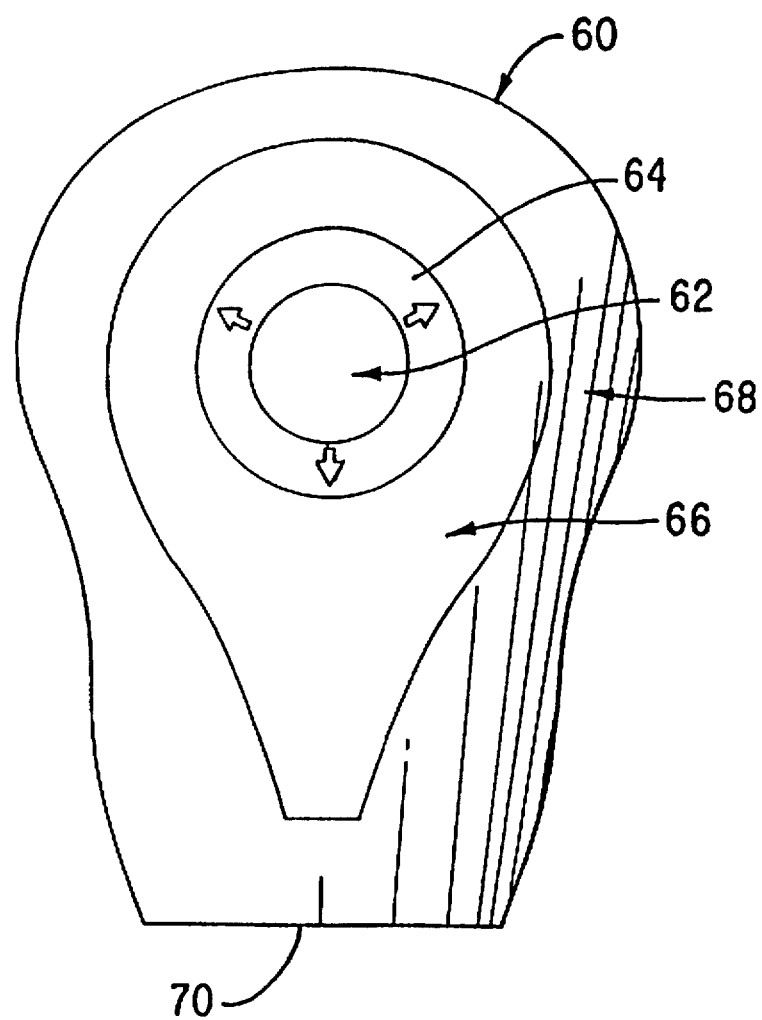
FIG. 7 is a top view of the conforming layer of a shoe tongue according to the present invention.
Figure 8A:
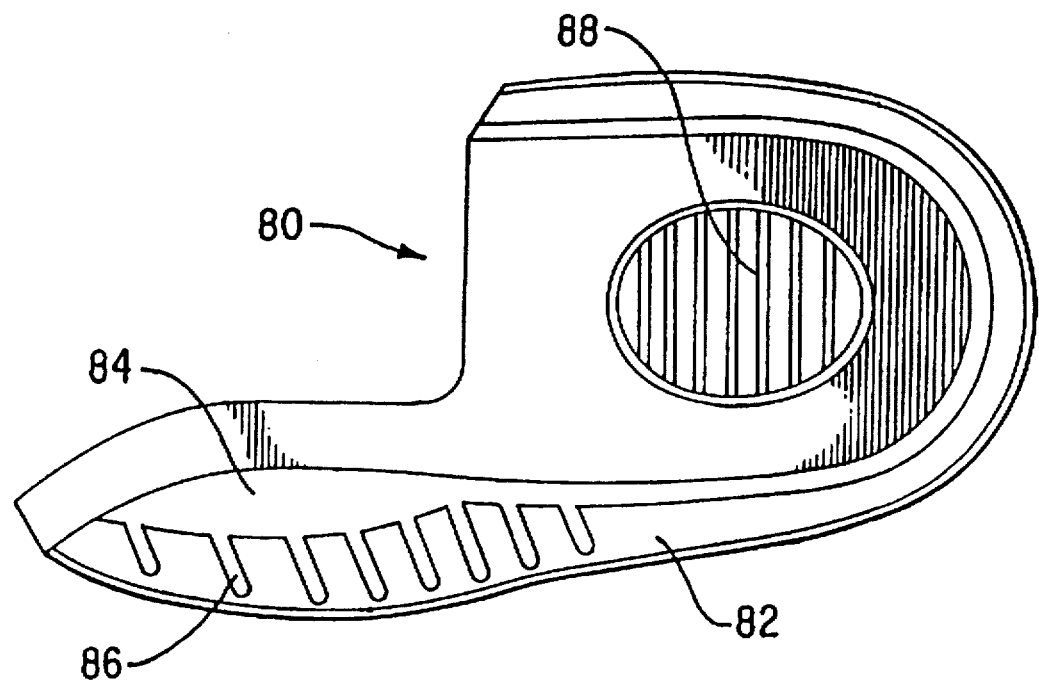
FIG. 8A is a top view of a foot bed according to the present invention.
Figure 8B:
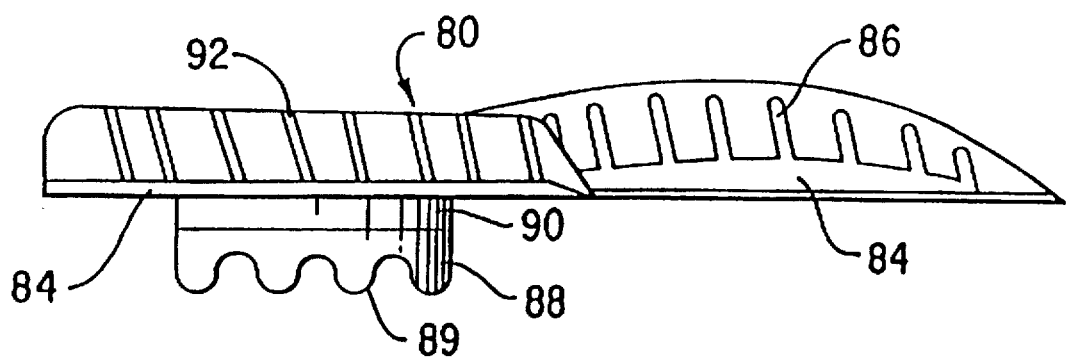
FIG. 8B is a side view of a foot bed according to the present invention.
Figure 8C:
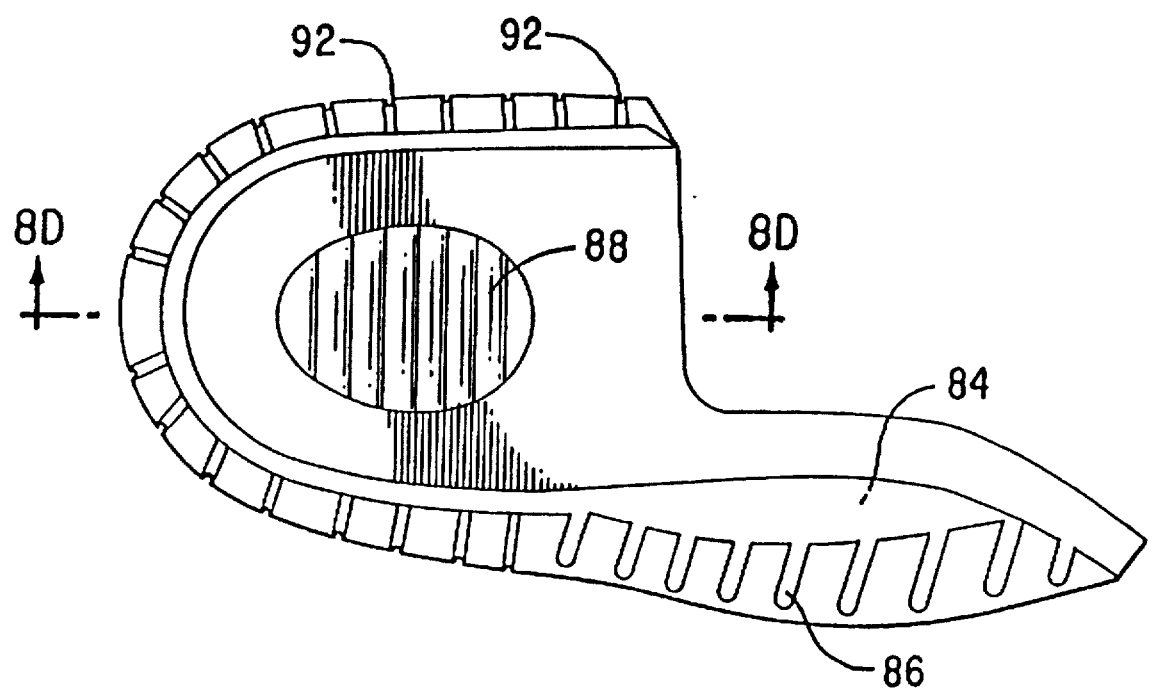
FIG. 8C is a bottom view of a foot bed according to the present invention.
Figure 8D:
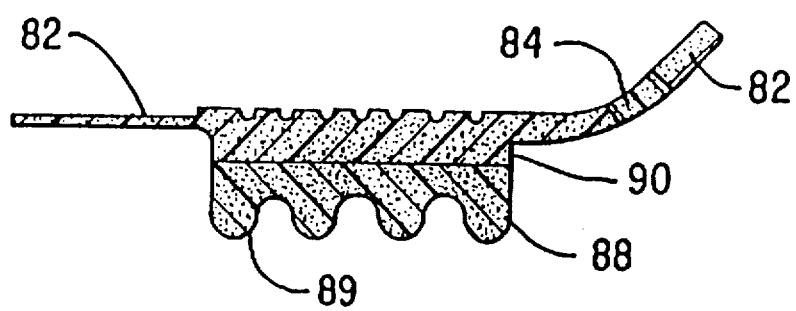
FIG. 8D is a sectional view taken along the line 8D—8D in FIG. 8A.

FIG. 7 discloses the preferred embodiment of the shoe tongue conforming layer 60. The shoe tongue 16 is shown in FIG. 1 and is attached to the shoe 10 such that it covers a portion of the top of the forefoot that is inserted into the shoe 10. The conforming layer 60 is preferably comprised of a temperature-responsive gel portion 62 including gel bladders 64 extending thereabout, a viscoelastic gel portion 66 and a foam portion 68 enveloping both of the gel sections 62 and 64. The tongue conforming layer 60 is enveloped by an inner layer and an outer layer (not shown) substantially similar to the inner and outer layers of the shoe upper discussed above. The shoe tongue is then attached to the shoe upper along the bottom edge 70.

FIGS. 8A–8D disclose a foot bed 80 embodiment incorporating a foam main body section or foam pad 82, a plurality of relatively soft, flowable viscoelastic gel sections 84, relatively soft, flowable viscoelastic gel fingers 86 and a relatively hard, viscoelastic gel heel plug insert 88. Again, the viscoelastic gel sections could be located anywhere in the foot bed, but are preferably placed such that the relatively soft, flowable gel corresponds to those sections where the foot has the greatest contours and the relatively hard, higher viscosity gel corresponds to where the foot is subject to the greatest impact from walking, running or other activity. Thus, in the preferred embodiment, the viscoelastic gel section 84 and fingers 86 correspond to the foot arch area and extend around to the areas that correspond to the foot heel. The gels are again made to a –000 hardness between 10 and 100 and preferably in the range of 40 to 60.

The viscoelastic gel heel plug insert 88 is preferably located in the bottom of the foot bed to provided cushioning and shock absorption for the foot heel. This insert is preferably made of a gel having a –000 hardness between 20 and 60 and more preferably of approximately 40 to 50. The viscoelastic heel plug insert 88 preferably includes a plurality of ribs 89 to provide additional cushioning and absorption of shock for the foot heel.

The foot bed 80 also includes a foam heel plug 90 which is preferably formed of the same foot bed foam as the main body 82.

The preferred foot bed 80 also includes a plurality of grooves 92 that allow the flowable viscoelastic gel to extend up the back of the heel and that increase the flexibility of the foot bed 80. These grooves 92 are shown as extending around the outer edge of the foot bed and substantially in he vertical direction to provide proper flexibility of the foot bed.

FIGS. 9A–B disclose a second embodiment of a foot bed according to the present invention. The foot bed 81 includes the highly flowable viscoelastic section 84 and fingers 86 and the harder viscoelastic heel plug 88. The foot bed 81 further includes a metatarsal pad 94 with ribs 96 for providing cushioning to the foot. Still further, the foot bed includes wing members 98 with gel sections 100. These gel sections 100 can be made of the temperature-responsive gel and the water solution therein can flow in fingers 102 or the gel sections 100 and the fingers 102 can be made of the highly flowable viscoelastic gel. This provides a customized fit for the fore foot. Moreover, the wing members 98 can be provided with different thicknesses so that the customer can chose one that provides the most comfortable fit.

Figure 10:
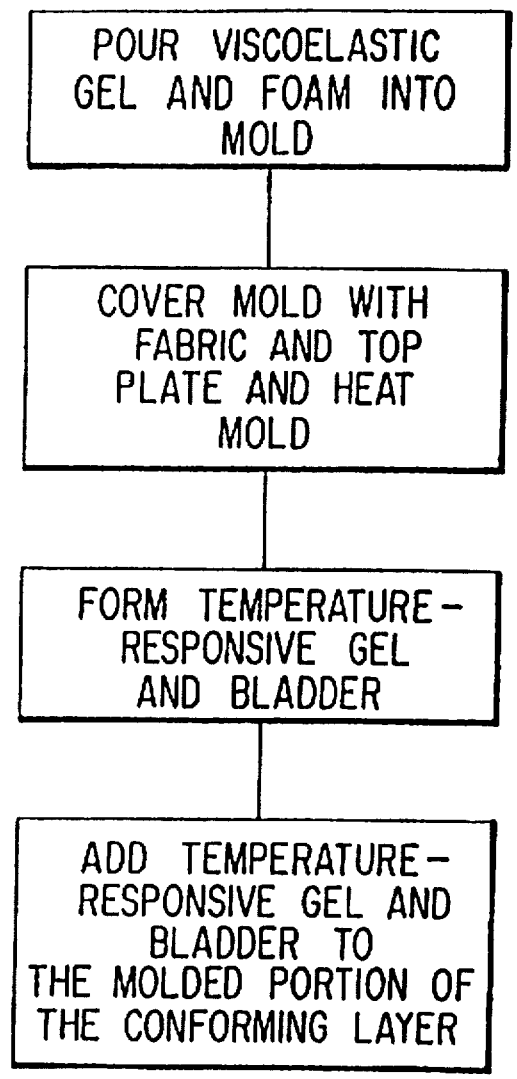
FIG. 10 is a flow chart of the method used to construct the shoe upper according the present invention.

FIG. 10 presents a flow chart of a method of forming a customized fitting, or conforming, shoe. The steps include forming a conforming shoe upper, as shown in FIG. 2, or tongue, as shown in FIG. 7, by pouring flowable, viscoelastic gel and foam ingredients into a mold to form a portion of the conforming layer of the shoe upper or tongue. Preferably, the viscoelastic gel is poured into the proper locations of a mold and then the memory foam ingredients are poured into the mold to fill the same. The inner layer of the shoe can be placed in the bottom of the mold before the gel and foam are poured therein such that the gel is formed on the inner layer. However, the preferred method is to attach the shoe inner layer to the top plate of the mold. The mold is closed with the top plate and the mold is heated. Heating can be accomplished by heating either the mold or the mold top or both to solidify the gel and foam. Thus, the flowable, viscoelastic gel and foam are molded onto the shoe inner layer. Then, a temperature-responsive gel and bladder containing the same may be placed in proper locations and an outer layer can be attached to the opposite side of the conforming layer from the inner layer.

The temperature-responsive gel is formed separately from the viscoelastic gel and foam. The temperature-responsive gel cassette and bladder are formed in a separate mold. A first layer of plastic film is placed into the mold. Preferably, the plastic film is about 10 mils thick and is a polyurethane film or a laminated film such as SURLYN®/polyethylene laminated film, to increase the water retention in the gel bladder. A preferred plastic film is Exxon Exact film X-EMB-676. This film is vacuum formed over a cavity that is approximately 40 to 80 thousandths of an inch thick. Then, the die cut responsive gel material is added at a relatively low temperature, preferably around 0 degrees Celsius to keep the gel saturated with the water-based solution. Then, a flat top layer of plastic film is laid over the mold. The top layer is preferably about 5 mils thick and formed of a polyurethane film or a laminated film such as a SURLYN®/polyethylene laminate. The top and bottom layer films are then bonded by radio frequency bonding or other method.

The conforming layer of the shoe upper or tongue is completed by placing the temperature-responsive gel and bladder containing the same in the proper locations and attaching the shoe outer layer to the inner layer such that the conforming layer is between the outer layer and the inner layer. After the shoe upper or tongue is formed, it is attached to the shoe in an ordinary manner.

The present invention is also directed to a method of forming a shoe foot bed comprising the steps of pouring relatively hard, high viscosity, viscoelastic gel into the foot bed heel plug section of a mold, pouring a relatively soft, highly flowable, viscoelastic gel into proper locations of the mold for providing a conforming fit and comfort, pouring polyurethane foam or memory foam ingredients into the mold, covering the mold with the mold top, which can have the foot bed cover fabric attached thereto, and heating the mold.

The invention also includes another method that can be used to form adjacent regions of foam (polyurethane or other foam) and viscoelastic gel material. In this method, the foam and gel can be chemically bonded or unbonded and merely adjacent. More particularly, the method includes the steps of pouring foam material into a mold. Then, viscoelastic gel with unexpanded microspheres can be injected into the mold cavity by a separate operation. The mold is then heated to a temperature above the expansion temperature of the microspheres. Depending on the temperature the mold is heated to, the expansion of the microspheres can be controlled to vary the pressure in the molded part.

Figure 11:
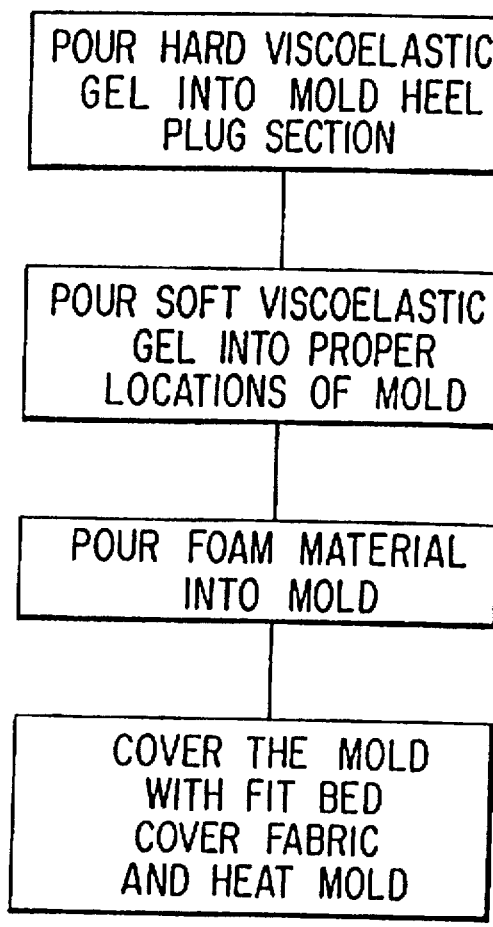
FIG. 11 is a flow chart of the method used to construct the foot bed according to the present invention.

FIG. 11 is a flow chart that refers to a shoe foot bed, as shown in FIGS. 8A–8D or 9A and 9B, formed by pouring relatively hard, high viscosity, viscoelastic gel into the foot bed heel plug section of a mold, pouring a relatively soft, low viscosity, viscoelastic gel into desired locations that can include the arch area and sections around the foot heel and pouring the foam ingredients into the mold and covering the mold with the mold top with the foot bed cover fabric attached thereto and heating the mold.

The invention is further directed to a shoe which conforms to the foot by providing a foot bed comprised of viscoelastic gels and/or temperature-responsive gels therein to conform to and provide cushioning for the foot bottom. Preferably, the shoe foot bed is formed of a low-flowable, harder gel such that it provides supportive cushioning for the foot bottom, for absorbing the impacts of walking and the like. Further, the foot bed should provide a soft, highly flowable gel to provide custom fit and comfort for the foot and, particularly for the foot arch and heel. This is preferably accomplished with the proper placement of various elastomeric and temperature-responsive gels having proper hardnesses and viscosities to provide comfortable and supportive mediums against the foot. Still further, the foot bed is formed with the combination of gels encapsulated in a polyurethane foam or preferably a memory foam matrix. This provides customizable fit, comfort, cushioning and stability all in the same system.

Figure 12:
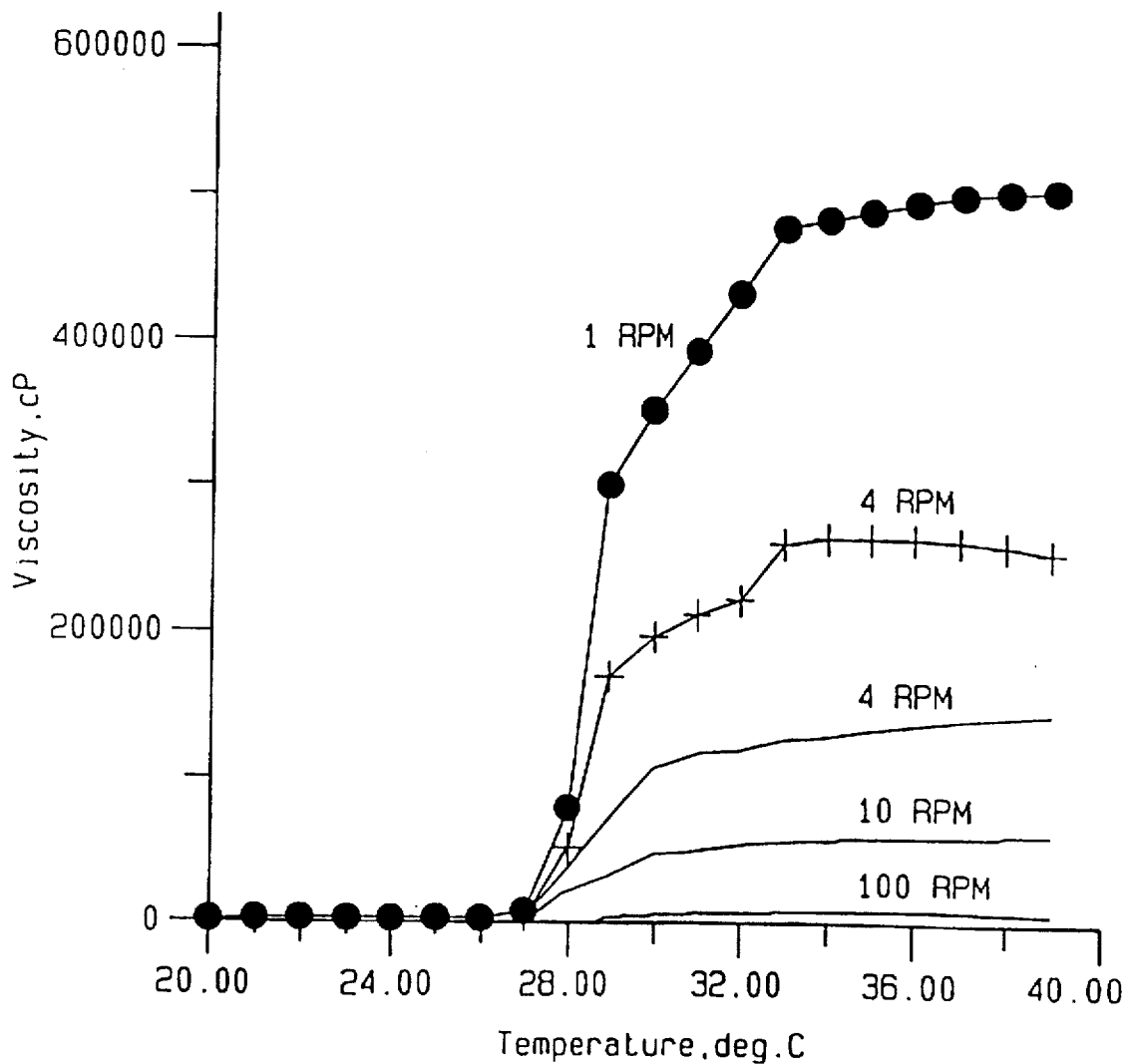
FIG. 12 is a graph of viscosity versus temperature for a temperature responsive gel according to the invention.
Figure 13:
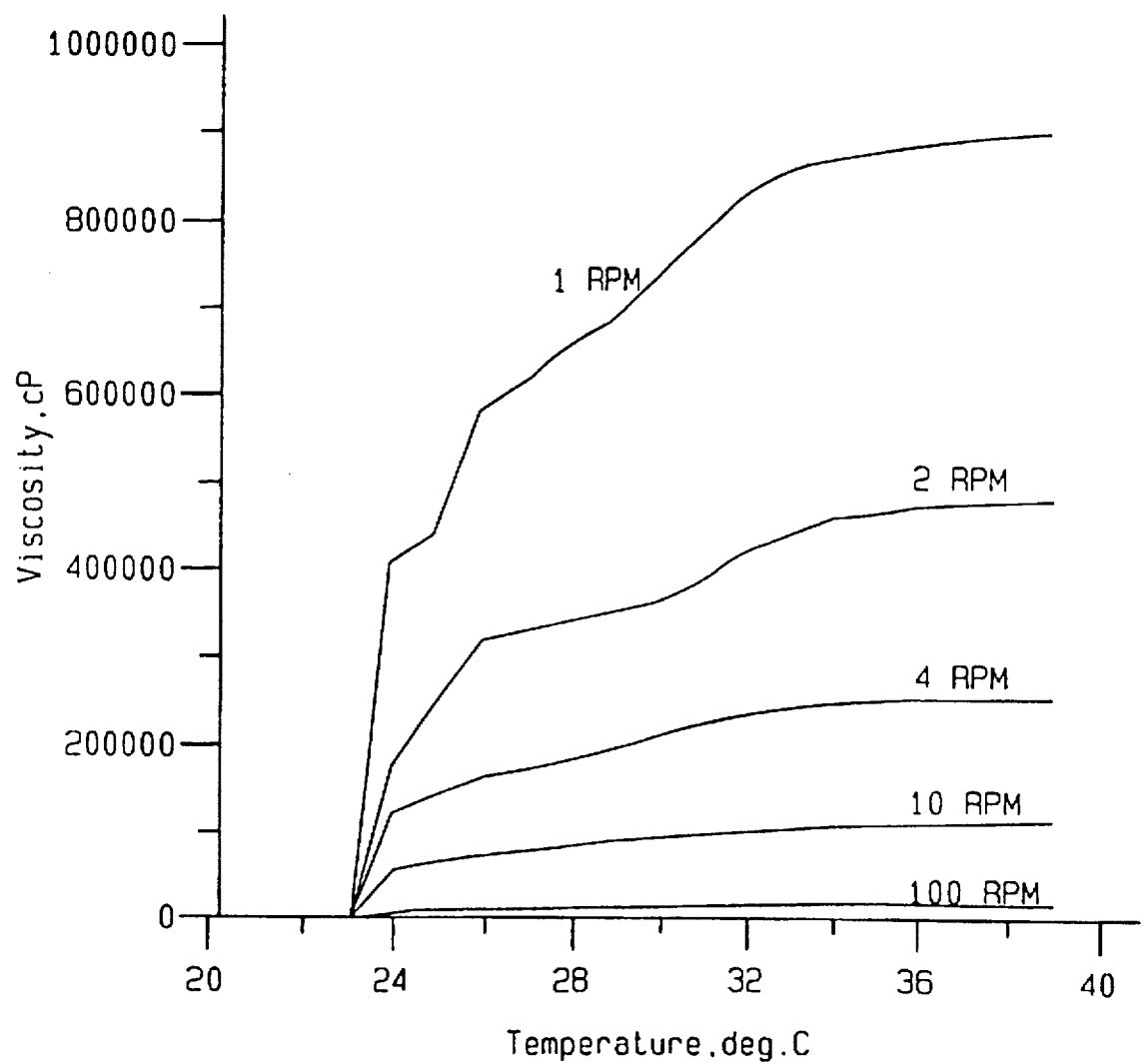
FIG. 13 is a graph of viscosity versus temperature for a temperature responsive gel according to the invention.

The transition from a liquid to a gel can be seen in FIGS. 12 and 13. FIG. 12 is a mixture of 16.5% PEO-PPO in water, as measured on a Brookfield viscometer at rotational speeds of 1 rpm (the upper curve) to 100 rpm (the lower curve). The graph shows a clear liquid to gel transition at 27° C. FIG. 13 shows a lower transition of 23° C. to a firmer gel.

Figure 14:
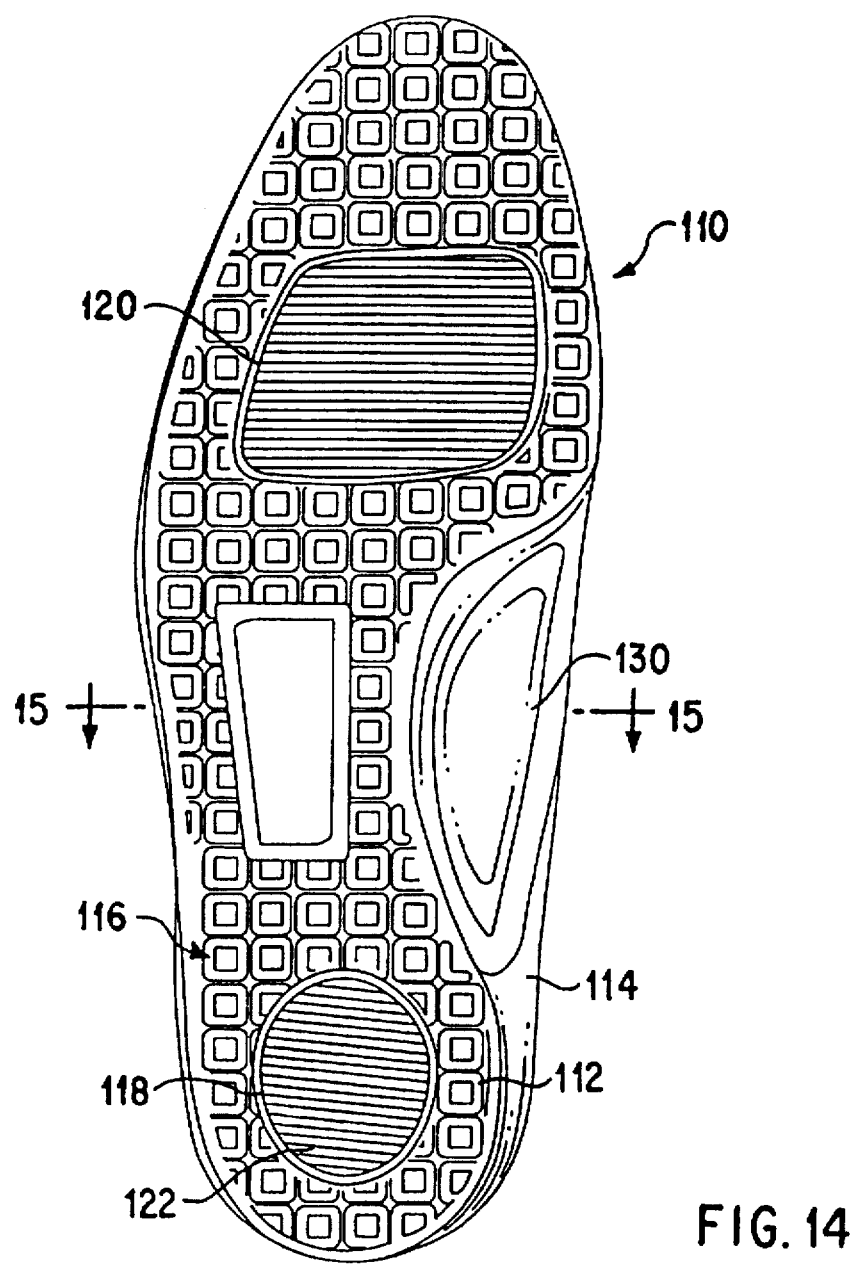
FIG. 14 is a bottom view of a foot bed according to the present invention.

Referring to FIG. 14, the bottom surface of another foot bed 110 is shown. The foot bed 110 is comprised of middle layer 114 and ribs 112 formed of a polyurethane foam. On the bottom surface 116 are two pads 118 and 120 formed of a polyurethane viscoelastic elastomer. Pad 118 is located in the heel section of the foot bed 110 to correspond to the heel of the user and provide cushioning therefor. The pad 120 is in the metatarsal section of the foot bed 110 to correspond to the metatarsal pad of the user's foot to provide cushioning therefor. Both pads 118 and 120 include a plurality of ribs 122.

Figure 15:
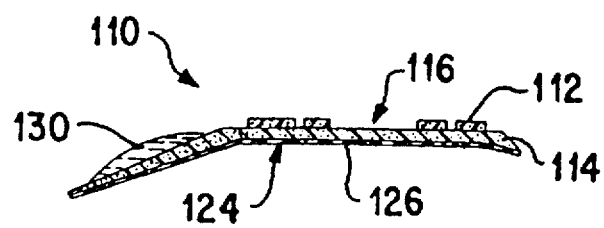
FIG. 15 is a sectional view taken along line 15—15 in FIG. 14.
Figure 16:
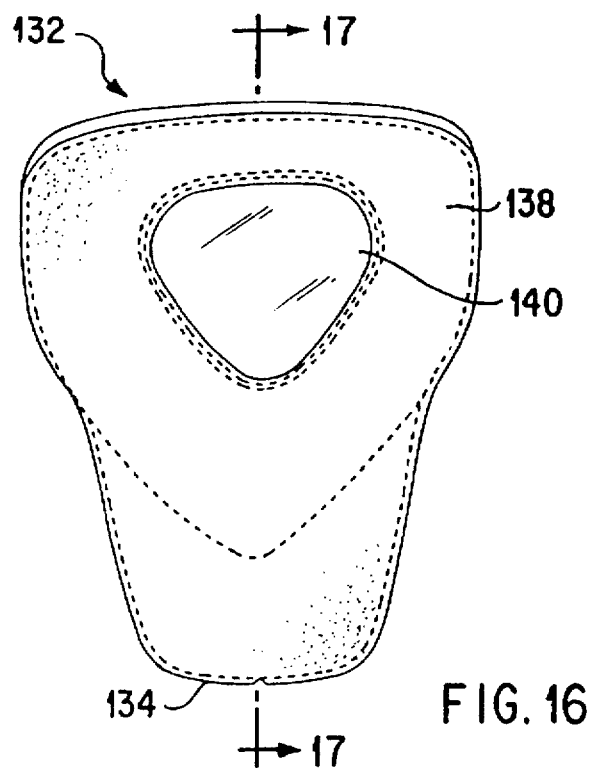
FIG. 16 is a top view of a shoe tongue according to the present invention.
Figure 17:
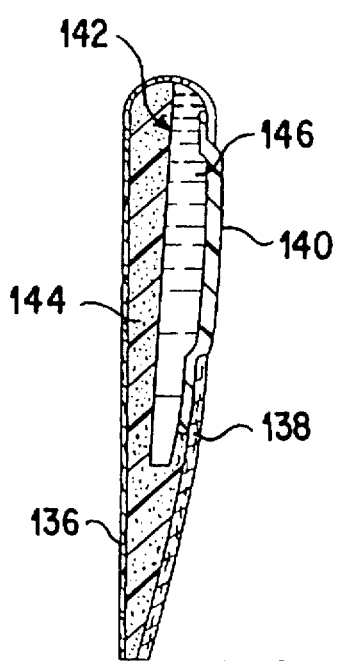
FIG. 17 is a sectional view taken along line 17—17 in FIG. 16.

The foot bed 110 also includes a top surface 124 as shown in FIG. 15. The top surface can be covered with a brush nylon, leather or textile layer 126.

The foot bed 110 also includes a bladder 130 which is filled with a temperature-responsive gel. The bladder is secured to the underside of the middle layer 114 in the arch area of the foot bed 110 to correspond to the arch of the user's foot and provide a snug fit and support therefor. Preferably, the temperature-responsive gel has a low viscosity, such as a liquid, at room temperature and becomes a gel with a much greater viscosity between room temperature and body temperature. More preferably, the temperature-responsive gel is a liquid or has viscosity less than 5000 cps at room temperature as shown in FIG. 15 and becomes a gel having a viscosity greater than 500,000 cps at a temperature approximately equal to body temperature.

In the preferred embodiment of foot bed 110, the temperature-responsive gel is in a liquid state and is highly flowable when the user first inserts her foot into a shoe incorporating the foot bed 110. In this manner, the temperature-responsive gel can flow to conform to the user's foot. As the user's foot heats the inside of the shoe having the foot bed 110 therein, the temperature-responsive gel increases in viscosity to provide fit and support for the foot. After the user's foot is removed, the temperature-responsive gel will cool to room temperature and return to the highly flowable or liquid state.

Referring to FIGS. 16–19, a tongue 132 for a shoe according to the present invention is shown. The tongue 132 is comprised of a bottom edge 134, which attaches to the shoe body (not shown). The tongue extends from the bottom edge and covers the upper surface of the user's foot. The tongue 132 often is interposed between the user's foot and shoe laces.

The tongue 132 is comprised of an inner layer 136 and an outer layer 138. The inner and outer layers are preferably comprised of leather. The outer layer 138 can further include a window 140 comprised of a transparent material such as polyvinylchloride (PVC).

Between the inner and outer layers 136 and 138 is a conforming layer 142 to provide fit, comfort and support for the upper surface of the user's foot. The conforming layer 142 is preferably comprised of a foam portion 144 and a gel portion 146. The foam portion 144 is preferably made from a memory foam such as those discussed above. The gel portion 146 is preferably made from an environmentally-responsive gel or a viscoelastic gel such as those discussed above. In the most preferred embodiment, the gel portion 146 is made from an environmentally-responsive gel that has a low viscosity (less than 5000 cps) at room temperature and a much greater viscosity (greater than 500,000 cps) at body temperature. Preferably, the gel is comprised of the PEO-PPO block polymer and water mixture as discussed herein.

Figure 18:
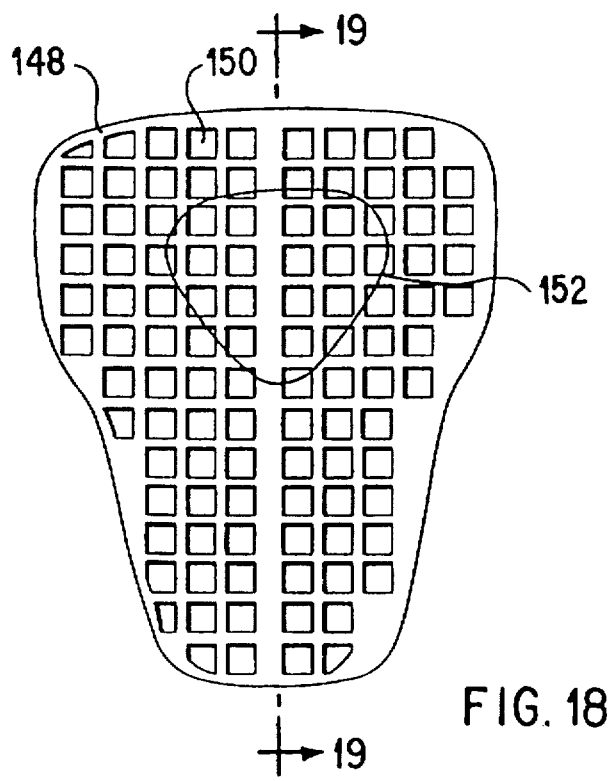
FIG. 18 is a top view of another embodiment of a shoe tongue inner layer.
Figure 19:
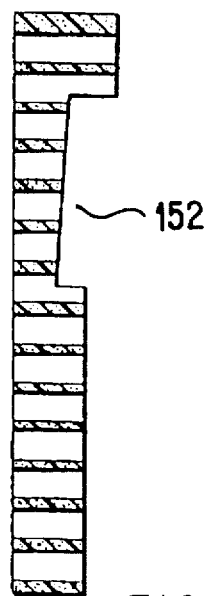
FIG. 19 is a sectional view taken along line 19—19 in FIG. 18.

FIGS. 18 and 19 disclose a second embodiment of the foam portion 148 of the tongue. The foam portion in this embodiment is formed with a plurality of apertures 150 therethrough. The apertures 150 are square in shape and reduce the weight of the tongue and allow air to more easily flow through the tongue. The tongue includes a cut out portion 152, in which the gel portion (not shown) can be inserted.

FIG. 20 discloses the design features and stitching 141 for an embodiment of the outer layer 138 of the shoe tongue 132. The outer layer 138 can further include a window 140 comprised of a transparent material, such as polyvinylchloride (PVC). The outer layer is preferably made of leather, and is optionally made of two layers of leather connected at a centerline 143 to provide bending flexibility. The shoe tongue 132 optionally has a pull tab 139 to assist a person wearing the shoe in placing the shoe comfortably on their foot. The shoe tongue 132 is preferably bendable around the foot along a vertical axis from the bottom edge 134 to the optional pull tab 139.

FIG. 21 is a cross-sectional view of the shoe tongue 132, along line 23—23 of FIG. 22, according to the present invention. A temperature-responsive gel bladder 146 is attached to one big foam portion 144,148. Optionally, as depicted, there may be an additional piece of foam attached adjacent to the bladder 146 to assist in attaching the bladder to the foam. The foam portion 144,148 may be solid memory foam 144, but it is preferably grid foam 148 with apertures 150. The shoe tongue bladder 146 is attached by at least an adhesive, such as glue or double sided tape, or by the stitching of the outer layer 138 onto the foam portion 148. The outer layer 138 is preferably made of leather and optionally includes a window 140 as described above. The outer layer preferably assists in ventilation via perforations in the outer layer (not shown). The outer layer may be one sheet of material, but is preferably in two parts attached at a centerline 143 to assist in conforming the shoe tongue to the wearer's foot. The inner layer 136 is leather or a soft textile layer, such as a woven polyester or nylon material or TACLINER®.

In a preferred embodiment (not shown), the environmentally responsive gel bladder is located inside a pocket of a unitary layer of foam to avoid the need for other means of attaching the bladder to the foam. The bladder extends about ½ to ⅞ the length, and more preferably extends about ⅔ to ⅝ the length of the shoe tongue 132.

FIG. 22 is a top view of the shoe tongue 132 outer layer 138 with a partial cutaway and an optional window 140 as described above. The tongue has an inner layer 136 (not shown) and an outer layer 138 with a conforming layer in between. In a preferred form, the inner layer 136 (not shown) is made of leather or of a soft textile lining, such as TACLINER®. The conforming layer 142 is preferably comprised of a foam portion 148 and a gel portion 146. The foam portion 148 is preferably made from a memory foam such as those discussed above. The shoe tongue 132 preferably has a pull tab 139 and uses grid mesh foam 148 with apertures 150 to assist in ventilation. The gel portion 146 is preferably made from an environmentally-responsive gel or a viscoelastic gel such as those discussed above. In the most preferred embodiment, the gel portion 146 is made from an environmentally-responsive gel that has a low viscosity (less than 5,000 cps) at room temperature and a much greater viscosity (greater than 1,000,000 cps) at body temperature. Preferably, the gel is comprised of the PEO-PPO block polymer, water and liquid detergent mixture as discussed herein.

Figure 23:
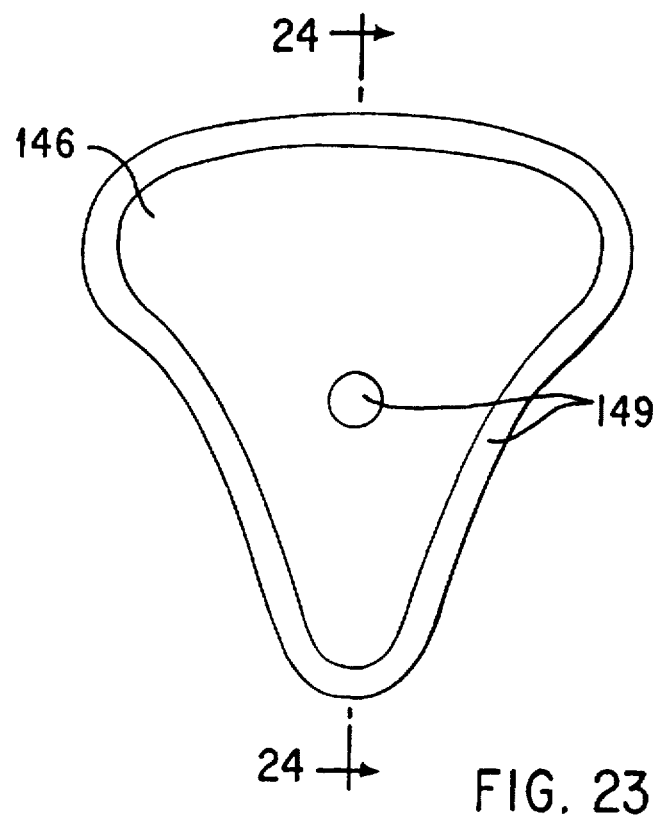
FIG. 23 is a top view of a preferred embodiment of a shoe tongue bladder according to the present invention.

FIG. 23 is a top view of a preferred embodiment of a shoe tongue bladder 146 according to the present invention. The inner and outer layers of any bladder in the present invention may be attached by any attaching means, such as any of a variety of adhesives. It is preferred that the layers are attached by means of radio frequency sealing, such as that done by Plastics Welding Technology of Indianapolis, IN.

Figure 24:
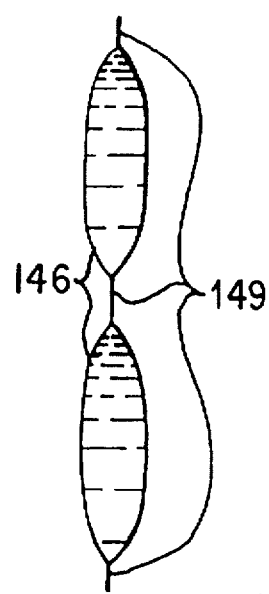
FIG. 24 is a cross-sectional view of a preferred embodiment of a bladder along line 24—24 according to the present invention.

FIG. 24 is a cross-sectional view of this preferred embodiment along line 24—24. The gel bladder preferably contains at least one radio frequency seal 149, as described above, to enhance flexibility of the shoe tongue bladder 146. Most preferably, there is one radio frequency seal 149 located in the center of the bladder. The layers of the bladder are also attached by radio frequency sealing 149.

Figure 25:
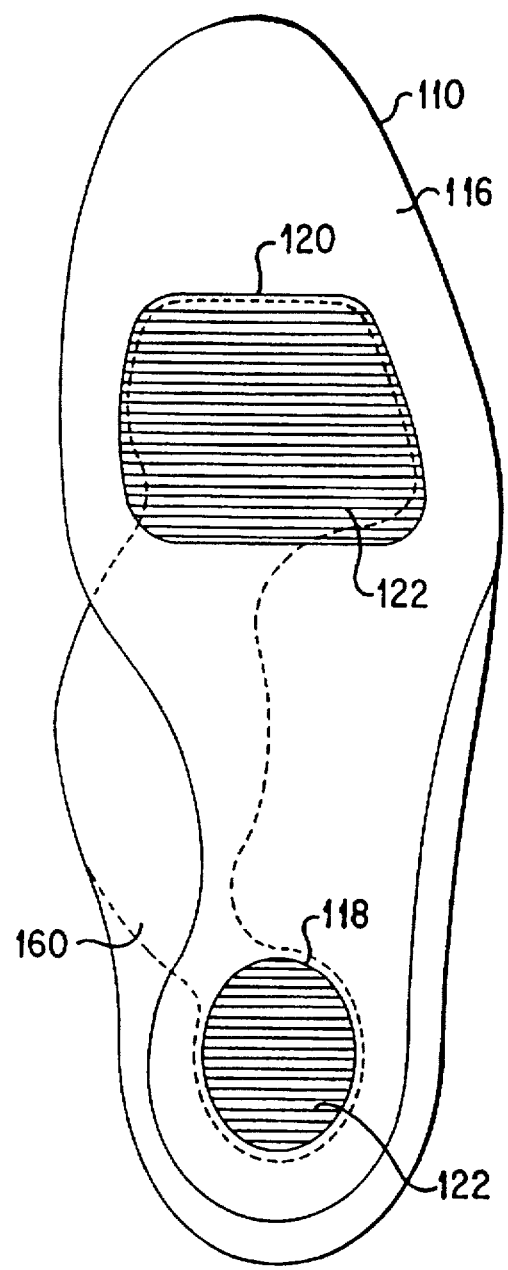
FIG. 25 is a bottom view of the foot bed according to the present invention.

FIG. 25 is a bottom view of the bottom surface 116 of a foot bed 110 according to the present invention. On the bottom surface 116 are two pads 118 and 120 formed of a viscoelastic elastomer, such as a polyurethane foam or gel. Pad 118 is located in the heel section of the foot bed 110 to correspond to the heel of the user and provide cushioning therefor. The pad 120 is in the metatarsal section of the foot bed 110 to correspond to the metatarsal pad of the user's foot to provide cushioning therefor. Both pads 118 and 120 include a plurality of ribs 122. An environmentally-responsive gel bladder 160 located adjacent to the two pads runs from next to one pad to the other pad across the arch of the shoe as depicted. The environmentally-responsive gel in the bladder 160 is preferably colored, and more preferably colored blue. The viscoelastic elastomer pads are preferably transparent and also preferably colored, and more preferably colored yellow, such that when the environmentally-responsive gel flows next to the pads a color mixture provides a new color. The preferred embodiment above, with blue gel and yellow pads, would result in a green color being obtained.

Figure 26:
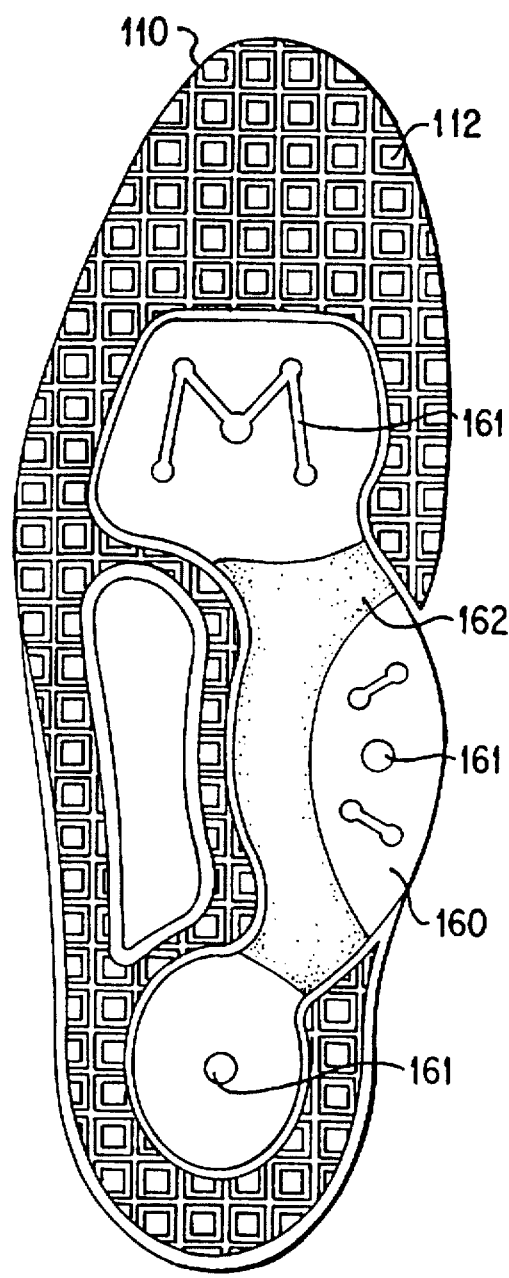
FIG. 26 is a bottom view of the foot bed with a gel bladder and a fabric or adhesive layer according to the present invention.

FIG. 26 is a bottom view of the foot bed 110 with a gel bladder and a fabric or adhesive layer 162 according to the present invention. The foot bed 110 contains ribs 112 formed of a polyurethane foam. The foot bed 110 also includes a top surface 124 (not shown here) as shown in FIG. 15. The top surface can be covered with a brush nylon, leather or textile layer 126. The foot bed 110 also includes a bladder 130 which is filled with a temperature-responsive gel. The bladder is secured to the underside of the middle layer 114 in the arch area of the foot bed 110 to correspond to the arch of the user's foot and provide a snug fit and support therefor. Preferably, the temperature-responsive gel has a low viscosity, such as a liquid, at room temperature and becomes a gel with a much greater viscosity between room temperature and body temperature. More preferably, the temperature-responsive gel is a liquid or has viscosity less than 5,000 cps at room temperature as shown in FIG. 15 and becomes a gel having a viscosity greater than 500,000 cps at a temperature approximately equal to body temperature.

In the preferred embodiment of foot bed 110, the temperature-responsive gel is in a liquid state and is highly flowable when the user first inserts her foot into a shoe incorporating the foot bed 110. In this manner, the temperature-responsive gel can flow to conform to the user's foot. As the user's foot heats the inside of the shoe having the foot bed 110 therein, the temperature-responsive gel increases in viscosity to provide fit and support for the foot. After the user's foot is removed, the temperature-responsive gel will cool to room temperature and return to the highly flowable or liquid state.

Figure 27:
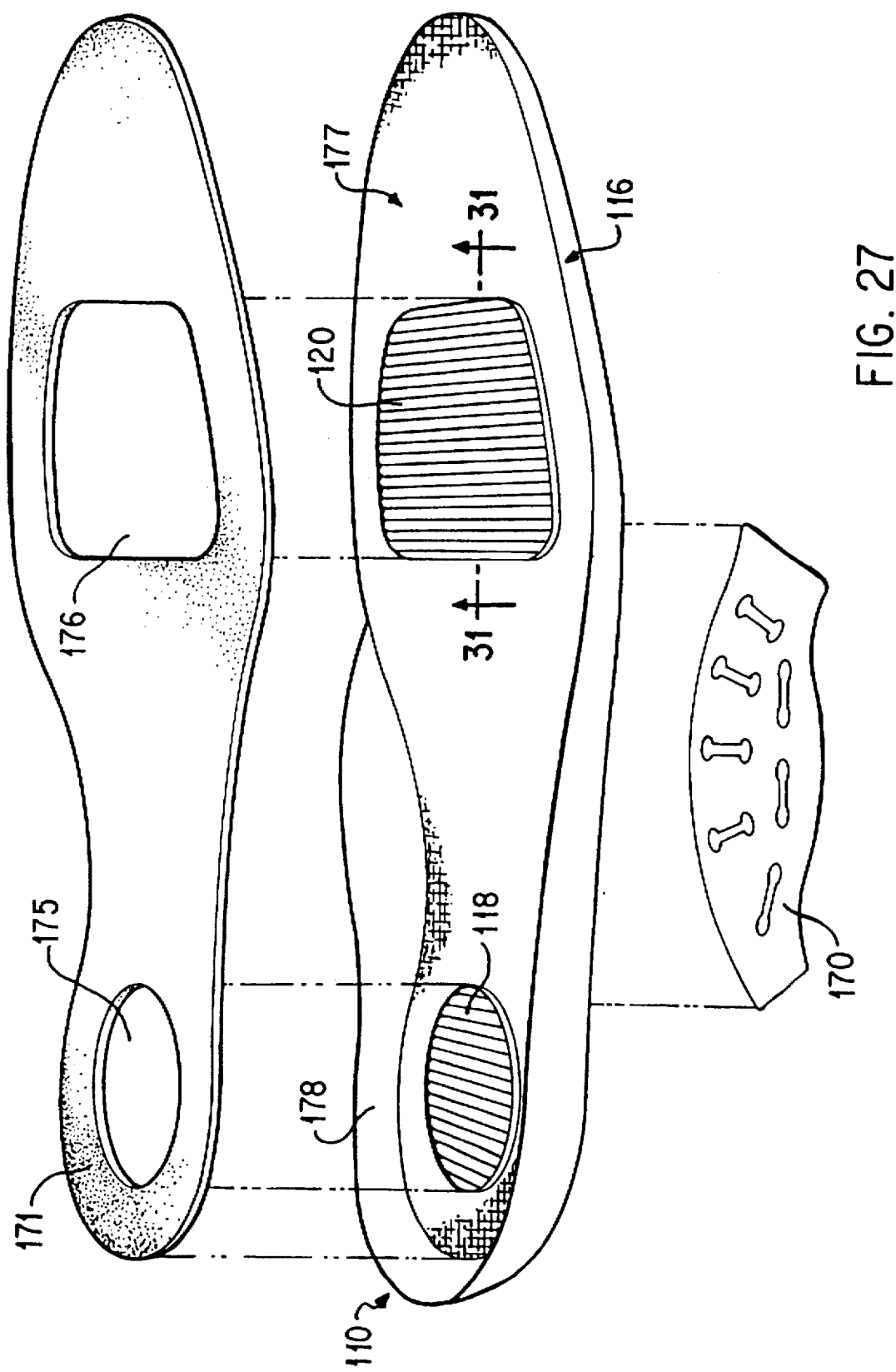
FIG. 27 is an exploded view of the foot bed with the arch gel bladder according to the present invention.

FIG. 27 is an exploded view of the foot bed with an arch gel bladder 170 according to the present invention. This figure depicts an embodiment of the invention where the environmentally-responsive gel bladder 170 resides in the arch area only. The gel bladder is located adjacent to the polyurethane base 116 of the foot bed 110. Viscoelastic elastomer plugs, preferably of polyurethane, are located in the heel 118 and under the forefront 120 of the foot. The polyurethane base 116 may optionally be provided with an environmentally-responsive gel wing 178 that cups the rearward sides and rear of the foot to provide improved comfort and fit over a conventional shoe. The optional wing 178 is raised slightly above the polyurethane base 116 and preferably terminates about halfway forward in the shoe. Optionally, the wing 178 extends even further forward (not shown) to the middle of the forefront portion of the polyurethane base 116. Adjacent to the polyurethane base 116 and plugs 118 and 120 is a woven textile layer 177, preferably of TACLINER®, having top and bottom surfaces. The portion of this layer on the plugs is raised compared to the portion contacting the polyurethane base 116. The bottom surface of the textile layer 177 contacts the polyurethane base 116. The top surface of the textile layer 177 contacts a leather layer 171 having cutouts 175 and 176 which substantially correspond to the size and shape of the viscoelastic plugs 118 and 120, respectively. The topmost portion of the leather layer 171 is flush with the top surface of the textile layer 177.

Figure 28:
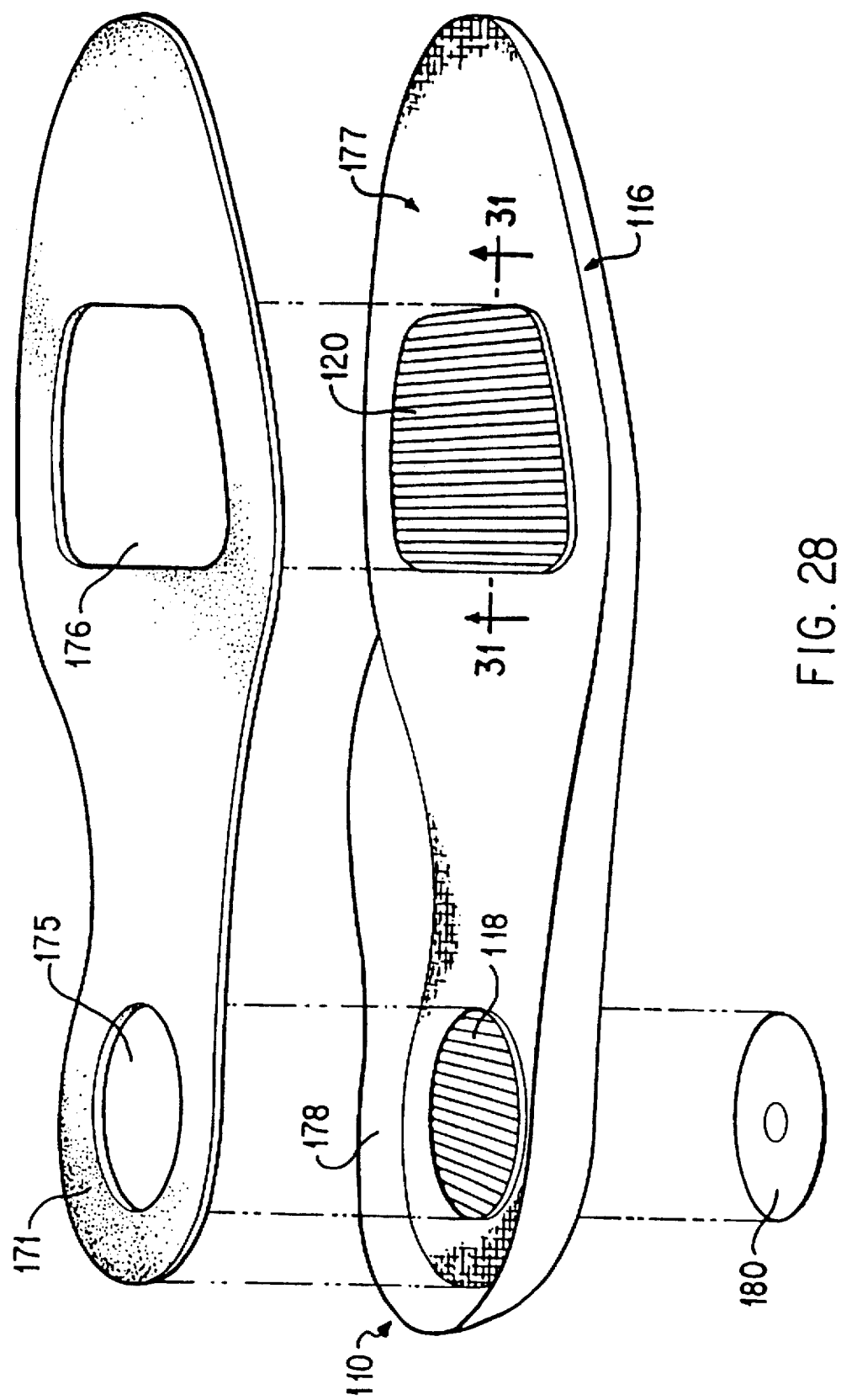
FIG. 28 is an exploded view of the foot bed with the heel gel bladder according to the present invention.
Figure 29:
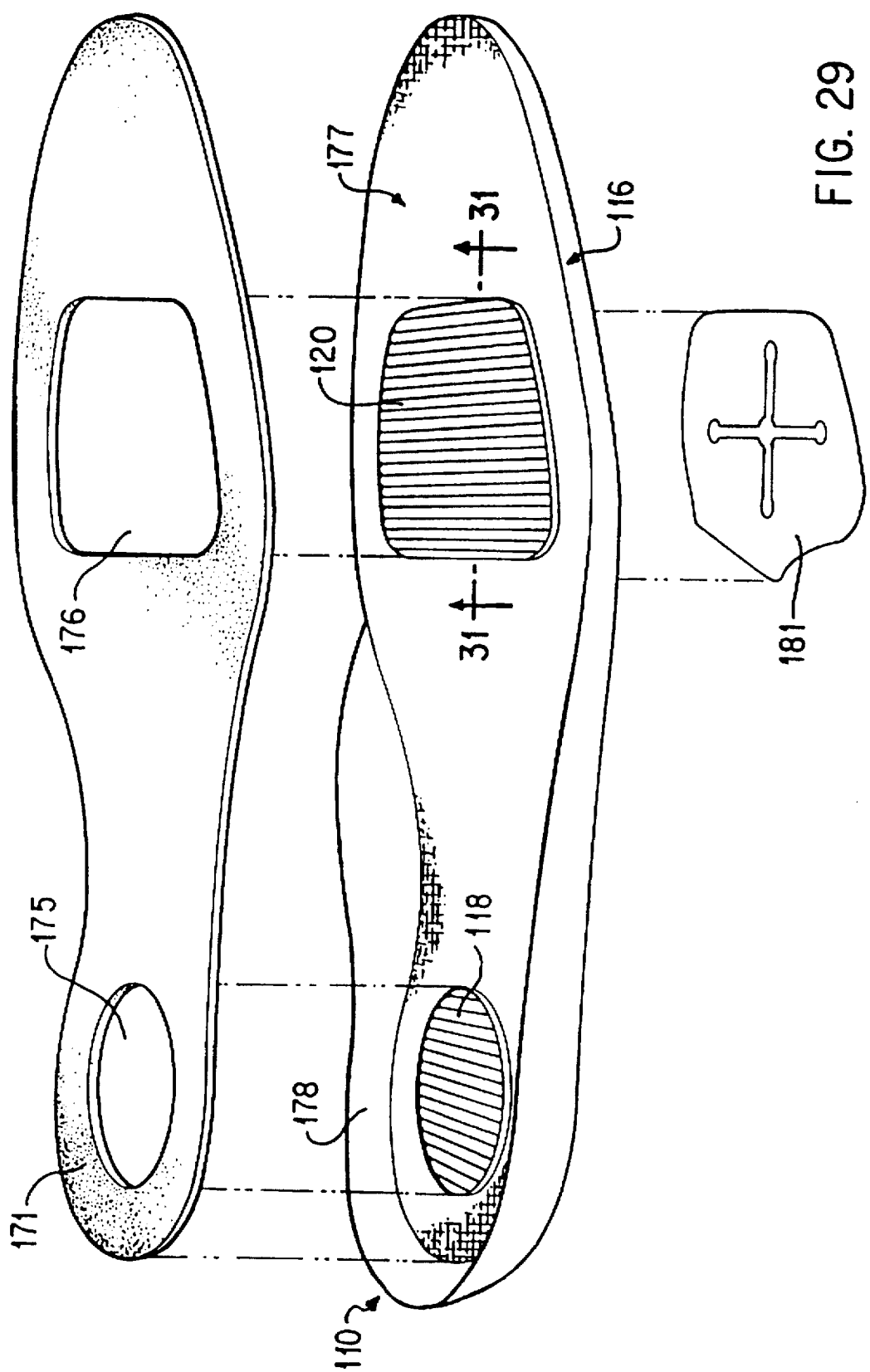
FIG. 29 is an exploded view of the foot bed with the forefront, or metatarsal, gel bladder according to the present invention.
Figure 30:
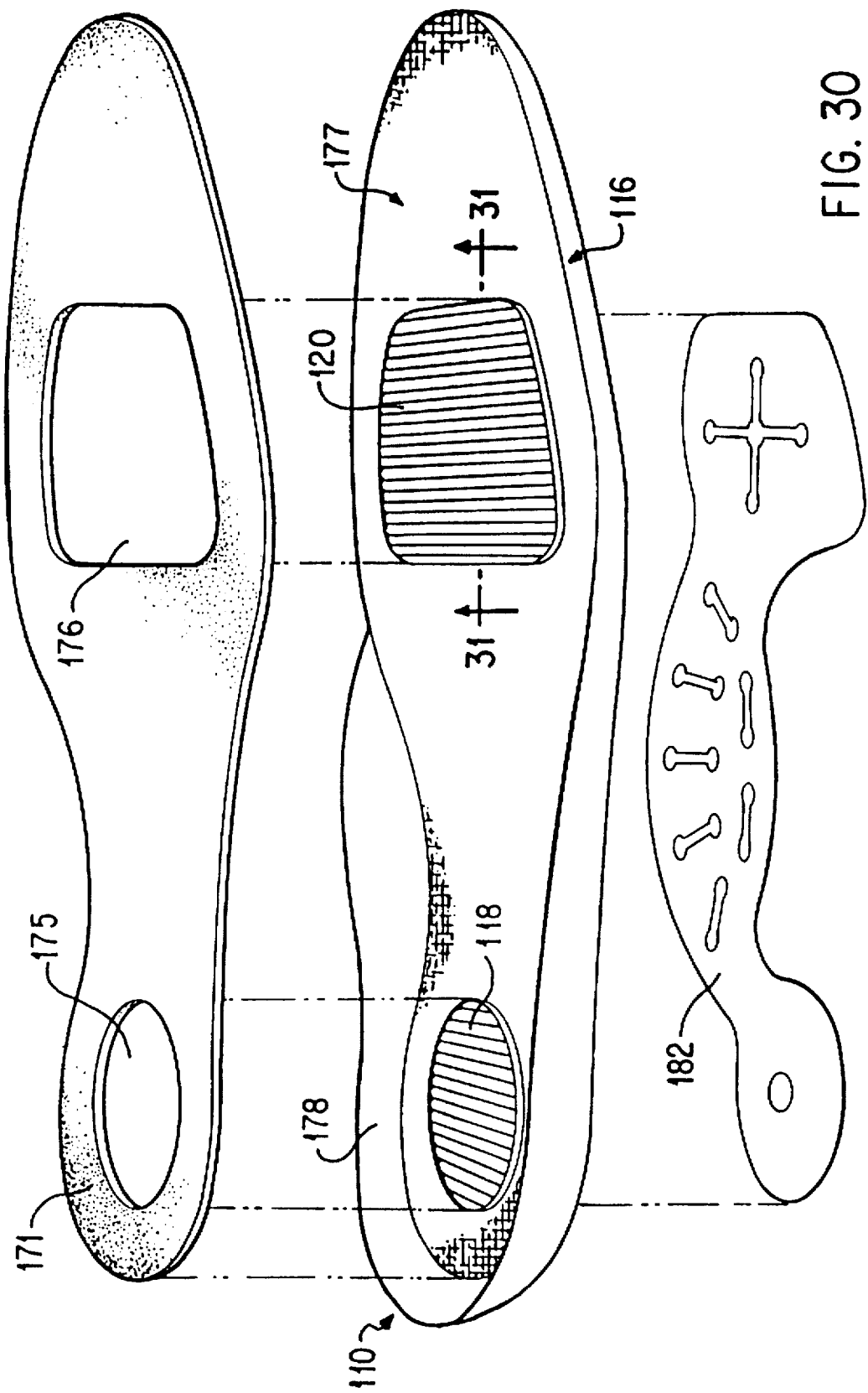
FIG. 30 is an exploded view of the foot bed with the full length gel bladder according to the present invention.

FIGS. 28–30 depict exploded views of the foot bed similar to FIG. 27, but with various embodiments of the gel bladders. FIG. 28 is an exploded view of the foot bed 110 with a heel gel bladder 180 according to the present invention. FIG. 29 is an exploded view of the foot bed 110 with a forefront, or metatarsal, gel bladder 181 according to the present invention. FIG. 30 is an exploded view of the foot bed 110 with a full length gel bladder 182 according to the present invention.

Figure 31:
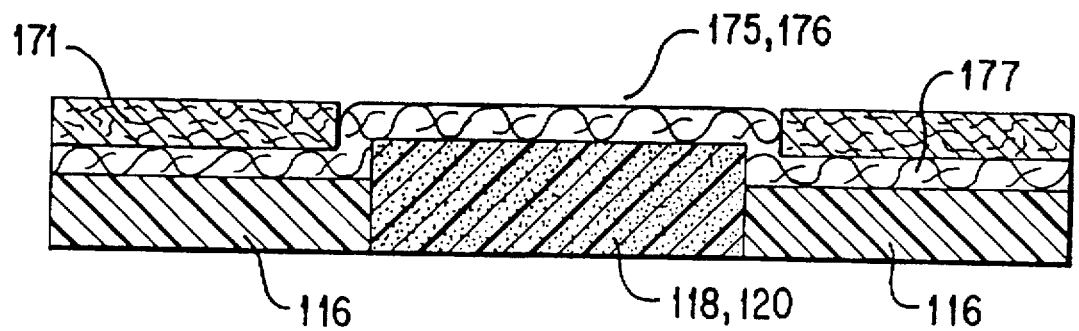
FIG. 31 is a cross-sectional view of the foot bed of FIGS. 27–30 according to the present invention.

FIG. 31 is a cross-sectional view of the exploded view of foot bed depicted in FIGS. 27–30 along line 31—31. The bladder is not shown in this figure. From this view, it is more clearly seen how the leather layer 171, with cutouts 175 and 176 which correspond substantially to the shape and size of the viscoelastic plugs 118 and 120, fits around the plugs 118 and 120 to contact most of the top surface of the textile layer 177. This view also more clearly depicts the thickness of the viscoelastic plugs 118 and 120 to preferably be greater than the thickness of the polyurethane base layer 116.

Figure 31A:
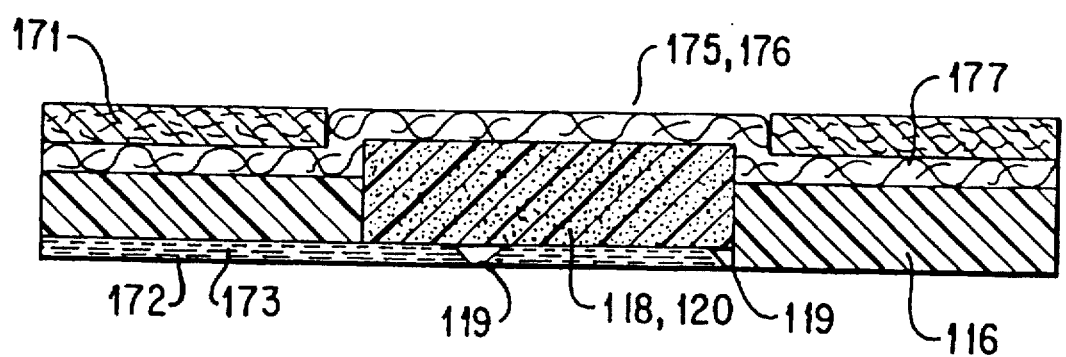
FIG. 31A is another embodiment of the cross-sectional view of the exploded view of foot bed depicted in FIGS. 27–30 along line 31—31.

FIG. 31A is another embodiment of the cross-sectional view of the exploded view of foot bed depicted in FIGS. 27–30 along line 31—31. The bladder 172 is shown in this figure with radio frequency sealing 119 to provide enhanced flexibility and to seal the bladder. The bladder preferably contains environmentally-responsive gel 173. From this view, it is more clearly seen how the leather layer 171, with cutouts 175 and 176 which correspond substantially to the shape and size of the viscoelastic plugs 118 and 120, fits around the plugs 118 and 120 to contact most of the top surface of the textile layer 177. This view also more clearly depicts the thickness of the viscoelastic plugs 118 and 120 to preferably be greater than the thickness of the polyurethane base layer 116.

Figure 32:
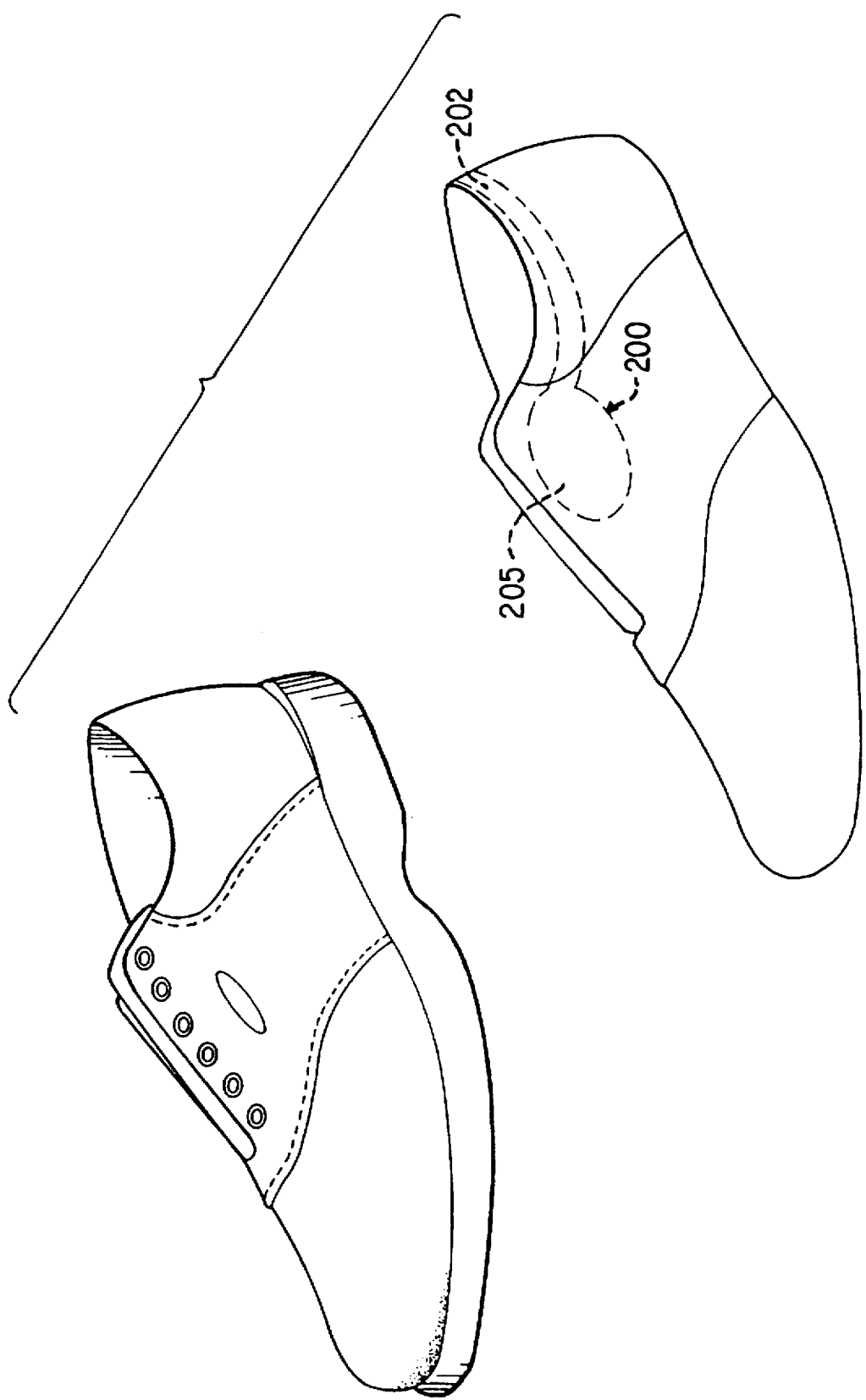
FIG. 32 is a front, left side view of a top collar fit gel bladder according to the present invention.

FIG. 32 is a front, left side view of a top collar fit gel bladder according to the present invention. The gel 205 may be any of the environmentally-responsive gels discussed above, but is preferably the polymer gel. This figure shows an optional saddlebag shaped gel bladder 200 that may be included in the shoe manufacture. This gel bladder 200 has a tail 202 that extends around the top collar of the rearward portion of the shoe to assist in providing better comfort and fit of the shoe.

Figure 33:
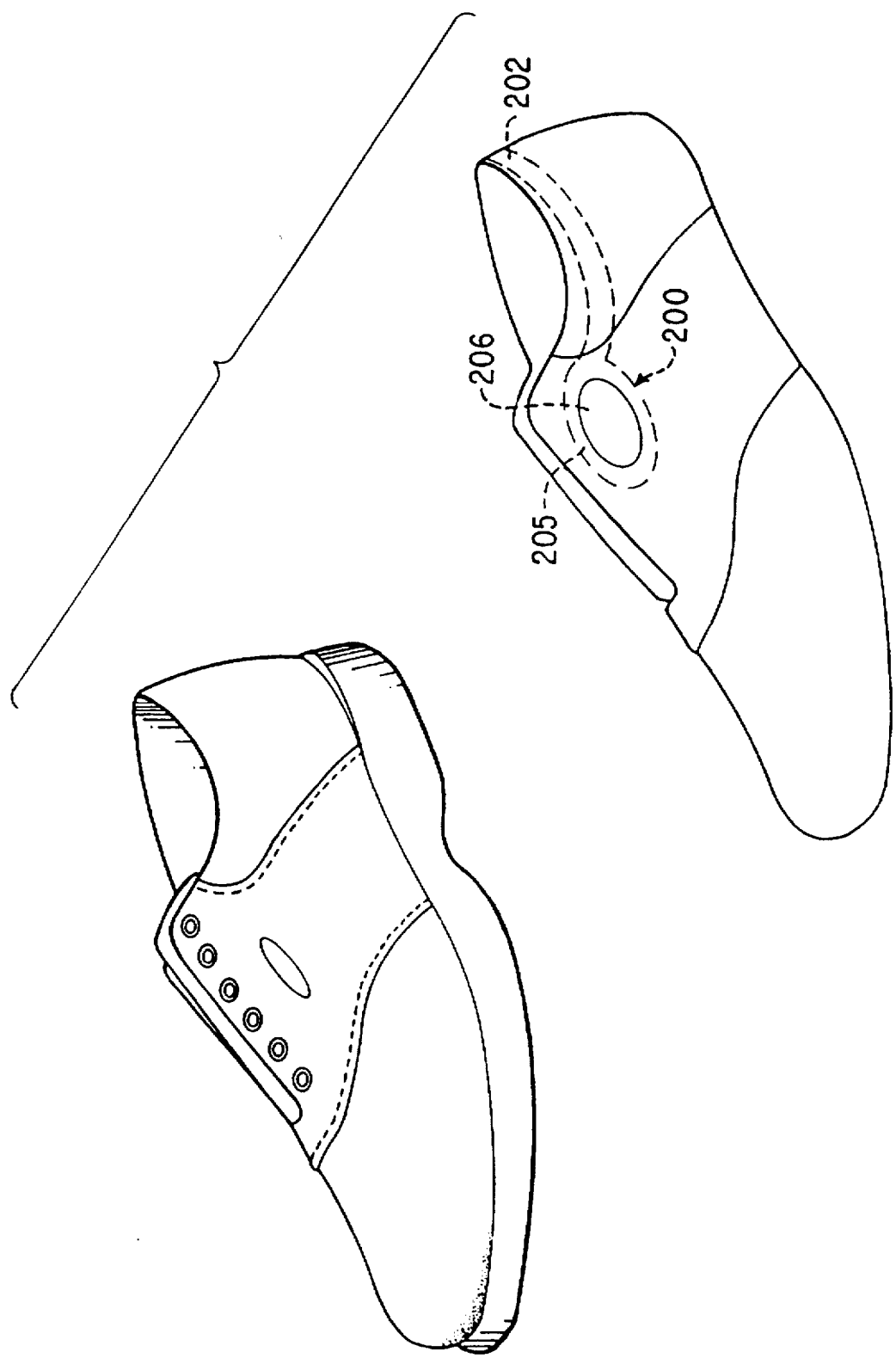
FIG. 33 is a front, left side view of a top collar fit gel bladder with two types of gel according to the present invention.

FIG. 33 is a front, left side view of a top collar fit gel bladder with two types of gel according to the present invention. This figure shows the saddlebag shaped gel bladder 200 having two different types of gels. One gel will be the environmentally-responsive gel 205 as in the bladder of FIG. 32, while the other gel will be a hydrogel type gel 206 as disclosed above. The gels preferably do not mix, as they are placed in separate portions of the bladder.

Figure 34:
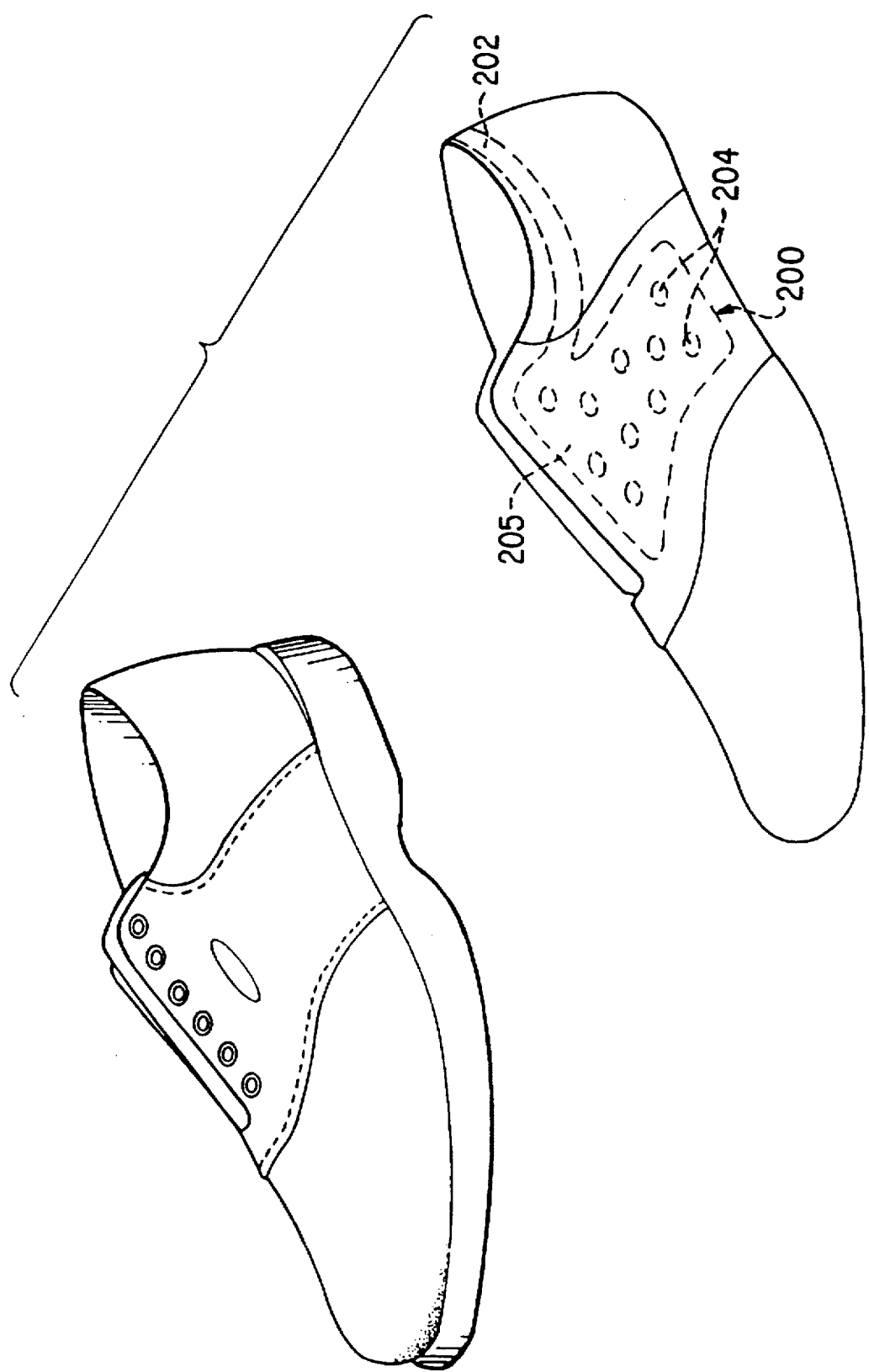
FIG. 34 is a front, left side view of a saddlebag fit gel bladder according to the present invention.

FIG. 34 is a preferred embodiment of the front, left side view of the saddlebag fit gel bladder shown in FIG. 33 according to the present invention. In this preferred embodiment, there are various radio frequency seals 204 placed in the bladder 200 to enhance flexibility of the bladder and the shoe. From the side, these radio frequency seals are similar to those depicted in FIG. 24. The environmentally-responsive gel 205 is preferably used.

Figure 35:
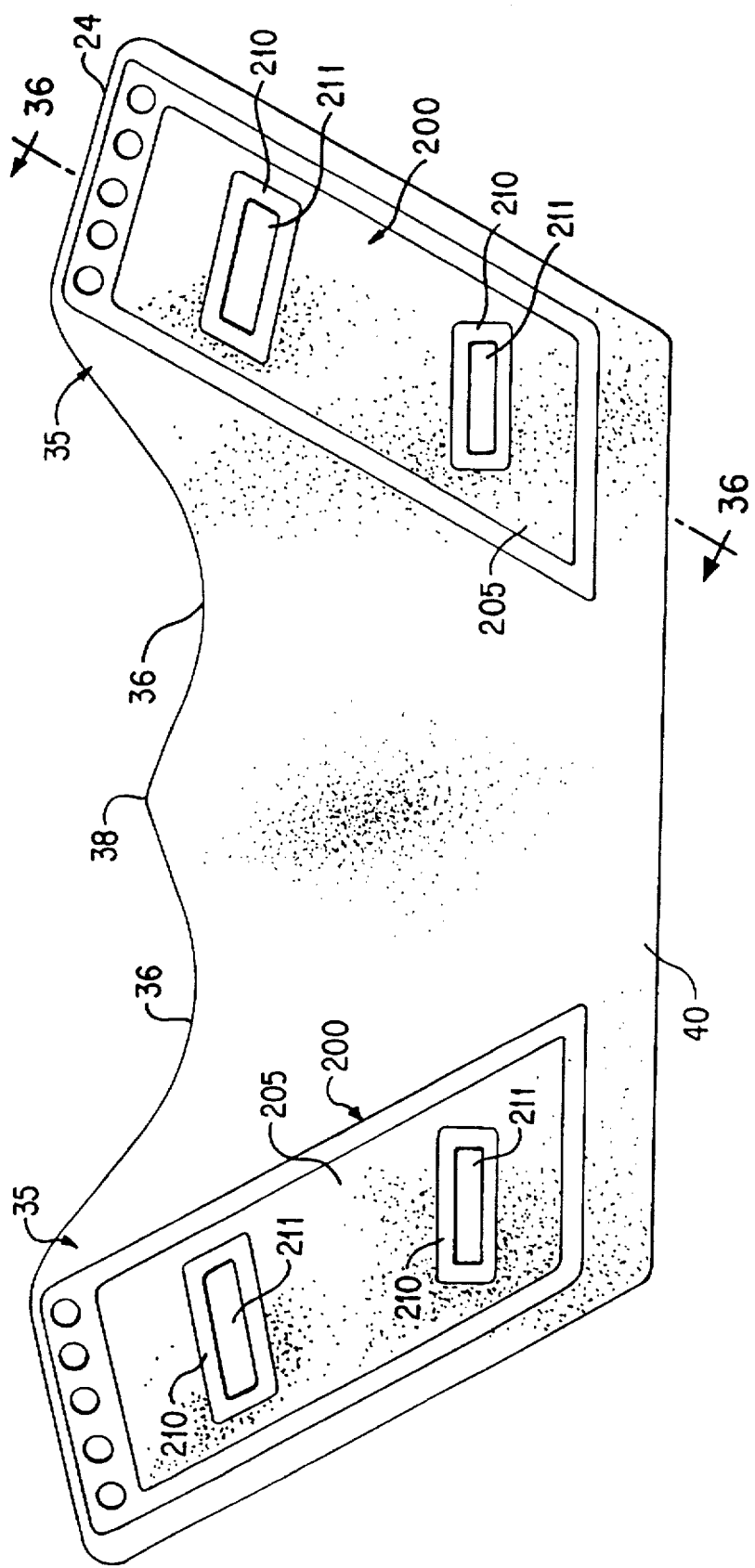
FIG. 35 is a perspective view of another foot conforming member in a shoe according to the present invention.

FIG. 35 is a perspective view of another conforming device in a shoe according to the present invention. The conforming device depicted here is a saddlebag shaped bladder 200 that contains an environmentally-responsive gel 205 in conforming layer 24. The achilles tendon area 38 is in the center of the diagram, and the collar 36 and quarter 35 areas are marked as well. To enhance the flexibility of the conforming devices, radio frequency seals 210 are added and the material is punched completely through to provide gaps 211 for ventilation. Although not depicted, the conforming device is preferably enveloped by about 3 mm of foam 40 on both sides and stitched to the upper side of the conforming device wherein it becomes compressed to about 1 mm. This foam 40 may be memory foam as discussed above, although it is preferably grid mesh foam to enhance ventilation therethrough. The material stitched to the foam on both sides may be leather, although the inner layer (not shown) may be any non-woven textile layer and is preferably TACLINER®.

Figure 36:
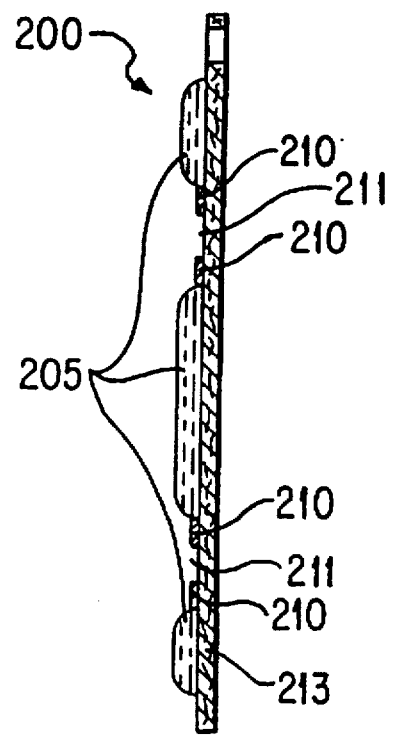
FIG. 36 is a cross-sectional view of a foot conforming member of FIG. 35 along line 36—36 according to the present invention.

FIG. 36 is a cross-sectional view of a conforming device of FIG. 35 along line 36—36 according to the present invention. The bladder 200 here is seen to have environmentally-responsive gel 205 that has been radio frequency sealed 210 with gaps 211 to assist in ventilation. The inner layer 213 is also visible.

Figure 37:
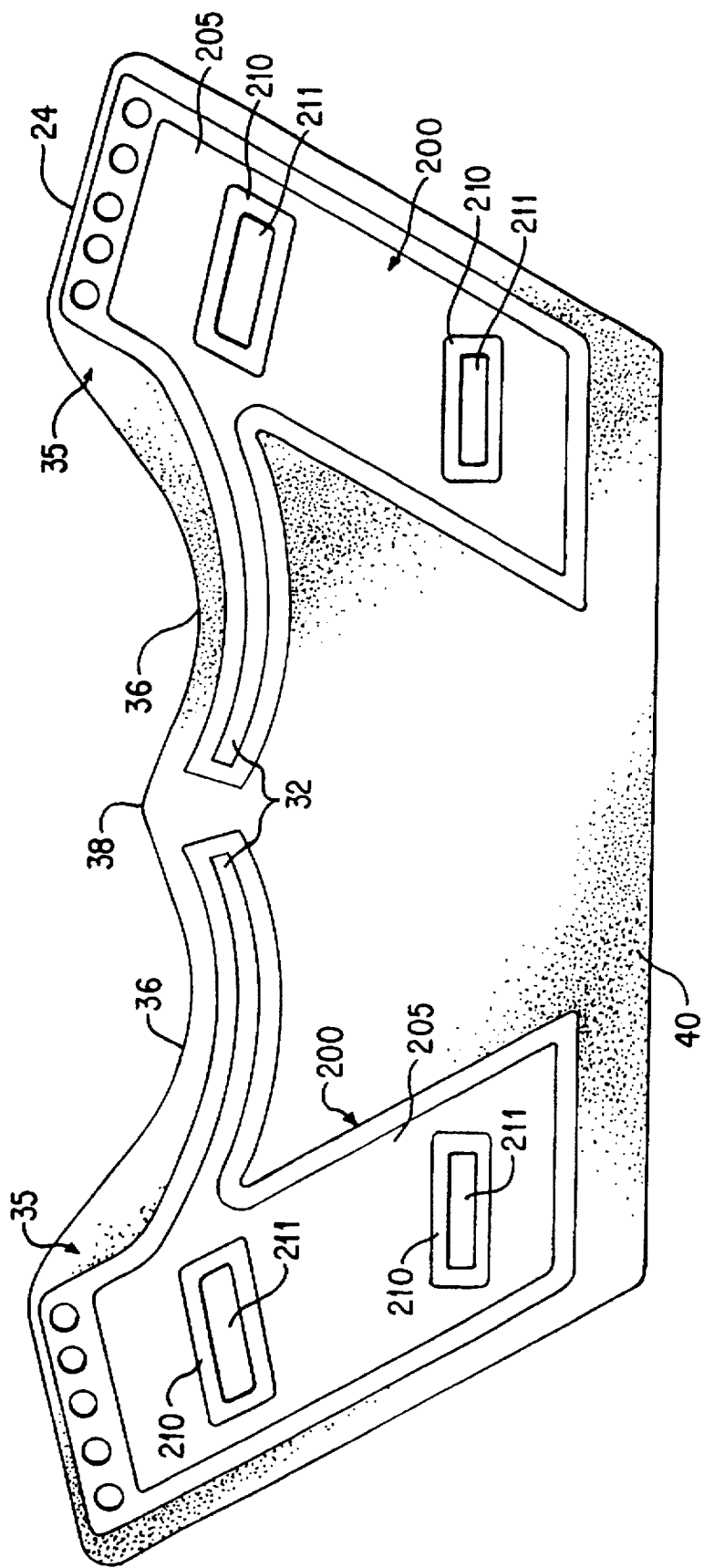
FIG. 37 is a perspective view of another foot conforming member in a shoe according to the present invention.

FIG. 37 is a perspective view of another conforming device in a shoe according to the present invention. This embodiment is substantially the same as that depicted in FIG. 35, however, the conforming device 205 has tails 32 that wrap around the collar 36 and approach the achilles tendon area 38.

Figure 38A:
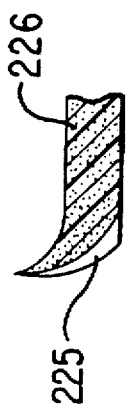
FIG. 38A is a cross sectional view across line 38A—38A of FIG. 38 according to the present invention.
Figure 38:
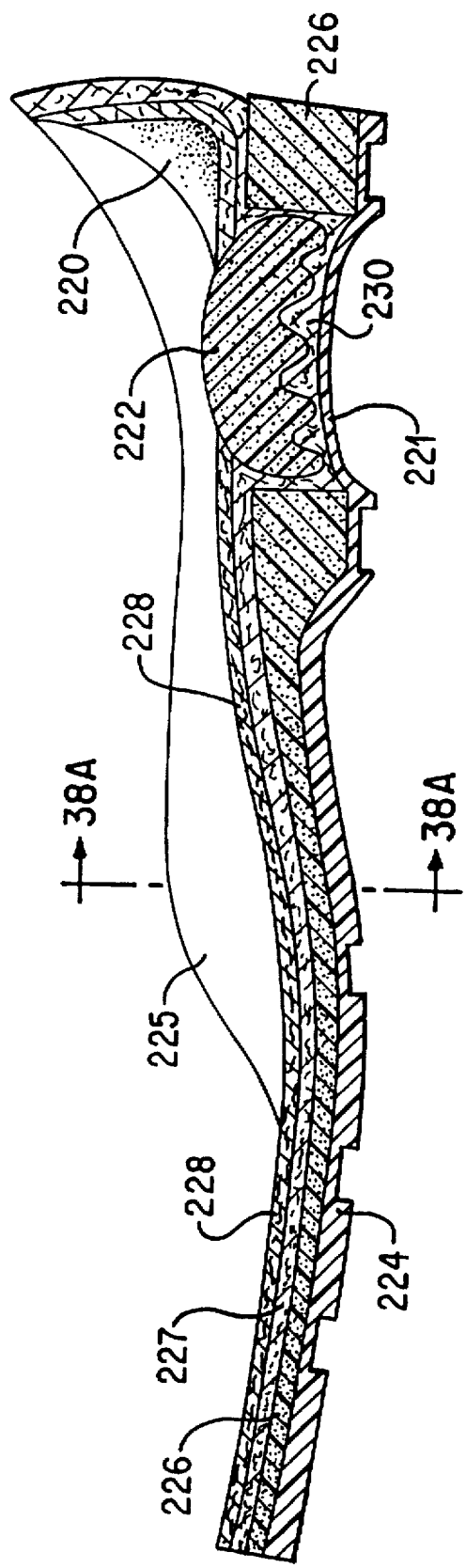
FIG. 38 is a left side view of a customizable gel and/or foam foot bed according to the present invention.

FIG. 38 is a left side view of a customizable gel and/or foam foot bed according to the present invention. An optional heel cradle 220 conforming device may be placed in the foot bed to assist in enhancing fit and comfort of a shoe. The foot bed includes a bottom layer 224 of a plastic or elastomer suitable for wear and includes several layers successively adjacent. The first adjacent layer is a foam, preferably polyurethane, layer 226. The next layer is a nonwoven textile layer 227, such as TACLINER®. On top of that is another layer 228, typically of leather, although other suitable materials may be substituted. The heel includes a viscoelastic polymer plug 222 to provide support for the heel, which plug 222 is preferably colored. Another option is the inclusion of wing bladders 225 that wrap around the bottom edge of the foot to assist in enhancing fit and comfort of a shoe. Another optional embodiment includes a window 221 so that the optionally colored plug 222 may be viewed. Another option is the placement of a bladder 230 with an environmentally-responsive gel under the heel plug 222. Any of the environmentally-responsive gels in the present application may be colored gels as well, and use of the optionally colored plug 222 with a temperature-sensitive dye or colored gel and the optional window 221 would permit multiple color variations depending on the temperature of the gel and amount of gel fluid under the heel at any given time. Above the lower transition temperature, the temperature-sensitive dye fades and turns whitish. If present in low concentrations, this dye will turn translucent above the lower transition temperature. The temperature-sensitive dye of a first color is typically present in about 0.02 to about 0.5 weight percent of the solution. A second colored conventional dye may be present in about 0.07 to about 0.5 weight percent of the solution. This provides a color combination below the lower transition temperature, and provides the second color alone above the transition temperature due to the fade out of the thermally-sensitive dye.

FIG. 38A is a cross sectional view across line 38A—38A of FIG. 38 according to the present invention. The optional wing bladder 225 is depicted as being form fit around the foam layer 226.

Figure 39:
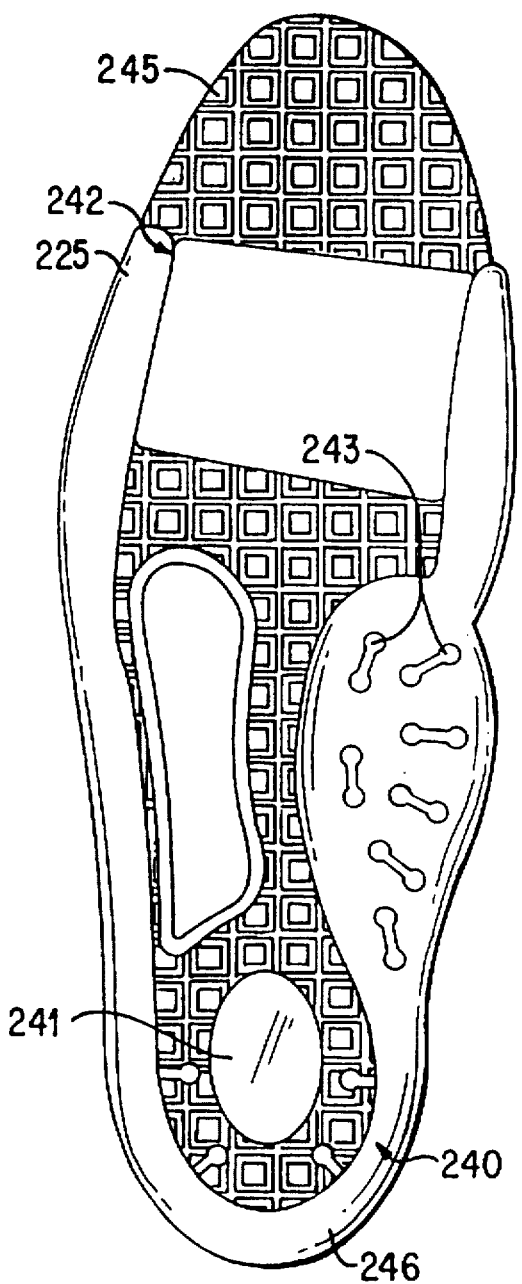
FIG. 39 is a bottom view of another embodiment of a foot conforming member having a wrap-around bladder according to the present invention.

FIG. 39 is a bottom view of another embodiment of the invention having a wrap-around bladder 240 according to the present invention. The bladder 240 wraps around the heel and metatarsal points, which is where most pressure is placed when a shoe perpendicularly contacts another surface. Thus, the bladder 240 preferably provides comfort and fit rather than support in the shoe bottom 245. The bladder 240 also contains an environmentally-responsive gel 246 which is preferably colored, and more preferably colored blue. At the mid-shoe and forefoot areas, the optional wing 225 of FIGS. 38–38A is depicted. Transparent windows 240 and 241 may be laced in the shoe bottom 245 to permit viewing of a viscoelastic gel, which is colored and more preferably colored yellow. Additionally, it is preferable to add radio frequency seals 243 in the arch section of the wrap around bladder 240 to enhance flexibility of the foot bed. In the most preferred embodiment, the viscoelastic gel 241 is yellow and the environmentally-responsive gel 246 is blue, such that in the overlap area 242 the color will be green. Of course, other colors are easily substituted in the gel and the metatarsal area to provide for a variety of colors in the overlap area.

Figure 40:
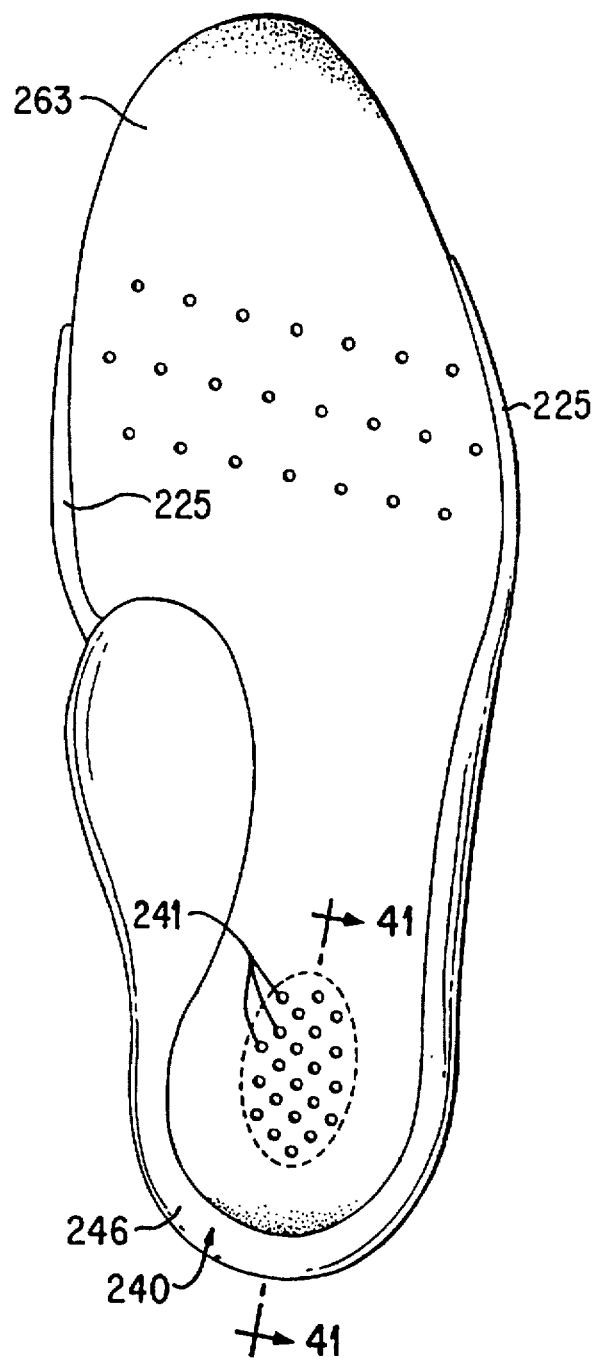
FIG. 40 is a top view of the foot bed embodiment depicted in FIG. 39 according to the present invention.

FIG. 40 is a top view of the foot bed embodiment depicted in FIG. 39 according to the present invention. The top layer 263 of the foot bed is shown, which is preferably leather. The optional wing bladders 225 are shown. Also, the heel preferably contains multiple holes 241 in the foot bed layers to enhance ventilation. These holes are preferably in the metatarsal area as well.

Figure 41:
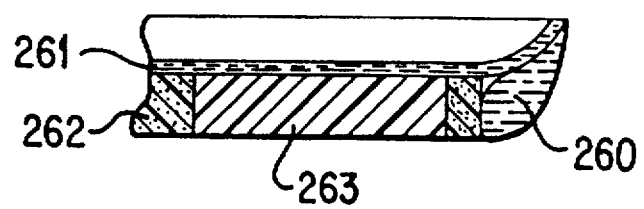
FIG. 41 is a cross-sectional view on line 41—41 of FIG. 40 according to the present invention.

FIG. 41 is a cross-sectional view on line 41—41 of FIG. 40 according to the present invention. The wrap around bladder 260 is depicted on the edge of the heel portion of the foot bed, which is preferably filled with an environmentally-responsive gel. Under the heel there is a viscoelastic plug 263 which is preferably colored, and more preferably colored yellow. Surrounding the plug 263 is foam 262, preferably a polyurethane foam. Above the plug and foam is a layer of polyurethane gel 261.

The present invention is further directed to an environmentally-responsive gel that can be tailored to either soften or become firm at a predetermined temperature. In a preferred embodiment of the invention, the shoe conforming member incorporates one of the gel compositions described below. Preferably, these environmentally-responsive gels are temperature-responsive gel compositions have first and second transition temperatures. Below the first, lower transition temperature, the composition is a liquid, which gels and becomes firm on heating. If the eating is continued, a second, higher transition temperature is reached, at which the gel liquifies. Both transition temperatures, the amount of viscosity change, and the temperature range over which the gel transitions may be adjusted by the inclusion of various additives. Therefore, it is possible to provide a gel composition that will either liquify or gel at a preselected temperature with a steep viscosity change. In the preferred embodiment, the liquid to gel transition occurs at or near human or other body temperatures. The final viscosity change after gelation is typically about 100 to 500 times greater, more preferably about 1000 times greater, and most preferably about 3000 times greater than the initial viscosity in the liquid state, and any whole integer therebetween. The transition temperature may be adjusted to transition differently for below or above average body temperatures.

The environmentally-responsive gel can thus be comprised of a material that is a liquid at room temperature and a gel having an increased viscosity at approximately body temperature. In this manner, the environmentally-responsive gel can be a liquid in a footwear application such as a shoe or foot bed before it is put to use by the user. When the user inserts her foot into the footwear, the liquid can flow at a first rate to conform to the foot. The temperature-responsive gel is then heated to body temperature by the foot and vastly increases in viscosity to provide a conforming fit and stability. At this point, the gel composition is in a gel state and flows at a second rate that is substantially lower than the first rate.

The flowable environmentally-responsive gel is a water based gel. A benefit of using these gels is that they transition from liquid to gel at a lower transition temperature with an abrupt increase in viscosity, as compared to the prior art gels. These environmentally-responsive gels preferably include from about 15 to 40 weight percent, more preferably from about 20 to 32 weight percent, and most preferably about 22 to 28 weight percent, of a non-ionic polyoxyalkylene block copolymer and preferably from about 1 to about 20 weight percent, more preferably from about 5 to 18 weight percent, and most preferably from about 9 to 15 weight percent of SUN-LIGHT® liquid detergent surfactant in an aqueous solution. Another equally preferred embodiment substitutes sodium dodecyl benzene sulfonate for SUN-LIGHT® in an amount from about 1 to 4 weight percent, more preferably from about 1.5 to 3 weight percent, and most preferably from about 2 to 2.5 weight percent, of sodium dodecyl benzene sulfonate (Na-DBS). In another embodiment, the gel contains up to about 15 percent, and more preferably from about 6 to 12 weight percent 1,6-hexane or 1,4-butane diol, either in place of, or in combination with, the surfactant, in an aqueous solution. The water is preferably deionized water to avoid gel contamination by salts such as magnesium, sodium, calcium and other minerals that are typically found in tap water. Although the solution will still change from a liquid state to a gel state at a transition temperature in the presence of such contaminants, the transition temperature is decreased, and the viscosity curve is not as sharp, as desired.

A preferred gel composition of this type is a polymer gel including a mixture of water and polyethyleneoxide/polypropyleneoxide (PEO-PPO) non-ionic block copolymer, which preferably contains additives, such as polyethyleneoxide (PEO) homopolymer and/or polypropyleneoxide (PPO) homopolymer, and hydrophilic compounds such as surfactants, alcohols, acids, salts, amines and the like, or mixtures of additives thereof. By varying the concentration of a homopolymer or other additive in the base mixture/PEO-PPO block copolymer in water, the transition temperatures and the firmness of the gel can be adjusted as desired. By providing a gel composition that hardens on heating, a shoe insert can be obtained that flows to conform to the shape of the wearer's foot, and then gels to provide proper support.

Suitable polymer surfactant gels may be made from different non-ionic block copolymers, such as poloxamers (PLURONIC®), poloxamines (TETRONIC®), BUTRONIC® polyols, and the like. In a preferred embodiment, the poloxamer used is a PLURONIC® surfactant. In such a composition, it is more preferred that PLURONIC® F127 polyol, also known as poloxamer 407, is used. All the PLURONIC®, TETRONIC® and BUTRONIC® polyols suitable for use in the present invention are available from BASF Corporation in Wyandote, U.S.A., having headquarters in Parsippany, N.J., U.S.A.

A preferred commercially available additive is the liquid detergent SUN-LIGHT® surfactant disclosed in U.S. Pat. No. 4,614,612, the disclosure of which is expressly incorporated herein by reference thereto. This liquid detergent is manufactured by Lever Brothers Co., New York. It is also preferred to use diols, sodium dodecyl benzene sulfonate, or other soaps or surfactants. Preferred diols include 1,4-butane diol and 1,6-hexane diol.

The preferred PEO-PPO, PLURONIC® F-127, is formed by the controlled addition of propylene oxide to the two hydroxyl groups of propylene glycol. Ethylene oxide (EO) is added to sandwich this hydrophobe between hydrophilic groups, controlled by length to constitute from 10% to 80% by weight of the final molecule. The PLURONIC® F127 polyol typically has a molecular weight of about 12,500, and consists of about 70% by weight EO, which is soluble in water (hydrophilic), and 30% by weight propyleneoxide (PO), which is insoluble in water (hydrophobic). The formula for the polyol is approximately $EO_{99}-PO_{65}-EO_{99}$. Other PEO-PPO block polymers are to be understood as being easily manufactured and substituted by a skilled artisan, and therefore within the scope of the invention.

The A-B-A tri-block structure of the powdered PLURONIC® polyols makes them well suited for use as dispersants in aqueous systems, since each molecule has two PEO hydrophilic chains which allows for more effective steric stabilization. With a longer hydrophobic PPO center, chances for dispersant desorption from the particle are minimized. At low concentrations, single molecule micelles are formed with PPO in the middle and PEO in the outer shell rolled around the hydrophobic PPO. With increasing concentration of the copolymer formations, stacks of micelles are obtained to create a network and thus a greater extension of the shear plane. This continuous network is a gel, with a critical concentration that decreases with increasing temperature. For example, with an aqueous solution of only 24% PLURONIC® F127 the transition temperature is about 17° C., while with 27% PLURONIC® F127 the transition temperature is about 14° C. The critical micelle concentration necessary for gelation depends on temperature, but below 15% PLURONIC® polymer the gels of the present invention will not generally be formed without other additives. Above about 40% by weight the non-ionic block copolymer cannot be easily dissolved, as the whole system will be in the gel state above the transition temperature, which is at the freezing point of water (0° C.). An undesired effect of using too much non-ionic block copolymer is that if water leaks from the gel at a constant temperature, gel solidification occurs due to the effective increase in the polymer concentration.

These polyols differ from anionic and conventional nonionic polyols because the hydrophilic/lipophilic balance (HLB) need not be fixed for any given molecular weight. The length of the PO hydrophobe and EO hydrophile can be independently varied to any length as necessary. Thus, several similar polymers may be obtained while holding the HLB constant, and vice versa. All such substitutes are included within the scope of the invention.

If the concentration of non-ionic block copolymer, or PLURONIC® in this example, is sufficient for gel formation, the micelle agglomeration depends on temperature. At a low temperature, both PEO and PPO blocks are solubilized with water clouds around them, making the entire system liquid. With increasing temperature, the critical micellization concentration decreases, and the micellar size and aggregation increase until gelation occurs, as is evident by both experimental and theoretical studies. While in solution, the micelles are about 5 to about 7 nanometers. At the gelation point, the micelles grow substantially larger to form the gel. SANS studies found that gels are made of cubically close-packed block co-polymers. The driving force for the micellization is primarily poor solvency conditions of PPO in water, particularly at higher temperatures. Thus, the gelation is due to the interplay of hydrophobic and hydrophilic forces.

Addition of ionic surfactants appears to reduce the size and increase the number of micelles, shifting the transition temperature higher. In a preferred embodiment, about 14 weight percent SUN-LIGHT® liquid detergent or about 2.2 weight percent Na-DBS shifts the transition temperature from about 17° C. with pure 24% PLURONIC® F127 up to about 25° C. When such surfactants are added, the gel viscosity increases over that of an aqueous solution of PLURONIC® F127, and these surfactants increase the transition temperature as well. Too much surfactant, though, will break up the micelles too much. This has the effect of decreasing the gel viscosity, and can even prevent gelation. Addition of diols and detergents similarly decreases agglomeration of micelles. One benefit of using diols in place of, or in combination with, surfactants like those in liquid detergents is that the diols are typically liquid at room temperature, thus keeping the solution liquid if water leaks out of the solution. The additives increase the transition temperature, but decrease the final gel viscosity. However, the corresponding decrease in final viscosity is not as large as the increased viscosity that can be obtained from using more non-ionic block copolymer because of the increase transition temperature due to the additives. Whether the surfactant or other additives cause "melting" of the gel or cause strengthening of the gel depends on the balance of hydrophobic and hydrophilic forces. A preferred embodiment is about 24% PLURONIC® F127, 14% SUNLIGHT® liquid detergent, and 62% deionized water. Another preferred embodiment is about 24% PLURONIC® F127, 2.2% sodium dodecyl benzene sulfonate (Na-DBS), and 62% deionized water.

The preferred polyol, PLURONIC® F127, provides enhanced emulsification, preferably of the oil in water type emulsion. An emulsion is a suspension of particles of one liquid in a second, immiscible liquid. Other factors such as mixing equipment, sequence of ingredient addition, speed and duration of the process, temperature changes, and relative concentrations of the various components all determine the stability of an emulsion. Other suitable PLURONIC® compounds available from BASF typically have a hydrophobe molecular weight of 950 to 4000 polyoxypropylene and have approximately greater than 45% weight percent polyoxyethylene. A skilled artisan will understand that the substitution of any other compounds with similar properties is within the scope of this invention.

The preferred block copolymer gel compositions of the present invention comprised of only PEO-PPO and water typically have a transition temperature from a liquid to a gel of about 13° C. to 35° C., more preferably about 20° C. to 30° C., and most preferably from about 23° C. to 26° C. The transition temperature can be adjusted by adding varying amounts of the additives listed above, including, but not limited to, homopolymers such as PEO and PPO, and hydrophilic compounds, such as alcohols, glycerin, sorbitol, saccharose, ionizable polymers, acids, salts, and amines. These additional additives can be added, alone or in combination, in amounts of up to about 85% of the weight of the composition to extend the transition temperature range.

The additives may further include one or more of a broad array of surfactants, alcohols, acids and salts, amines, and ionizable polymers. The surfactants may include sodium dodecyl benzene sulfonate, sodium lauryl ether sulfate, and other soaps such as sodium stearate, potassium stearate, sodium palmitate, or potassium palmitate. The alcohol additives may be monoalcohols, diols, triols, and even polyols. The monoalcohols, diols, triols, and polyols are preferably $C_{1-20}$ alkane alcohols. For example, the monoalcohol may be methanol, ethanol, or butanol; the diol may be ethylene glycol, propane diol, butane diol, hexane diol, polyethylene glycol, or polypropylene glycol; and the triols may be glycerin or trimethylol propane. The polyols may, for example, be sugars such as sorbitol or saccharose. The acid and salt additives may, for example, be sodium chloride, potassium chloride, sodium acetate, and potassium acetate. The acid is preferably an organic acid. The amine may, for example, be triethanolamine.

Some of the ionizable polymer additives, which are responsive to changes in pH and/or ionic strength, include carboxyvinyl polymers of monomers, such as acrylic acid, methacrylic acid, ethacrylic acid, phenyl acrylic acid, pentenoic acid, and the like, and one or more poly (carboxyvinyl) polymers may be used as an additive. Most preferred is polyacrylic acid. Copolymers, such as copolymers of acrylic and methacrylic acid are also useful as the additive.

Generally, additives that increase the first, lower, transition temperature will at first increase the viscosity of the gel. However, with an increasing concentration of additives, the viscosity of the gel may decrease to some degree. These additives are generally surfactants, monoalcohols, diols, polyethylene glycols, and some amines. Additives that decrease the first, lower, transition temperature and increase the gel strength and viscosity are glycerin, sugars, and some salts.

The method of manufacturing these environmentally-responsive gels is fairly simple. A measured amount of deionized water is preferably cooled as close to freezing as possible, such as by the use of ice cubes or an ice jacket around the mixing area, although the gel mixture may be formed at any temperature above the freezing point of water and below the gelation point of the gel. It would also be possible to combine the ingredients at a temperature above both transition points of the gel, i.e., above the melting point of the gel, however, such high temperatures adds difficulty in controlling the concentration of water in the solution. An additive having surfactants, such as SUN-LIGHT® detergent or sodium dodecyl benzene sulfonate, is added to the measured water. Then, a block copolymer, such as powdered PLURONIC® F127, is added to the solution. Although a wide variety of non-ionic block copolymer surfactants are suitable, such as the TETRONIC® or BUTRONIC® block copolymers, the PLURONIC® poloxamer provides the most desired properties when mixed with the additives of the present invention.

While it is preferred that the ingredients are added one at a time with the water and surfactant first, they may all be added simultaneously. In another embodiment, the preparation of thermo-sensitive gels with thermo-sensitive dyes may be accomplished by introduction of one of various types of thermally-sensitive dyes. One or more conventional dyes or colorants may also optionally be added. In one embodiment, CHROMICOLOR AQ INK Fast Blue, Type 20 (produced by Matsui International Co., Inc. of Gardens, Calif.) is used to provide a thermo-sensitive dye having a 29° C. transition temperature. The leuco dye has intense color (blue) below 16° C. and starts fading gradually with increased temperature up to 29° C., when it loses color completely. Above such a temperature, any other coloring that was used, i.e., a yellow dye, would become visible, as it would no longer be masked by the intense blue. If a thermo-sensitive dye is used, it is preferred that both the viscosity and color transitions occur at the same temperature. The mixture is stirred vigorously and is then ready for packaging into a conforming device according to the present invention or for shipping in other containers. The above environmentally-responsive gel, advantageously with the thermally-sensitive dye and colorant, is to be understood as the most preferred embodiment of the invention.

In a further embodiment of the present invention, the environmentally-responsive gel in the shoe portions described herein, such as the quarter and collar, the tongue and the foot bed, is comprised of a reversibly gelling, responsive polymer network of at least two polymers, in which the interaction of the polymers provides a synergistic effect that provides properties that are not possessed by the constituent polymers, whether the polymers are utilized individually or in a simple blend. A responsive polymer network is a special type of polymer composition in which two or more polymers interact without covalent bonding to provide a stable, miscible composition with unique properties that result from the interactions of the polymers. The miscible compositions are formed regardless of the miscibility of the components. The responsive polymer network comprises at least one responsive component capable of aggregating in response to environmental stimuli, at least one structural component that supports and interacts with the responsive component, and an aqueous solvent. The form of aggregation in the responsive component includes micelle formation, precipitation, and labile crosslinking. Covalent bonding between the components is not required.

The responsive component is an oligomer or polymer that will change its degree of association and/or agglomeration in response to changing stimuli, such as temperature, pH, ionic concentration, solvent concentration, light, magnetic or electrical field, pressure, or other environmental triggers that are known to trigger a response in a responsive gel material. Preferably, the responsive component is a temperature sensitive aggregating polymer, which undergoes changes in conformation and micelle concentration with a change in temperature, changing from an open, non-aggregated form to a micellular, aggregated form. The preferred transition temperature range is from about 0° to 100° C., and, most preferably, at or around body temperature, i.e., 30° to 40° C., but may occur at much higher or lower temperature, as long as the temperature is above the freezing point and below the boiling point of the solution.

The structural component is an oligomer or polymer that is not required to be responsive, but which supports and interacts with the responsive component to form a responsive polymer network. The interaction of the structural component magnifies the effect of the responsive component in gelling the composition in response to a stimulus. Preferably, the structural component is a polymer that is capable of ionization in response to a change in the ion strength of the solution, which typically results from a change in pH or salt concentration. A change in the ionic state of the structural component causes the polymer to react to attractive (collapsing) or repulsive (expanding) forces in the molecule. Therefore, the interaction between the responsive and structural components can be adjusted by selecting an appropriate pH or salt concentration for a given application.

The response of the responsive component to a stimulus, if any, in the absence of the structural component, is qualitatively or quantitatively different from that of the responsive polymer network. The presence of the structural component amplifies and/or alters the response of the responsive component.

In addition to the structural and responsive components and the aqueous solvent, the responsive polymer network may contain additives that are required for particular applications. Additives useful with the present invention include non-ionic surfactants, acids, bases, salts, dyes, fillers, and the like.

Responsive polymer networks are formed by dissolving about 10 to 75% based on the total weight of solids of at least one responsive component and about 90 to 25% based on the total weight of solids of at least one structural component in an aqueous solvent. The interaction between the constituent polymers in the resulting responsive polymer network permits the formation of clear, colorless gels with a very low solids content, with gelling observed in aqueous solutions of about 0.01 to 20% based on the weight of solution of the responsive component and about 0.01 to 20% based on the weight of solution of the structural component.

The responsive polymer is typically a linear or branched polymer or oligomer of the general formula $(P_1)_a(P_2)_b(P_1)_a$, where $P_1$ is typically a polyol of general formula $(CH_2CH_2O)_a$, and $P_2$ is typically a polyol of general formula $(CHRCHRO)_b$, where R may be H or alkyl, and a is about 10 to 50 and b is about 50 to 70, but $P_1$ and $P_2$ may be any polyol combination that provides the desired responsive polymer network. Viscosity increases of about 5 to 100-fold, and, preferably, about 10 to 50-fold are observed in the responsive polymer networks of the present invention.

A typical responsive polymer network contains less than about 4% of total polymer solids, of which less than about 2% is responsive component, and less than about 2% is structural component, with the remainder comprising aqueous solvent. A preferred responsive component is a tri-block polyol of the formula $(PEO)_a(PPO)_b(PEO)_a$, where a is about 10 to 50, and b is about 50 to 70. At the transition point, such a gel will typically provide ten-fold increase in viscosity over a temperature change of 5° C.

Typical structural components include ionizable polymers, which are responsive to changes in pH and/or ionic strength. Preferred ionizable polymers include carboxyvinyl polymers of monomers, such as acrylic acid, methacrylic acid, ethacrylic acid, phenyl acrylic acid, pentenoic acid, and the like, and one or more poly(carboxyvinyl)

polymers may be used in the responsive polymer networks of the invention. Most preferred is polyacrylic acid. Copolymers, such as copolymers of acrylic and methacrylic acid are also useful as the structural component.

The most preferred reversibly gelling responsive polymer network comprises an aqueous solution of up to about 4% of the responsive and structural components in a 1:1 ratio, wherein the responsive component is PLURONIC® F-127, and the structural component is polyacrylic acid.

Another embodiment of the invention is a viscoelastic gel comprised of a polyurethane gel. In the shoe upper, the viscoelastic gel is preferably of a relatively soft, highly flowable gel. That is, the gel has a –000 hardness of approximately 10 to 100 and preferably about 40. Moreover, the viscoelastic gel portion can be formed of various hardnesses to best conform to the foot. For example, the body section 54 can be made from a soft gel of approximately 40 to 60 –000 hardness and the extending fingers can be made from the same gel hardness or a gel having a lower hardness and being more flowable.

Another advantage to using a viscoelastic gel is that the gel, especially polyurethane gel, does not need to be encapsulated into a bladder, i.e. the gel is not surrounded by a plastic liner to limit the flow thereof. Since the preferred material is a flowable gel, it can be formed directly between the front and back layers 20 and 22. The polyurethane gel can be provided in various hardnesses to provide proper mediums for shoe comfort, including fit and cushioning. The polyurethane, or flowable viscoelastic, gel is preferably a soft elastomer with high sol (plasticizer) fraction which can include a high molecular weight triol (MW greater than 6000) and a diisocyanate. The polyol can be made of Arcol E-452, but is more preferably made of Arcol LHT 28, and the plasticizer can be a Paraffin oil or dipropylene glycol dibenzoate.

In another embodiment, the flowable viscoelastic gel is a butadiene style rubber. The rubber can be prepared from oil and polyisobutadiene. Preferably, oil such as Kaydol and a styrene ethylene butadiene styrene tri block medium molecular weight rubber polymer such as Kraton. More preferably, 60 ml of Kaydol and 7.5 g of Kraton 1650M are mixed and heated to 140° F. for 1 hour. The material is stirred twice during the 1 hour and then poured into a cool and set into a gel. Kaydol is a paraffin (55%) and naphthenic (45%). By increasing the percentage of Kraton, the firmness of the gel can be increased for various locations where a firmer gel is desired or vice versa. Still further, expanded, resilient, plastic, hollow microspheres such as Expancel 091 DE80, expanded, glass microspheres or a blowing agent can be added to the gel to reduce the weight of the gel. Still further, the gel can be frothed with air using ultrasonic cavitation or unexpanded Expancel DU grade microspheres can be used and expanded during processing. The rubber gels for cushions, such as that described above, are prepared by mixing 2%–50% polymer in a selected oil at a temperature above the melting of the polymer styrene block, typically at 130 degrees C. The oil is a mineral oil of paraffinic, naphthenic or aromatic nature, and preferably about half paraffinic and half naphthenic. A preferred oil is Kaydol, although good rubber gels may be prepared with other mineral oils such as Shellflex 371 and Tufflo 6056 from ARCO Chemical.

The preferred polymer is a styrene-ethylene/butylene-styrene (SEBS) such as Kraton G polymers. The preferred concentration of Kraton is about 5–15% for softer applications and above 20% for firmer applications. The Kraton and Kaydol mixture at 130 degrees C. is somewhat viscous and probably requires injection molding or compression casting to form components. However, the mixture at 150 degrees C. can be cast with Kraton concentrations up to 40%.

The preferred cushion is further comprised of hollow resilient microspheres. The rubber gels having 1 to 15% Kraton tend to display some degree of oil bleeding or cold flow (creep) which can be significantly reduced by the addition of plastic hollow microspheres. The preferred cushion, thus, includes resilient microspheres such as Expancel 91 DE 80 from Akzo-Nobel Co. to reduce the density, creep and bleeding of the rubber gel. Unexpanded hollow microspheres, such as Expancel 91 DU 80, can be used, but they should be post heated to approximately 140 degrees C. to fully expand for maximum weight reduction and resiliency. The polymer and oil base gel has a specific gravity of about 0.90–0.95. The resilient hollow microspheres can be added to reduce the specific gravity of the rubber gel to about 0.20–0.50. Furthermore, the plastic hollow microspheres function to provide spring to the cushion, whereas the polymer and oil works primarily as a shock damper with little energy return. Thus, the polymer, oil and microspheres rubber gel provides excellent cushioning at impact, and, as pressure is released, the compressed microspheres provide energy return. The microspheres also increase the modulus of the gel, making it firmer.

The preferred concentration of plastic hollow microspheres, such as Expancel 91 DU 80, is about 2–5%, and, most preferably, about 3%. The preferred microspheres, such as Expancel 91 DU 80, are partially expanded and require additional heating to reach full expansion. Preferably, Expancel microspheres are added to the oil and SEBS copolymer and the mixture is heated to 130 degrees for 10 to 40 minutes. The rubber gel solution solidifies upon cooling into a soft rubbery gel. Alternatively foam can be made by frothing the gel or by adding resilient hollow microspheres. For the higher temperature process, Expancel 820 DU microspheres can be used.

The resulting rubber gel solution can be formed into sheets, die-cut, injection molded, compression molded, cast and remelted and cast into individual components to form various shaped cushions or pads to cushion feet, heads, hands and other body parts and for use in any other cushion application. The gels of the present invention may also be used for a wide variety of items, including: toys; wheelchair cushions, bicycle seat cushions, and other cushions; bras; mattress pads and other pads; beds; hand grips and handlebar grips; baseball mitts; arm rests and automobile arm rests; thermometers; and two layer condoms with gel encased between the layers; and the like. The environmentally-responsive gel and colored gels may similarly be used for the wide variety of applications disclosed above.

Coloring of the gel can be accomplished using hydrocarbon soluble pigment such as Keystone oil yellow 2635, Keystone blue or green, made by Anline Corp. The amount of color depends on the intensity desired. When the gel does not include microspheres, approximately 0.02% colorant will produce a light tint and 0.06% colorant will produce a dark opaque color.

In another embodiment, the flowable viscoelastic gel is a silicone gel. A benefit of using this gel is that it does not leach out oil over time like rubbers/oil mixtures. Therefore, it is suitable for use next to materials such as leather. One silicone gel which may be used is vinyl polydimethyl siloxane. A preferred commercially available form of this gel is General Electric RTV6139A-D1. Another silicone gel which may be used is methyl hydrogen dimethyl siloxane. A preferred commercially available form of this gel is General Electric RTV6139B-D1.

A temperature-responsive gel is described as a chemically or physically crosslinked three dimensional polymeric network that contains a substantial quantity of liquid so that the properties of the gel are determined by both the polymeric network and the liquid. If the liquid is water, the gel is commonly called a "hydrogel." The volume of this type of "reactive gel" may contract by a factor of up to several hundred percent when the gel undergoes a change in external conditions, such as temperature, Ph, solvent or solvent concentration, ionic concentration, light, pressure or electric field. Preferably, the gel used for this application is microporous and of the type that reacts rapidly to temperature and/or pressure and flexibly recovers once the external condition is removed.

The environmentally-responsive gel can be made from any responsive polymer with side groups that can react with a di-or multi- functional crosslinking molecule. The polymers can have hydroxyl, acid or amine side groups which have lower critical solution temperatures in aqueous solutions together with water-soluble crosslinkers. Even more preferably, the gel is a temperature-responsive gel that is able to undergo a phase separation or phase transition that is temperature-induced. Still further, the polymeric precursor is preferably a linear polymer or cellulose ether, such as hydroxypropyl acrylate/hydroxyethyl acrylate copolymer. Preferably the hydroxypropyl acrylate/hydroxyethyl acrylate copolymer gel is comprised of between 50 to 100 percent hydroxypropyl acrylate and between 50 to 0 percent hydroxyethyl acrylate. Also, the water-based fluid used to make the gel can include sucrose in the range of 30% to 60% to vary the reaction temperature. Further, to enable the temperature-responsive gel to operate at lower temperatures, glycerin or glycol can be added to reduce the freezing temperature of the solution.

The network material of a responsive hydrogel as used in a preferred embodiment, may be comprised of a number of polymeric materials that possess a lower critical solution temperature (LCST). The term LCST is the temperature below which the polymer is substantially soluble in liquid and above which the polymer is substantially insoluble. Therefore, the responsive gel forms a two phase system.

A preferred temperature-responsive gel portion 30 is comprised of a hydrogel. Examples of such gels are given in U.S. Pat. No. 5,183,879, which is incorporated herein by reference thereto. The preferred temperature-responsive gel contracts upon application of heat from the foot inserted within shoe 10 and thereby extracts water from the gel. As the shoe temperature rises from the foot that is inserted therein and moves during normal activity, the gel contracts. Therefore, the temperature-responsive gel section 30 can be located anywhere in the shoe to assist in conforming to the foot contours. In a preferred embodiment, the gel bladder(s) are located in at least one of the shoe mid-section, the shoe tongue, and the foot bed, where substantial heat is generated. The gel bladder 32 is used to contain the water solution 34 that is expelled from the contracted gel and allows the water solution 34 to flow around and conform to the foot that is inserted into the shoe. Preferably, the bladder 32 extends from the quarter 35, around the collar 36 to the achilles tendon area 38 for providing support for the collar, which assists in maintaining the foot within the shoe, and for assisting in protecting the achilles tendon.

Other prior art gels disclosed having a transition temperature from a liquid state to a gel state near body temperature may also be suitable for use according to the present invention if the additives disclosed herein are included in their formulation. One conventional gel that would be suitable for use with additives according to the present invention, for example, is U.S. Pat. No. 5,143,731 to Viegas et al. ("Viegas"), which is incorporated by reference thereto. Viegas discloses the use of aqueous pharmaceutical vehicles containing a polyoxyalkylene block copolymer, which are liquid at ambient temperatures and transition at mammalian body temperatures to a semi-solid gel by the inclusion of polysaccharide.

Another aspect of the invention is an article for conforming to the contours of an object including one of the above gel compositions, where the article isolates the gel composition. In a preferred embodiment, the article comprises a bladder of a flexible member that is used to contain the temperature-responsive gel. These bladders are designed to contain the temperature-responsive gel and be flexible and soft enough to conform to the contours of a human foot. Preferably, the bladders are made of a non-polar flexible material, such as a polyethylene, metallocene polymer, or polypropylene film that may be co-extruded, laminated, or alloyed with a different material to prevent water in the gel from penetrating the bladder. Portions of the polymer material are preferably bonded together using radio frequency (RF) sealing such as is done by, for example, Plastic Welding Technology of Indianapolis, IN. The RF sealing is used around the outer perimeter of the bladder to contain the gel composition therein. Still further, certain locations within the outer perimeter can be RF sealed to provide a decreased thickness of the bladder, thereby increasing the bending flexibility of the bladder. In another embodiment, the bladder includes two different films bonded together using RF sealing. The two different films are preferably polyethylene and polyurethane, although other films, such as metallocene polymers and the like, may be substituted. Polyethylene based films are non-polar and provide excellent water containing properties, i.e., water does not migrate through the films. Polyurethane films tend to allow water to migrate since they are polar. However, polyurethane films tend to provide high strength. Thus, excellent water retaining and high strength films can be made by laminating these two types of films together.

In another embodiment, a non-polar film is used to provide excellent water retaining properties and is bonded to a non-woven polyester backing material or TACLINER® made by Starensier of Newburyport, MA so that the bladder can more easily bond to a polyurethane foam or gel, such as those that are generally used in footwear or other cushion-type devices. In yet another embodiment, the non-polar film is bonded directly to the compressible foam of the foot bed or other shoe part. In another embodiment, the non-polar film is co-extruded to form a polyethylene or metallocene polymer pouch containing an adhesive on the outer layer so that the film adheres to polyurethane foams as are customary in the shoe, cushion, or other device, when the conforming device is attached. In yet another embodiment, the film may be of polar materials. In other embodiments, the film may be a polyethylene/polyurethane or polyethylene/EVA copolymer, which may be co-extruded, laminated, or alloyed. Other embodiments include those where the non-polar film may be SURLYN®, EVOH, or even an aluminum film with a secondary layer.

Metallocene resins or polymers, such as polypropylene, polyethylene, etc., are preferred film materials for the conforming devices. This is because films made with metallocene catalysts are highly ordered, highly linear, and have a narrow band of molecular weights (unlike many conventional polymers), thus yielding a stronger and more flexibly material. These metallocene resins, in the form of polymers, terpolymers or copolymers are currently manufactured by several companies, including Dow and Exxon. Compositions containing varying amounts of ethylene-butene, ethylene-hexene, and ethylene-octene have very advantageous material properties, such as reduced hardness without reduction in resiliency. Two preferred embodiments of metallocene polymers are Exxon's X-EMB-676™ and Dow's XUR 1551-4052-46™ and -39™ experimental metallocene, the Dow formulation having about ½ millimeter adhesive on the outer layer to bond with a polyurethane during heat activation at about 70° C. in the molding of the foot bed. Another preferred embodiment is use of Dow's XUR-9501255-N series of metallocene films, where N is 1 to 50. More preferred is when N is 39, which yields a soft, strong film with excellent water vapor retention properties. Other metallocene polymers, such as polyethylene, polypropylene, polybutylene, polyhexene, or polyoctene are also suitable. These ethylene based metallocene polymers have the formula:

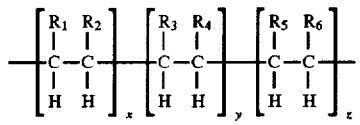

wherein $R_1$ is hydrogen, alkyl such as methyl, ethyl, propyl, butyl, pentyl, hexyl, heptyl, and octyl; $R_2$ is hydrogen, lower alkyl including $C_1$–$C_5$; carbocyclic, aromatic or heterocyclic $R_3$ is hydrogen, lower alkyl including $C_1$–$C_5$, carbocyclic, aromatic or heterocyclic; $R_4$ is selected from the group consisting of hydrogen, $C_nH_{2n+1}$, for n=1 to 18 (which includes $CH_3$, $C_2H_5$, $C_3H_7$, $C_4H_9$, $C_5H_{11}$, $C_6H_{13}$, $C_7H_{15}$, $C_9H_{19}$, $C_{10}H_{21}$) and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring; $R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x, y and z are the relative percentages of each co-monomer.

It is preferred that the bladders contain less than about 1 atmosphere pressure, although any pressure may be used with the appropriate designs. A lower pressure assists the bladder in resisting rupture when great force is applied thereto. It is also preferred that each bladder contain from about 2 to 15 grams, and more preferably from 6 to 9 grams of environmentally-responsive gel, thereby leaving a portion of the bladder chamber empty. However, the amount of gel may be greater depending on the size and shape of the bladder and the size of the shoe in which the bladder is to be used. It is preferred that the gel loss over time be minimized. A test for 9 days at 140° F. indicated that less than 10 percent of the gel would be lost in 2 years if the bladder had a non-polar film thickness of 10 mils on both sides. This is roughly equivalent to conventional shoes containing aqueous bladders with up to 0.2" film thickness. The non-polar films are preferred because of their superior vapor retention properties as compared to polar films such as polyurethane, EVA, and PVC. The preferred embodiment is the metallocene films, because of their enhanced softness and flexibility over other non-polar barrier films, although any non-polar film may be used.

In a preferred embodiment, the bladders have a coating of polyurethane on top of the bladder film to provide additional strength. This reinforced bladder is best used for under the heel or under the metatarsal applications. The films may be thicker than about 0.01", although greatly increased thickness will increase bladder strength at the expense of decreased bladder flexibility and softness.

The gel composition is preferably contained in one of a wide variety of bladder designs that can be used in the present invention with certain preferred designs illustrated in FIGS. 2, 3, 5–7, 14–18, 21–30, and 32–41. One of ordinary skill in the art could devise numerous alternative bladder designs and configurations to provide conformance to the foot and comfort and support to the wearer of the shoe, all of which are within the scope of the present invention. Certain additional structural designs are illustrated in U.S. Pat. No. 5,313,717, the content of which is expressly incorporated herein by reference thereto.

EXAMPLES

The following examples are provided only for the purpose of illustrating the invention and are not to be construed as limiting the invention in any manner.

EXAMPLES 1–12

Figure 42:
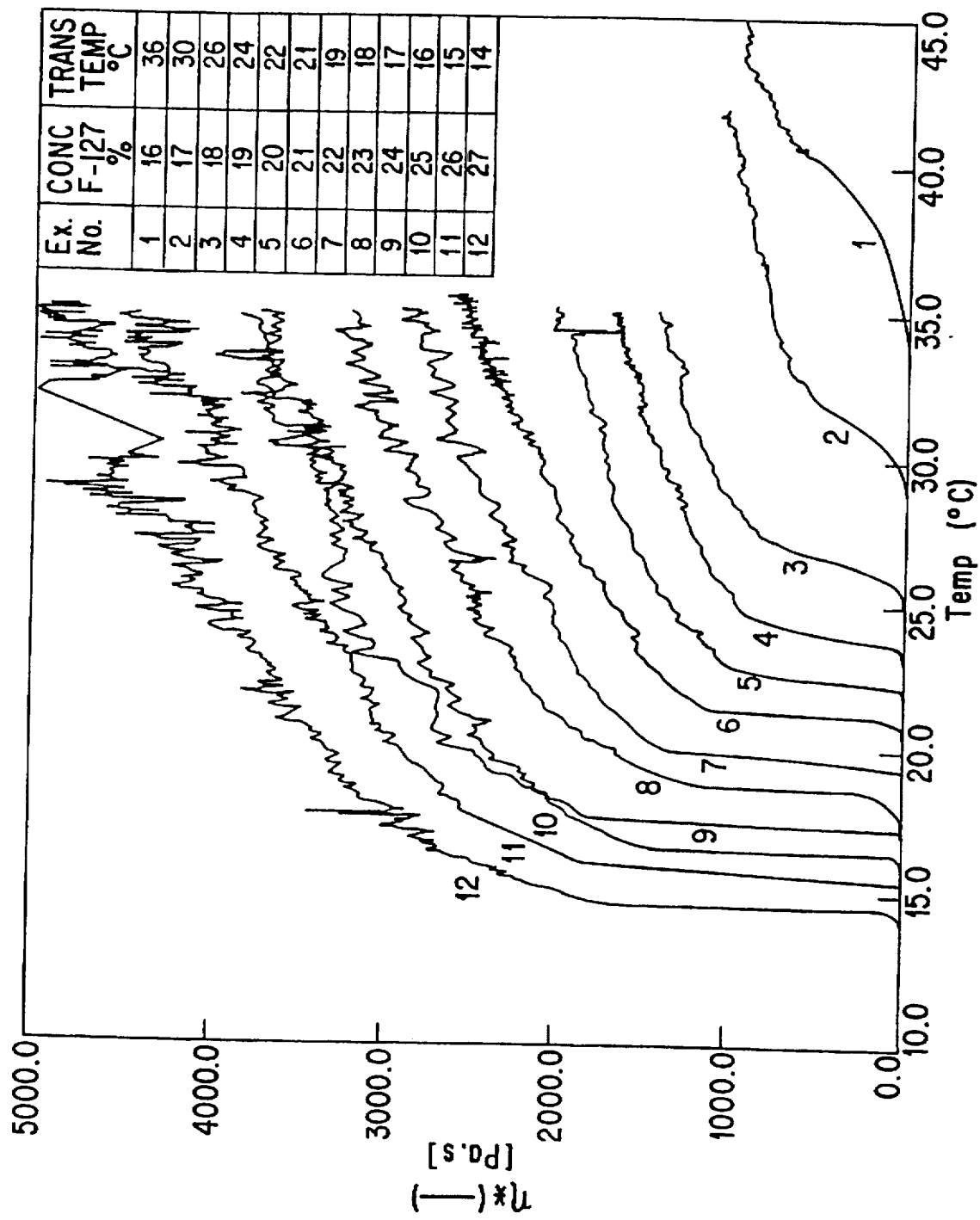
FIGS. 42 and 43 are graphs of the viscosity at various temperatures and different non-ionic block copolymer concentrations.

Samples of a gel composition were prepared by mixing a suitable amount of PEO-PPO with water. The mixture was thoroughly stirred, and then cooled in an ice bath for about two hours. The resulting composition was an optically transparent solution that gelled between the lower and upper transition temperatures. The upper and lower transition temperatures were characterized by an abrupt change in viscosity. The transition temperatures for gel compositions of about 16% to 27% PEO-PPO in water are shown in Table 1. FIG. 42 is a graph of the full viscosity response curve as a result of various temperatures and PLURONIC® F127 concentrations. The viscosity readings were obtained using a Dynamic Stress Rheometer made by Rheometrics, Inc., with parallel plate geometry and a separation of 1 mm. Complex viscosity was measured at 10 rad/min and a heating rate of 0.5° C./min. These results coincided well with Brookfield viscometer readings, but had a higher precision.

TABLE 1

The effect of PLURONIC ® F127 concentration on transition temperature and viscosity at 30° C. of thermosensitive gels

| Example No. | PEO-PPO conc. (%) | Lower transition temperature, (°C.) | Viscosity at 30° C., (cP) | Upper transition temperature, (°C.) |
|---|---|---|---|---|
| 1 | 16 | 36 | 950,000 at 44° C. | 55–60 |
| 2 | 17 | 30 | 1,000,000 at 40° C. | 55–60 |
| 3 | 18 | 26 | 1,100,000 | 70–73 |
| 4 | 19 | 24 | 1,400,000 | 70–73 |
| 5 | 20 | 22 | 1,700,000 | 73–75 |
| 6 | 21 | 21 | 2,100,000 | 73–75 |
| 7 | 22 | 19 | 2,500,000 | 75–80 |
| 8 | 23 | 18 | 2,900,000 | Over 80 |
| 9 | 24 | 17 | 3,200,000 | Over 80 |
| 10 | 25 | 16 | 3,400,000 | Over 80 |
| 11 | 26 | 15 | 4,000,000 | Over 80 |
| 12 | 27 | 14 | 4,500,000 | Over 80 |

EXAMPLES 13–26

The transition temperatures of the gel composition were adjusted by the addition of an additive. The gel compositions were prepared by mixing PEO-PPO, water, and an additive in the manner of Examples 1–12.

Table 2 shows the influence of glycerin on the properties of the gels.

TABLE 2

The effect of glycerin on upper and lower transition temperature

| Example No. | PEO-PPO conc. (%) | Glycerin (%) | Lower transition temperature, (°C.) | Upper, transition temperature, (°C.) |
|---|---|---|---|---|
| 13 | 17 | 0 | 28 | 50–55 |
| 14 | 17 | 1 | 27–28 | 55 |
| 15 | 17 | 2 | 27–28 | 55 |
| 16 | 17 | 3 | 26–28 | 56 |
| 17 | 17 | 4 | 26 | 58 |
| 18 | 17 | 5 | 25 | 70–75 |
| 19 | 17 | 10 | 23–25 | 75–80 |
| 20 | 17 | 15 | 23–25 | 78–82 |
| 21 | 18 | 0 | 22–24 | 70–73 |
| 22 | 18 | 5 | 20–22 | 75–80 |
| 23 | 20 | 0 | — | 73–75 |
| 24 | 20 | 5 | — | 80–85 |
| 25 | 20 | 10 | — | 80–85 |
| 26 | 20 | 15 | — | 85–90 |

EXAMPLES 27–33

The effect of PPO homopolymer in gels containing glycerin is shown in Table 3. PPO is expected to interact with the PPO blocks in the PEO-PPO to make them larger and more stable. Increased stiffness occurred for PPO amounts of more than 40%, and increased the upper transition temperature.

TABLE 3

The influence of glycerin and polyol on properties of gels

| Example No. | PEO-PPO conc. (%) | Glycerin conc. (%) | PPO homo-polymer conc. (%) | Upper transition (gel-liquid) (°C.) | Remarks |
|---|---|---|---|---|---|
| 27 | 17 | 15 | 10 | 70–75 | |
| 28 | 17 | 15 | 18 | 70–75 | |
| 29 | 17 | 15 | 25 | 70–75 | |
| 30 | 17 | 15 | 30 | 70–75 | |
| 31 | 17 | 15 | 36 | 75–80 | |
| 32 | 17 | 15 | 40 | 75–80 | stiff |
| 33 | 17 | 15 | 44 | 80 | very stiff |

EXAMPLES 34–50

Salts, such as NaCl, increase the solubility of gels and ease the transition temperatures, as shown in Table 4.

TABLE 4

The influence of glycerin and NaCl on properties of gels

| Example No. | PEO-PPO conc. (%) | Glycerin (%) | NaCl (%) | Lower Transition temperature (°C.) | Remarks |
|---|---|---|---|---|---|
| 34 | 17 | 5 | 0 | 70–75 | |
| 35 | 17 | 5 | 1 | 65 | |
| 36 | 17 | 5 | 2 | 60 | |
| 37 | 17 | 5 | 3 | dissolves | |
| 38 | 20 | 5 | 1 | 75–80 | |
| 39 | 20 | 5 | 2 | 75–80 | |
| 40 | 20 | 5 | 3 | 75 | |
| 41 | 20 | 5 | 4 | 70 | |
| 42 | 20 | 5 | 5 | 65 | |
| 43 | 20 | 5 | 6 | — | separates |

As can be seen in Table 4, small amounts of NaCl are able to lower the transition temperature. Therefore, NaCl is a convenient additive for adjusting the transition temperature.

The effect of NaCl is confirmed in compositions that lack glycerin, as can be seen in Table 5.

TABLE 5

The influence of NaCl on properties of gels

| Example No. | PEO-PPO conc. (%) | NaCL (%) | Lower transition temperature (°C.) | Upper transition temperature (liquid to gel), (°C.) |
|---|---|---|---|---|
| 44 | 20 | 0 | | 73–75 |
| 45 | 20 | 1 | 10–15 | 70 |
| 46 | 20 | 2 | | 65 |
| 47 | 20 | 4 | | 65 |
| 48 | 20 | 6 | | 55 |
| 49 | 20 | 9 | | 43 |
| 50 | 20 | 10 | −8 | 37–39 |

A gel containing about 20% PEO-PPO, 10% NaCl, and 70% water will have an upper transition temperature of about 37° C.–39° C.

The low transition temperature gels were prepared at temperatures of about 50°–55° C. by mixing the components in the manner of Examples 1–12, but with the mixing vessel placed in a hot water bath.

Other applications for the PEO-PPO gel include applications where conforming or phase change properties are desired, such as 1) toys (seal tubes containing fluids), 2) Valves, 3) mattresses; 4) cushions; 5) therapeutic hand exercising grips 6) shock absorbers; 7) chair seats; 8) therapeutic support pads; 9) handle bar grips and saddles; 10) sock and sock liners; 11) protective sports clothing and equipment; 12) earplugs; 13) wound dressings, and the like.

The following table illustrates the preferred polymer materials for use as bladder films due to their higher moisture barrier properties.

TABLE 6

Bladder Films with Higher Moisture Barrier (Low MVTR)

| Sample ID | Gauge | Composition | Notes | MVTR* |
|---|---|---|---|---|
| XUR-9501255-24 | 4 mils | CPE/EVA/Saran/EVA | EVA side wound in | 0.2 |
| XUR-9501255-25 | 6 mils | Saran monolayer | | 0.1 |
| XUR-1551-4052-52 | 5.5 mils | Polyethylene monolayer | Fine embossed | TBD |

*MVTR = gms/100 in²/day at 100° F. and 90% Relative Humidity (RH)

EXAMPLE 51

24 kg of the thermo-sensitive gel with the transition temperature 23° C. and final viscosity at about 3,500,000 cP were prepared. The composition of the gel was: 24% PLURONIC® F-127, 11% SUN-LIGHT® liquid detergent, and 65% water. This gel was shipped to Plastics Welding Technology, Indianapolis, for RF sealing. The preparation of the thermo-sensitive gels with the thermo-sensitive dyes was accomplished as below. CHROMICOLOR AQ INK Fast Blue, Type 20 (produced by Matsui International Co., Inc. of Gardens, CA) was used as the thermo-sensitive dye with the transition temperature of 29° C. The leuco dye has intense color (blue) below 16° C. and starts fading gradually with increased temperature up to 29° C., when it loses color completely. The dye used was encapsulated in microspheres that scatter light and give milky color when the dye goes transparent. It was desired to have both viscosity and color transitions at the same 29° C. temperature, so a water based gel with the same transition temperature was prepared. The composition of the gel with transition temperature of 29° C. was: 24% PLURONIC® F-127, 14% SUN-LIGHT liquid detergent, and 62% water. The final viscosity of the gel at 40° C. was over 3,000,000 cP.

Several combinations of the colored gels were prepared by using McCormic food colors as background colors, and thermo-sensitive Fast Blue dye. The transitions were at 29° C. and colors at the liquid and solid state of the gel are listed in Table 7:

TABLE 7

Colors below and above the sol-gel transition

| Test No. | Color below 29° C. (The liquid state) | Color above 29° C. (The gel state) |
|---|---|---|
| 1 | Blue | White |
| 2 | Green | Yellow |
| 3 | Purple | Red |
| 4 | Dark Green | Light Green |

Two series of the samples, one with the high and the other with the low concentration of the dyes were prepared. Low concentration of the dye gives translucent gel and is preferable in the present formulations.

EXAMPLE 52

The transition temperatures of prepared water gels based on PLURONIC® F-127 and water, and measurement of the effect of various diols and detergents on the lower transition temperature and the final viscosity of the gel were determined. Gel samples were prepared by weighing a suitable amount of PLURONIC® F-127, water, and 1,4 butane diol. The mixture was thoroughly stirred and cooled in an ice bath for two hours. The obtained optically transparent solution gelled in the defined temperature region. The final concentration was 25% of PLURONIC® F-127, and 10% 1,4-butane diol. The concentration of the liquid detergent was varied from 5% to 10% in the experiments.

The lower transition temperature was determined by an abrupt increase in viscosity and transition of liquid to gel. Viscosity was measured by the Brookfield digital viscometer Model DV-I+RV spindle #7 at 1 RPM. Results are shown in Table 8.

TABLE 8

Effect of the liquid detergent on the transition temperature and final viscosity of the 25% pure T-gel with 10% of 1,4-butane diol

| MP °C. | DETERGENT, % | | | | | | |
|---|---|---|---|---|---|---|---|
| | 0 | 5 | 6 | 7.3 | 7.5 | 8.0 | 9.2 |
| 13 | 4000 | 4000 | 4000 | 4000 | 4000 | 4000 | 4000 |
| 14 | 800000 | 4000 | 4000 | 4000 | 4000 | 4000 | 4000 |
| 15 | 1130000 | 4000 | 4000 | 4000 | 4000 | 4000 | 4000 |
| 16 | 1300000 | 4000 | 4000 | 4000 | 4000 | 4000 | 4000 |
| 17 | 1430000 | 4000 | 4000 | 4000 | 4000 | 4000 | 4000 |
| 18 | 1520000 | 4000 | 4000 | 4000 | 4000 | 4000 | 4000 |
| 19 | 1600000 | 4000 | 4000 | 4000 | 4000 | 4000 | 4000 |
| 20 | 1650000 | 200000 | 4000 | 4000 | 4000 | 4000 | 4000 |
| 21 | 1670000 | 500000 | 4000 | 4000 | 4000 | 4000 | 4000 |
| 22 | 1700000 | 1000000 | 600000 | 4000 | 4000 | 4000 | 4000 |
| 23 | 1720000 | 1500000 | 1300000 | 4000 | 4000 | 4000 | 4000 |
| 24 | 1750000 | 1900000 | 1600000 | 1300000 | 4000 | 4000 | 4000 |
| 25 | 1780000 | 2100000 | 1850000 | 1700000 | 1460000 | 4000 | 4000 |
| 26 | 1800000 | 2250000 | 1950000 | 1830000 | 1750000 | 4000 | 4000 |
| 27 | 1810000 | 2350000 | 2100000 | 2000000 | 1900000 | 4000 | 4000 |
| 28 | 1830000 | 2420000 | 2200000 | 2100000 | 2000000 | 800000 | 4000 |
| 29 | 1840000 | 2500000 | 2300000 | 2150000 | 2100000 | 1300000 | 4000 |
| 30 | 1850000 | 2580000 | 2330000 | 2250000 | 2200000 | 1550000 | 4000 |
| 31 | 1860000 | 2630000 | 2400000 | 2300000 | 2250000 | 1700000 | 4000 |

TABLE 8-continued

Effect of the liquid detergent on the transition temperature and final viscosity of the 25% pure T-gel with 10% of 1,4-butane diol

| MP °C. | DETERGENT, % | | | | | | |
|---|---|---|---|---|---|---|---|
| | 0 | 5 | 6 | 7.3 | 7.5 | 8.0 | 9.2 |
| 32 | 1870000 | 2670000 | 2430000 | 2350000 | 2300000 | 1850000 | 4000 |
| 33 | 1880000 | 2700000 | 2500000 | 2400000 | 2350000 | 1950000 | 4000 |
| 34 | 1900000 | 2740000 | 2550000 | 2450000 | 2400000 | 2050000 | 20000 |
| 35 | 1910000 | 2760000 | 2600000 | 2500000 | 2450000 | 2100000 | 80000 |
| 36 | 1920000 | 2780000 | 2650000 | 2550000 | 2500000 | 2200000 | 350000 |
| 37 | 1928000 | 2800000 | 2700000 | 2600000 | 2550000 | 2250000 | 800000 |
| 38 | 1928000 | 2820000 | 2750000 | 2650000 | 2600000 | 2320000 | 1500000 |
| 39 | 1928000 | 2840000 | 2800000 | 2700000 | 2650000 | 2360000 | 1650000 |
| 40 | 1928000 | 2890000 | 2850000 | 2750000 | 2670000 | 2380000 | 1700000 |

The previous tests were repeated for gels which do not contain any diol. Results are shown in Table 9.

TABLE 9

Effect of the liquid detergent on the transition temperature and final viscosity of the 25% pure PLURONIC ® F-127 T-gel (no diol)

| TEMP °C. | DETERGENT, % | | | | |
|---|---|---|---|---|---|
| | 0 | 1 | 3 | 5 | 10 |
| 13 | 4000 | 4000 | 4000 | 4000 | 4000 |
| 14 | 800000 | 4000 | 4000 | 4000 | 4000 |
| 15 | 1130000 | 4000 | 4000 | 4000 | 4000 |
| 16 | 1300000 | 790000 | 1620000 | 1580000 | 4000 |
| 17 | 1430000 | 1200000 | 2150000 | 2100000 | 4000 |
| 18 | 1520000 | 1550000 | 2500000 | 2450000 | 4000 |
| 19 | 1600000 | 1700000 | 2650000 | 2600000 | 4000 |
| 20 | 1650000 | 1900000 | 2800000 | 2750000 | 4000 |
| 21 | 1670000 | 2050000 | 3000000 | 2950000 | 4000 |
| 22 | 1700000 | 2100000 | 3050000 | 3000000 | 4000 |
| 23 | 1720000 | 2160000 | 3150000 | 3100000 | 4000 |
| 24 | 1750000 | 2160000 | 3250000 | 3200000 | 4000 |
| 25 | 1780000 | 2160000 | 3350000 | 3300000 | 4000 |
| 26 | 1800000 | 2160000 | 3450000 | 3400000 | 2080000 |
| 27 | 1810000 | 2160000 | 3470000 | 3400000 | 2370000 |
| 28 | 1830000 | 2160000 | 3500000 | 3450000 | 2420000 |

TABLE 9-continued

Effect of the liquid detergent on the transition temperature and final viscosity of the 25% pure PLURONIC ® F-127 T-gel (no diol)

| TEMP °C. | DETERGENT, % | | | | |
|---|---|---|---|---|---|
| | 0 | 1 | 3 | 5 | 10 |
| 29 | 1840000 | 2160000 | 3500000 | 3450000 | 2430000 |
| 30 | 1850000 | 2160000 | 3510000 | 3450000 | 2450000 |
| 31 | 1860000 | 2160000 | 3520000 | 3480000 | 2480000 |
| 32 | 1870000 | 2160000 | 3540000 | 3500000 | 2500000 |
| 33 | 1880000 | 2180000 | 3570000 | 3520000 | 2510000 |
| 34 | 1900000 | 2200000 | 3590000 | 3540000 | 2530000 |
| 35 | 1910000 | 2230000 | 3620000 | 3560000 | 2550000 |
| 36 | 1920000 | 2250000 | 3650000 | 3570000 | 2600000 |
| 37 | 1928000 | 2270000 | 3670000 | 3580000 | 2650000 |
| 38 | 1928000 | 2280000 | 3680000 | 3590000 | 2680000 |
| 39 | 1928000 | 2290000 | 3680000 | 3600000 | 2700000 |
| 40 | 1928000 | 2300000 | 3790000 | 3600000 | 2730000 |

The previous data tests were repeated for gels which contains 1,6-hexane diol instead of 1,4-butane diol. Results are shown in Table 10.

TABLE 10

Effect of 1,6-hexane diol on the transition temperature and final viscosity of the 25% pure T-gel

| TEMP °C. | 1,6-HEXANE DIOL, % | | | | | |
|---|---|---|---|---|---|---|
| | 0 | 1 | 3 | 7.8 | 10 | 15 |
| 13 | 4000 | 4000 | 4000 | 4000 | 4000 | 4000 |
| 14 | 800000 | 1300000 | 4000 | 4000 | 4000 | 4000 |
| 15 | 1130000 | 1500000 | 1200000 | 520000 | 4000 | 4000 |
| 16 | 1300000 | 1700000 | 1500000 | 700000 | 4000 | 4000 |
| 17 | 1430000 | 1800000 | 1750000 | 850000 | 4000 | 4000 |
| 18 | 1520000 | 1900000 | 2000000 | 2000000 | 4000 | 4000 |
| 19 | 1600000 | 2000000 | 2250000 | 2100000 | 4000 | 4000 |
| 20 | 1650000 | 2100000 | 2350000 | 2200000 | 4000 | 4000 |
| 21 | 1670000 | 2200000 | 2480000 | 2300000 | 2050000 | 4000 |
| 22 | 1700000 | 2250000 | 2600000 | 2450000 | 2350000 | 4000 |
| 23 | 1720000 | 2250000 | 2700000 | 2550000 | 2400000 | 4000 |
| 24 | 1750000 | 2270000 | 2750000 | 2650000 | 2450000 | 4000 |
| 25 | 1780000 | 2280000 | 2780000 | 2750000 | 2500000 | 4000 |
| 26 | 1800000 | 2290000 | 2800000 | 2850000 | 2550000 | 4000 |
| 27 | 1810000 | 2300000 | 2820000 | 2950000 | 2600000 | 4000 |

TABLE 10-continued

Effect of 1,6-hexane diol on the transition temperature and final viscosity of the 25% pure T-gel

| TEMP | 1,6-HEXANE DIOL, % | | | | | |
|---|---|---|---|---|---|---|
| °C. | 0 | 1 | 3 | 7.8 | 10 | 15 |
| 28 | 1830000 | 2310000 | 2850000 | 3000000 | 2650000 | 4000 |
| 29 | 1840000 | 2320000 | 2900000 | 3050000 | 2700000 | 4000 |
| 30 | 1850000 | 2330000 | 2930000 | 3150000 | 2750000 | 4000 |
| 31 | 1860000 | 2340000 | 2950000 | 3200000 | 2800000 | 4000 |
| 32 | 1870000 | 2350000 | 2980000 | 3250000 | 2850000 | 4000 |
| 33 | 1880000 | 2360000 | 3000000 | 3300000 | 2900000 | 1890000 |
| 34 | 1900000 | 2370000 | 3010000 | 3350000 | 2950000 | 2100000 |
| 35 | 1910000 | 2380000 | 3020000 | 3400000 | 3000000 | 2250000 |
| 36 | 1920000 | 2390000 | 3030000 | 3420000 | 3050000 | 2300000 |
| 37 | 1928000 | 2400000 | 3040000 | 3440000 | 3100000 | 2350000 |
| 38 | 1928000 | 2420000 | 3050000 | 3460000 | 3120000 | 2400000 |
| 39 | 1928000 | 2440000 | 3060000 | 3480000 | 3140000 | 2430000 |
| 40 | 1928000 | 2450000 | 3070000 | 3500000 | 3150000 | 2450000 |

EXAMPLE 53

The following formulation was selected for testing and 4 kg of the gel was prepared and sent to Plastics Welding for RF sealing: 23.2% PLURONIC® F-127, 9.2% 1,4-Butane diol, 7.5% SUN-LIGHT® liquid detergent, and 60.1% water.

The experimental results presented in Table 11 show that the surface active agents have a strong effect on the lower transition temperature and the final viscosity of the gel. Increasing the liquid detergent content from about 0 to 8 weight percent increased the lower transition temperature and also increased the final viscosity of the gel. Higher concentrations than about 8 percent increased the lower transition temperature but decreased final viscosity of the gel. The concentration of the 1,4 butane diol was 10 percent.

TABLE 11

Effect of Detergent Concentration on Transition Temperature and Viscosity at 30° C. of gels with 24% PLURONIC F127

| CONCENTRATION OF DETERGENT (%) | TRANSITION TEMPERATURE (°C.) | FINAL VISCOSITY (cP) |
|---|---|---|
| 0 | 18 | 3,500,000 |
| 10 | 22 | 3,400,000 |
| 11 | 24 | 3,500,000 |
| 12 | 25 | 3,100,000 |
| 13 | 26 | 3,300,000 |
| 14 | 28 | 3,050,000 |

It is clear from Table 11 that the detergent as the surface active agent has a strong effect on transition temperature and final viscosity. The concentration of detergent between 1–5% increases viscosity to more than 3500000 cP. The higher detergent concentrations decrease final viscosity but increase transition temperature. The concentration of the 10% of detergent increases viscosity up to 2700000 cP. Similar viscosities are obtained for the gel with 10% 1,4-butane diol and 7.5% detergent.

From Table 10, it is clear that hexane diol increases viscosity of the gel and increases final viscosity. The increasing transition temperature is remarkable at and above the 10% concentration but the final viscosity was higher than in samples with 1,4-butane diol and detergent.

Figure 43:
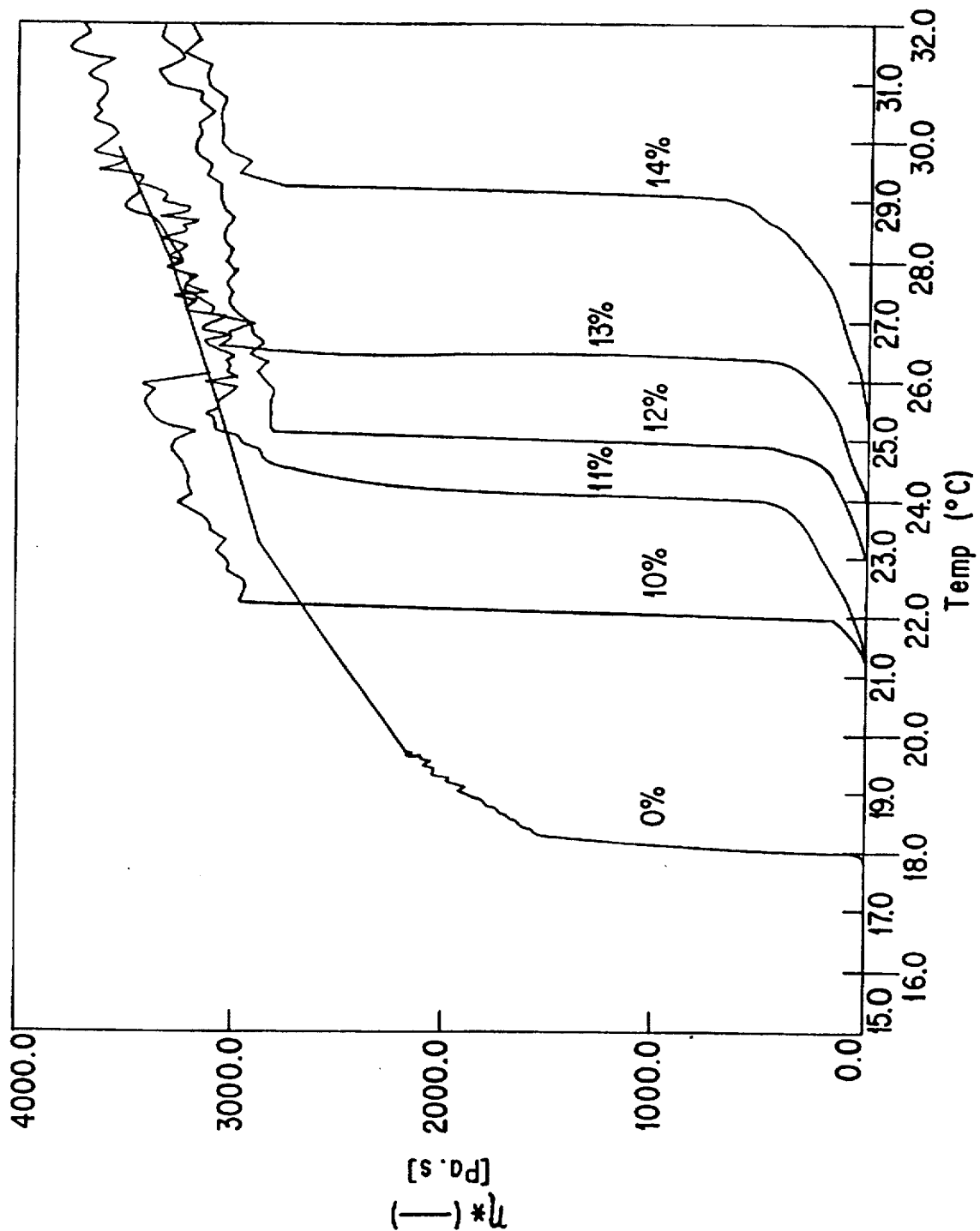

The foregoing examples illustrate the sharp viscosity response at the transition temperature, which varies depending upon the SUN-LIGHT® detergent composition. FIG. 43 is a graph of the full viscosity response curve at various temperatures given the different surfactant compositions. Other surfactants disclosed herein, such as sodium dodecyl benzene sulfonate and sodium lauryl ether sulfate, may be substituted to provide substantially the same results. The other additives may also be substituted for the detergents and surfactants, especially other alcohols, such as 1,4 butane diol and 1,6 hexane diol.

While it is apparent that the illustrative embodiment of the invention herein disclosed fulfills the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

What is claimed is:

1. A gel composition comprising water and a non-ionic block copolymer in an amount of between about 15 to 40 weight percent to impart a gel transition temperature range of between about 0.1° to 5° C. at which the gel composition changes from a liquid state to a gel state, whereby the viscosity of the gel composition in the gel state is greater than about 100 to 3000 times the viscosity of the gel composition in the liquid state.

2. The gel composition of claim 1, further comprising a gel property modifying additive, wherein the block copolymer includes polyoxyalkylene blocks and the transition temperature range of the gel composition begins at about 13° to 35° C.

3. The gel composition of claim 2, wherein the additive comprises a surfactant, a polyol, an acid, an amine or a salt thereof.

4. The gel composition of claim 3, wherein the surfactant comprises a soap or a water soluble organic sulfate, sulfonate, sulfo-succinate or salt thereof, having an organic moiety of an alkyl, alkyl benzene, alkyl phenol or olefin group where the olefin and alkyl moieties have between 6 and 20 carbon atoms; the polyol comprises butane diol, hexane diol, glycerin, sorbitol, polyethylene glycol, polypropylene glycol, trimethylolpropane or saccharose; the acid comprises an organic acid; and the amine comprises triethanolamine.

5. The gel composition of claim 4, wherein the additive is present in an amount of about 1 to 20 weight percent.

6. The gel composition of claim 5, wherein the block copolymer comprises 60 to 80 weight percent polyethylene oxide and 20 to 40 weight percent polypropylene oxide, and the water is deionized water.

7. The gel composition of claim 1, further comprising a thermo-sensitive dye in an amount sufficient to provide a first color that fades at substantially the same transition temperature as that temperature wherein the gel composition changes from a liquid state to a gel state.

8. The gel composition of claim 7, wherein the thermo-sensitive dye is present in an amount of about 0.02 to 0.5 weight percent.

9. The gel composition of claim 7, further comprising a second color dye in an amount sufficient to provide a color combination with the thermo-sensitive dye below the first transition temperature and providing only the second color above the first transition temperature.

10. The gel composition of claim 9, wherein the second color dye is present in an amount of about 0.07 to 0.5 weight percent.

11. An article for conforming to the contours of an object comprising the gel composition of claim 1 wherein the article comprises isolation means for containing the gel composition therein.

12. The article of claim 11, wherein the isolation means is a bladder of a flexible member capable of deformation to conform to the contours of the object.

13. The article of claim 12, wherein the bladder is partially filled with the gel composition.

14. The article of claim 12, wherein the flexible member is made of a material that retains water selected from the group of thermoplastic or polymeric materials.

15. The article of claim 12, wherein the flexible member is made from a material selected from the group consisting of polyethylene, polypropylene, polyethylene/polyurethane, polyethylene/EVA, SURLYN®, and EVOH.

16. The gel composition of claim 1, wherein the viscosity of the gel composition in the gel state is greater than about 500 to 3000 times the viscosity of the gel composition in the liquid state.

17. A conformable temperature-responsive composition comprising water and a non-ionic block copolymer in an amount sufficient to impart a temperature variable viscosity having a transition temperature range of between about 0.1° to 5° C. where the composition changes from a first flowable and conformable state which has a first viscosity to a second state that has a second viscosity, wherein the second viscosity of the composition is at least about 100 times greater than the first viscosity, and a transition temperature modifying additive in an amount sufficient to enable the transition temperature range of the composition to begin at a temperature of about 13° to 35° C., and wherein the block copolymer includes polyoxyalkylene blocks and the addition of heat causes the composition to change from the first state to the second state.

18. The gel composition of claim 4, wherein the surfactant comprises sodium dodecyl benzene sulfonate.

* * * * *